United States Patent [19]

O'Neal et al.

[11] 4,156,796
[45] May 29, 1979

[54] PROGRAMMABLE DATA PROCESSING COMMUNICATIONS MULTIPLEXER

[75] Inventors: Douglas M. O'Neal, Boca Raton; Donald V. Wildes, North Lauderdale, both of Fla.

[73] Assignee: International Business Machines Corporation, Armonk, N.Y.

[21] Appl. No.: 855,578

[22] Filed: Nov. 29, 1977

[51] Int. Cl.$^2$ .......................... H04Q 3/54; G06F 9/16
[52] U.S. Cl. ................................. 178/3; 179/18 ES; 364/900
[58] Field of Search ............................. 178/2, 3, 17.5; 179/18 ES; 364/900

[56] References Cited

U.S. PATENT DOCUMENTS 4,032,721  6/1977  Anizan ........................... 179/18 ES

*Primary Examiner*—Thomas A. Robinson
*Attorney, Agent, or Firm*—John C. Black

[57] ABSTRACT

A micro processor controlled user programmable communications multiplexer subsystem (herein referred to by the symbol PCS) capable of transmitting and receiving data on any one or more of 32 communications lines simultaneously. Each line may be dynamically assigned to a variety of communication characteristics, such as line speeds, character lengths, synchronous, or asynchronous operation, and code structures as well as protocol selections.

The system of the invention provides the capability for the user to write his communications programs using novel operations commands that provide code structure and protocol independence as well as communication line independence. Various hardware features and queuing techniques are employed in order to maintain high transmission rates.

Variable line scanning in the Teleprocessing Time Division Multiplexer of the PCS is programmably permissible; i.e., the time base for line scanning is fixed and is a multiple of the communication line rate, although the actual line to be scanned is programmably variable. The program ability is provided by a continuously scanned storage array which contains physical line addresses of the time division multiplexer. The scanning mechanism, while running, prioritizes the transmit buffer servicing of the individual lines.

10 Claims, 36 Drawing Figures

INSTRUCTIONS—0XXX TO 5XXX CONTROLLER MODE 000 THROUGH 010

|  | T0 | T1 | T2 | T3 | T4 | T5 | T6 | T7 | T8 | T9 | T10 | T11 |
|---|---|---|---|---|---|---|---|---|---|---|---|---|
| T TIMES |  |  |  |  |  |  |  |  |  |  |  |  |
| SET OP REG | — |  |  |  |  |  |  |  |  |  |  |  |
| SET A REG |  |  |  | — |  |  |  |  |  |  |  |  |
| LOAD SAR |  | —— | —— |  |  |  |  |  |  |  |  |  |
| SET B REG |  |  |  |  |  |  | —— | —— | —— |  |  |  |
| SET IAR |  |  |  |  |  |  |  |  |  |  | — |  |
| WRITE NIBBLE |  |  |  |  |  |  |  |  |  |  | — |  |

FIG. 8

INSTRUCTION—EXXX, BAL

|  | T0 | T1 | T2 | T3 | T4 | T5 | T6 | T7 | T8 | T9 | T10 | T11 |
|---|---|---|---|---|---|---|---|---|---|---|---|---|
| T TIMES |  |  |  |  |  |  |  |  |  |  |  |  |
| SET OP REG | — |  |  |  |  |  |  |  |  |  |  |  |
| LOAD SAR |  | WITH IAR |  |  |  |  |  |  |  |  |  |  |
| CLOCK COUNTER |  |  |  | — |  |  |  |  |  |  |  |  |
| WRITE STACK |  |  |  |  |  |  | — |  |  |  |  |  |
| BAL IN PROGRESS |  |  |  | —— | —— | —— | —— |  |  |  |  |  |

INSTRUCTION—F001, RTN

|  | T0 | T1 | T2 | T3 | T4 | T5 | T6 | T7 | T8 | T9 | T10 | T11 |
|---|---|---|---|---|---|---|---|---|---|---|---|---|
| T TIMES |  |  |  |  |  |  |  |  |  |  |  |  |
| SET OP REG | — |  |  |  |  |  |  |  |  |  |  |  |
| LOAD SAR |  | WITH LINK |  |  |  |  |  |  |  |  |  |  |
| CLOCK COUNTER |  |  |  |  |  |  | — |  |  |  |  |  |
| LOAD IAR |  |  |  |  |  |  |  |  |  |  | — |  |

OTHER BRANCHES

|  | T0 | T1 | T2 | T3 | T4 | T5 | T6 | T7 | T8 | T9 | T10 | T11 |
|---|---|---|---|---|---|---|---|---|---|---|---|---|
| T TIMES |  |  |  |  |  |  |  |  |  |  |  |  |
| SET OP REG | — |  |  |  |  |  |  |  |  |  |  |  |
| LOAD SAR |  | WITH EA |  |  |  |  |  |  |  |  |  |  |
| LOAD IAR |  |  |  |  |  |  |  |  |  |  | — |  |

FIG. 9

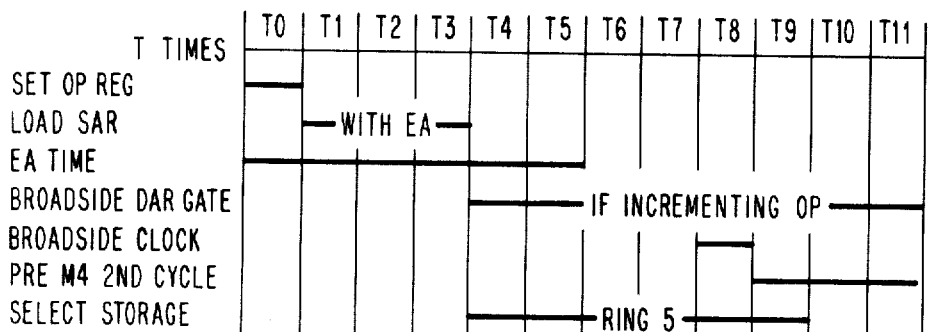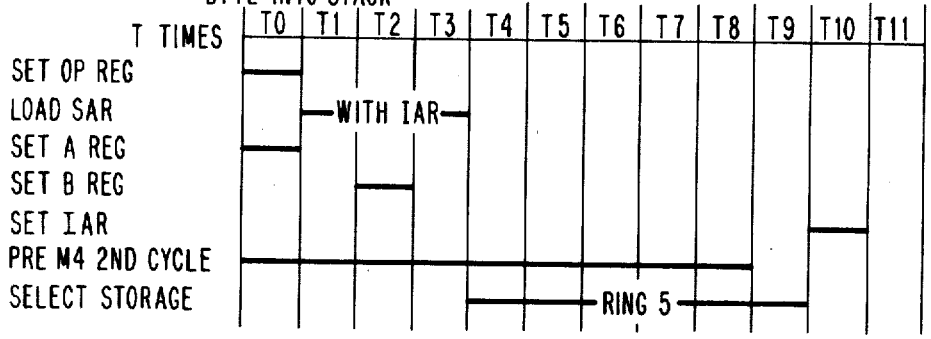
FIG. 10
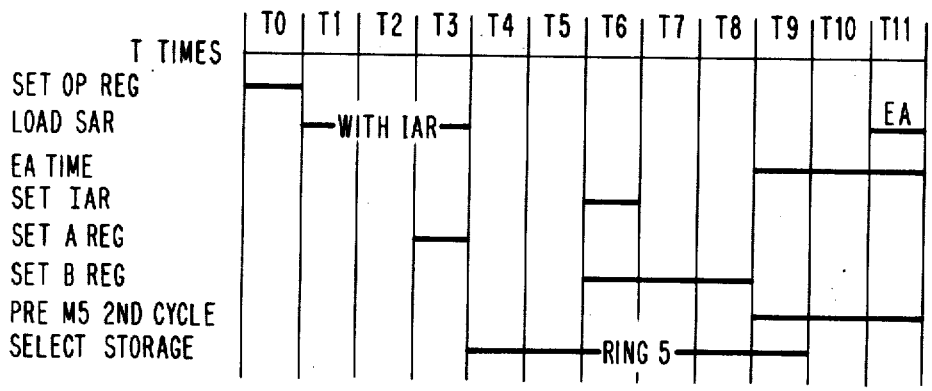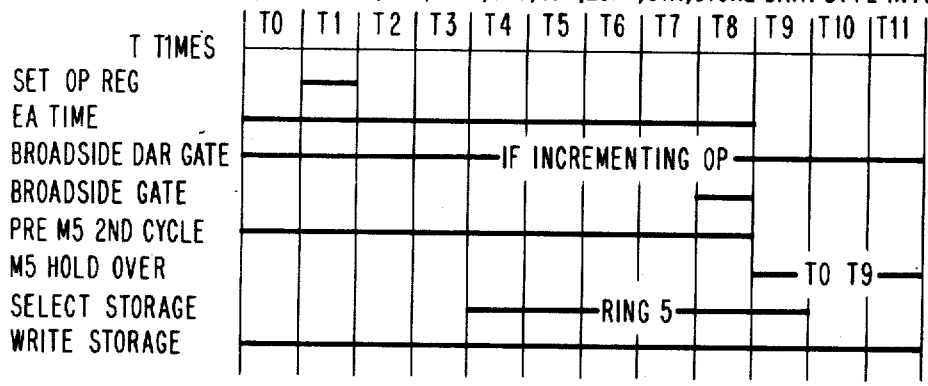
FIG. 11

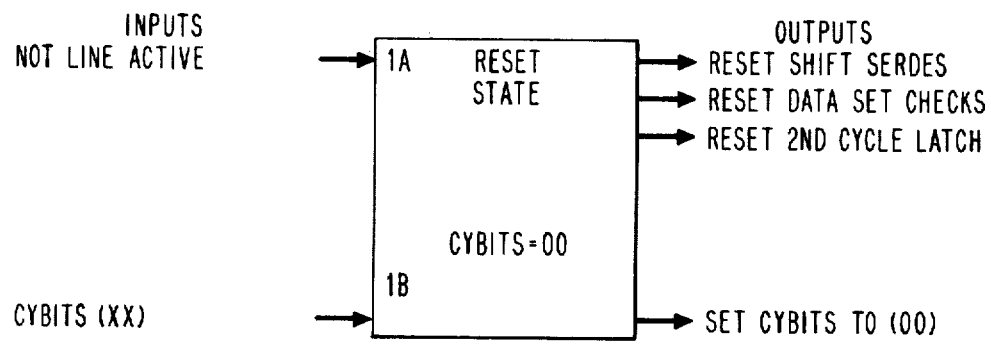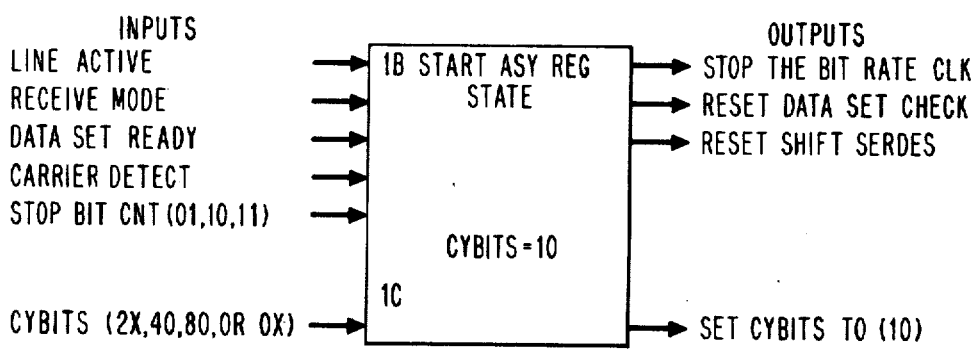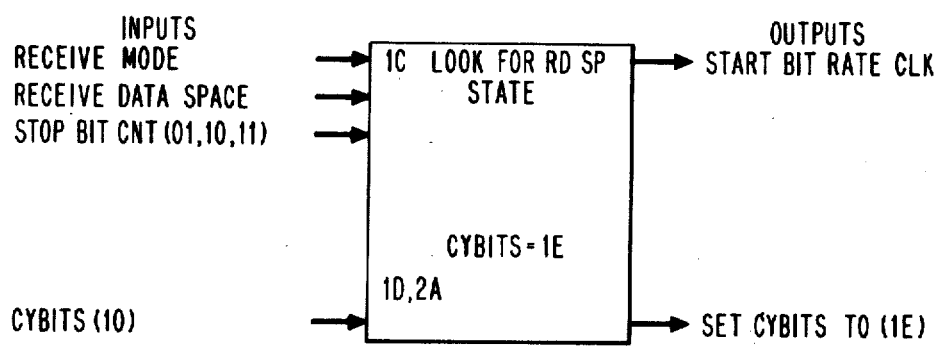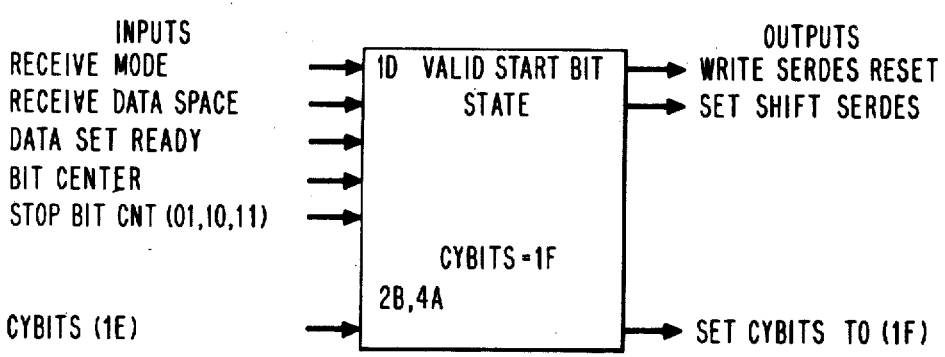
FIG. 13a

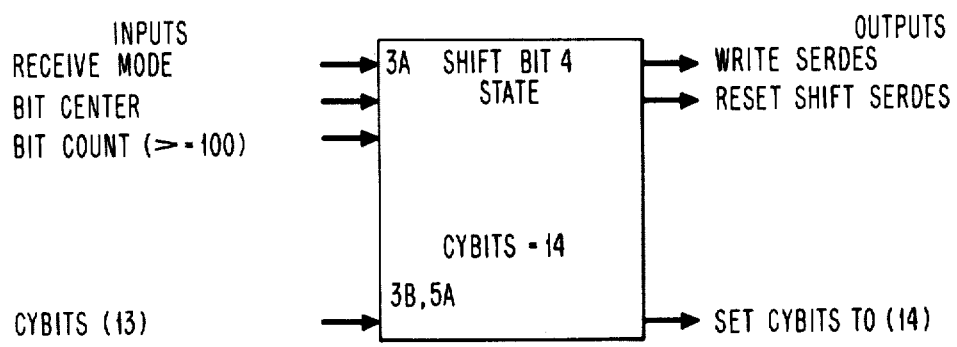
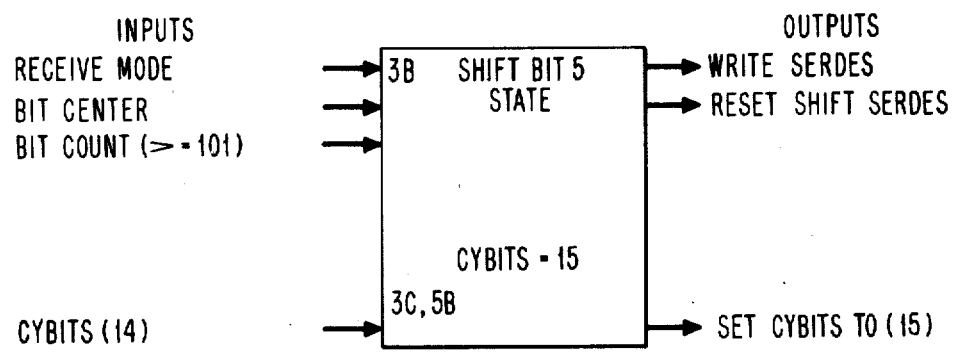
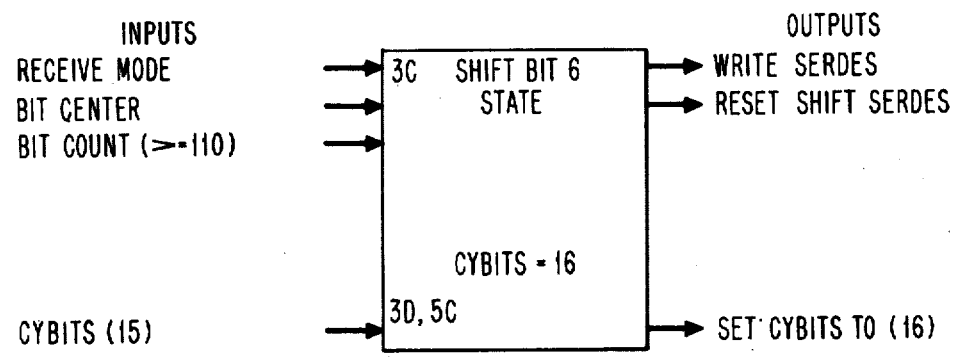
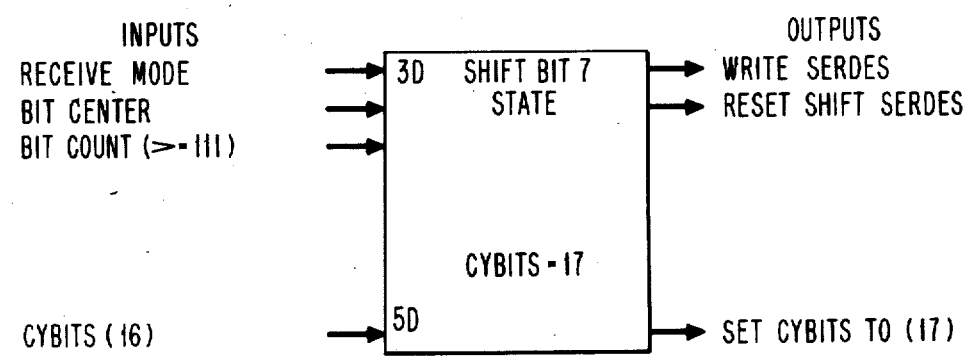
FIG. 13c

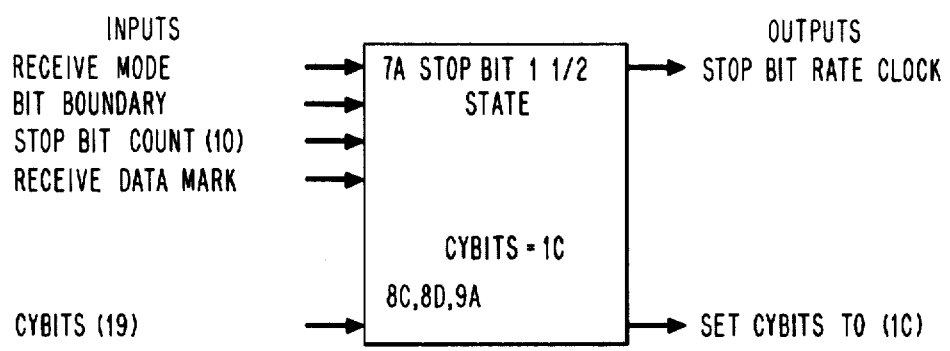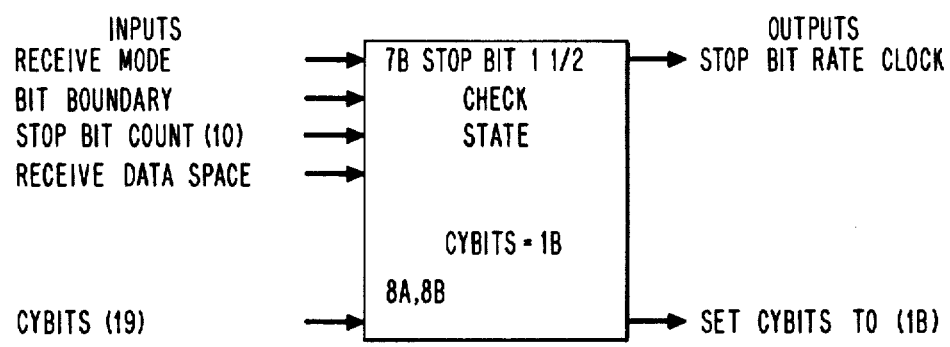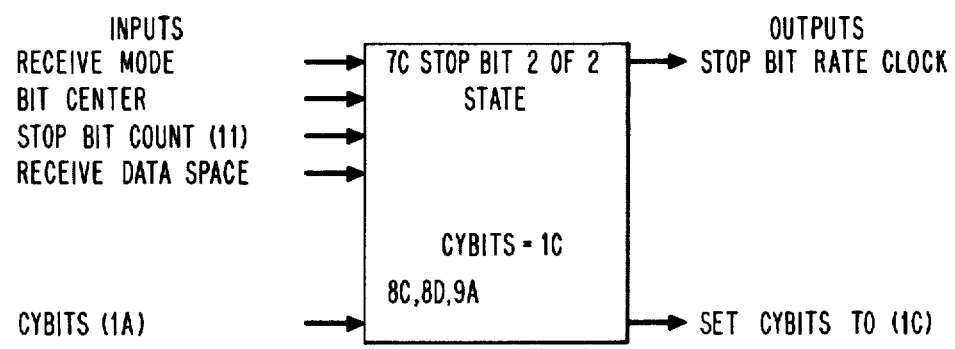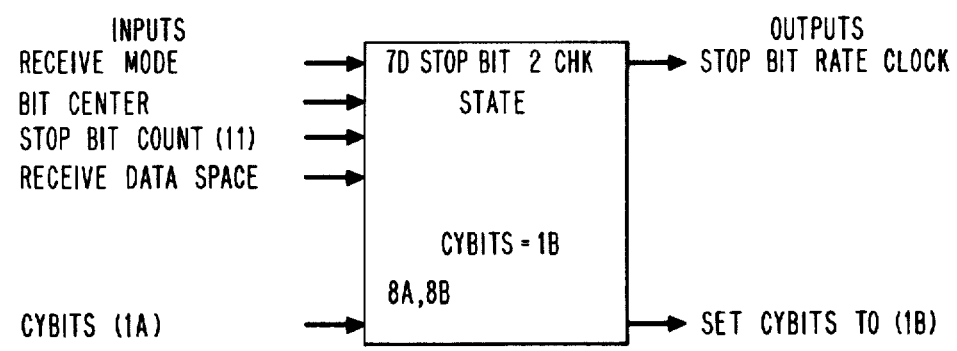
FIG. 13g

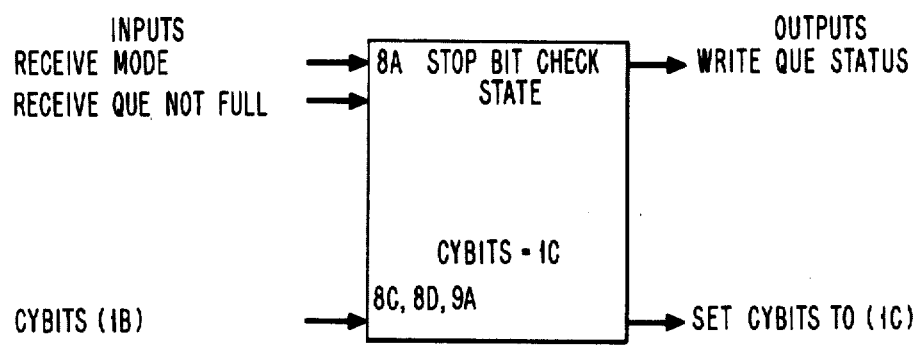
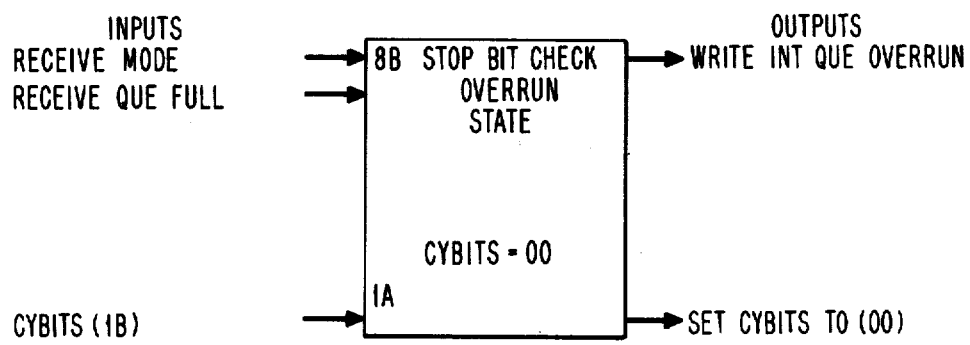
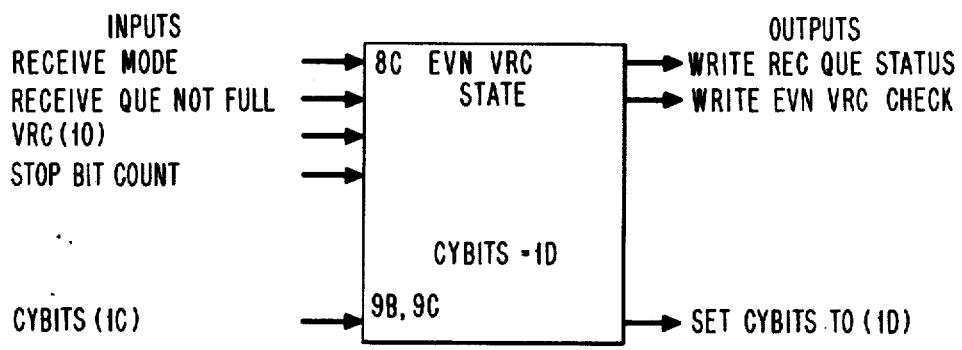
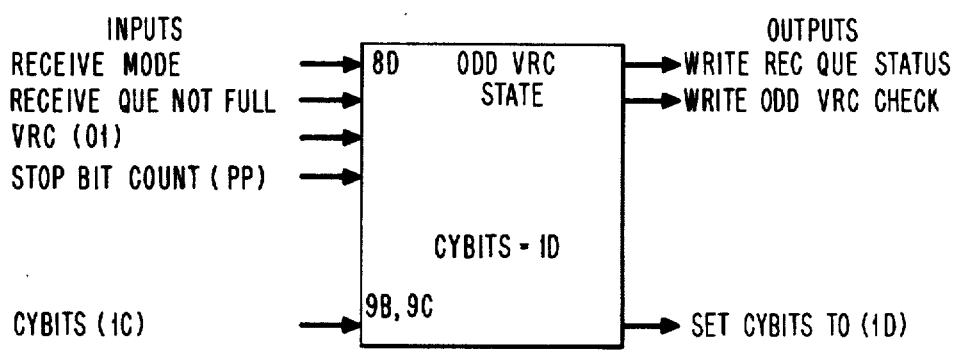
FIG. 13h

THE NUMBER OF LINES AT VARIOUS SPEEDS CAN BE
REPRESENTED BY: $8A+4B+2C+D \leq 32$ LINES WHERE  A IS THE NUMBER OF LINES AT SPEED $X_A$
       B                                   $X_B$
       C                                   $X_C$
       D                                   $X_D$ WHERE $9600 \geq X_A > 4800$
      $4800 \geq X_B > 2400$
      $2400 \geq X_C > 1200$   BITS PER SECOND
      $1200 \geq X_D > 45.5$ THE ORDER OF ADDRESSES IN THE SCAN TABLE CAN
BE FIGURED FROM THE FOLLOWING TABLES:

| LINE ADDRESS XXXXX | LINES | SCAN TABLE POSITIONS |
|---|---|---|
| | $X_{A0}$ | 0 4 8 C 10 14 18 1C |
| | $X_{A1}$ | 1 5 9 D 11 15 19 1D |
| | $X_{A2}$ | 2 6 A E 12 16 1A 1E |
| | $X_{A3}$ | 3 7 8 F 13 17 1B 1F |
| | $X_{B0}$ | 0 8 10 18 |
| | $X_{B1}$ | 1 9 11 19 |
| | $X_{B2}$ | 2 A 12 1A |
| | $X_{B3}$ | 3 B 13 1B |
| | $X_{B4}$ | 4 C 14 1C |
| | $X_{B5}$ | 5 D 15 1D |
| | $X_{B6}$ | 6 E 16 1E |
| | $X_{B7}$ | 7 F 17 1F |
| | $X_{C0}$ | 0 10 |
| | $X_{C1}$ | 1 11 |
| | $X_{C2}$ | 2 12 |
| | $X_{C3}$ | 3 13 |
| | $X_{C4}$ | 4 14 |
| | $X_{C5}$ | 5 15 |
| | $X_{C6}$ | 6 16 |
| | $X_{C7}$ | 7 17 |
| | $X_{C8}$ | 8 18 |
| | $X_{C9}$ | 9 19 |
| | $X_{CA}$ | A 1A |
| | $X_{CB}$ | B 1B |
| | $X_{CC}$ | C 1C |
| | $X_{CD}$ | D 1D |
| | $X_{CE}$ | E 1E |
| | $X_{CF}$ | F 1F |

FIG. 14

SCANNER CONTROL OPERATIONS

| START I/O FUNCTIONS | WR/RD BITS | CONTROL STORE WORD |
|---|---|---|
| SCAN TABLE ADDRESS | 80/90 | 0 1 2 3 7 — [ADD RESET \| NOT USED \| LINE ADDRESS] |
| BIT RATE COUNT | 81/91 | 0 7 8 — [CURRENT BIT RATE COUNT \| DATA SET CHK] |
| BIT RATE CONSTANT | 89/99 | 0 7 — [BIT RATE CONSTANT] |
| TIMER COUNT | 82/92 | 0 7 8 — [TIMER CURRENT COUNT \| SHIFT SERDES] |
| TIMER CONSTANT | 8A/9A | [TIMER CONSTANT] |
| BIT RATE CLOCK / TIMER CONTROL BITS (WRITTEN AT POR ONLY) PLA CYCLE CONTROL BITS | 83/93 | 0 1 2 3 4 5 6 7 8 — [RUN \| EXT. CLOCK MODE \| TIMER MODE \| FLAG \| TIMER USE DLY'S \| START BIT RATE CLOCK \| STOP BIT RATE CLOCK \| TRANSMIT BUFFER SERVICE] |
| LINE CONTROLS | 8B/9B | 0 1 2 3 4 5 6 7 — [LINE ACTIVE \| EXTERNAL CLK MODE \| TIMER MODE \| NOT USED \| SOLE] |
| CYBITS (WRITTEN AT POR ONLY) PLA CYCLE CONTROL BITS | 86/96 | 0 3 7 — [FUNCTION ADDRESSES] |

TIMER MODE:
- RESET: 0 0
- INTERVAL: 0 1
- ACTIVITY: 1 0
- START UP: 1 1

FUNCTION ADDRESSES:
- SYNCHRONOUS TRANSMIT MODE
- ASYNCHRONOUS TRANSMIT MODE
- SYNCHRONOUS RECEIVE MODE
- ASYNCHRONOUS RECEIVE MODE

FIG. 20

| | | 0　　　　　　　　7 8 |
|---|---|---|
| SYNC CHARACTER & TRANSMIT BUFFER | 8E/9E | TRANSMIT DATA OR RECEIVE SYNC. CHAR. \| TRANSMIT BUFFER FULL |

| | | 0　　　　　　　　　　7 |
|---|---|---|
| SERDES | 87/97 | SERDES |

| | | 0　1　2　3　4　5　　7 |
|---|---|---|
| LINE DEFINITIONS | 8F/9F | VRC CHK \| STOP BIT COUNT \| SHIFT LEFT \| CHARACTER LENGTH |

```
              NO CHECK      0 0
              ODD CHECK     0 1
              EVEN CHECK    1 0
              NO CHECK      1 1

SYNCHRONOUS MODE      0 0
              1 STOP BIT        0 1
              1 1/2 STOP BITS   1 0
              2 STOP BITS       1 1

8 BIT CHARACTER       1 1 1
              7     "       "       1 1 0
              6     "       "       1 0 1
              5     "       "       1 0 0
              4     "       "       0 1 1
              3     "       "       0 1 0
              2     "       "       0 0 1
              1     "       "       0 0 0
```

| | | 0 | 1 | 2 | 3 | 4 | 5 | 6 | 7 |
|---|---|---|---|---|---|---|---|---|---|
| DEVICE ATTACHMENT CONTROLS (WRITE) EIA | 84/ | DATA TERM READY | TRANS. MODE | REQUEST TO SEND | DATA RATE SEL. | DIAG. TEST | SELECT STAND-BY | OPT | DEVICE ENABLE |

| | | 0 | 1 | 2 | 3 | 4 | 5 | 6 | 7 |
|---|---|---|---|---|---|---|---|---|---|
| DEVICE ATTACHMENT CONTROLS (READ) EIA | /94 | DATA TERM READY | TRANS. MODE | CLEAR TO SEND | RCV. DATA | TEST IND. | DATA SET READY | CARRIER DETECT | DEVICE INTER-RUPT |

FIG. 21

| Operation | Code | WR/RD Bits | Format |
|---|---|---|---|
| DEVICE ATTACHMENT SPECIAL | 85/95 | | [0-7] AUXILIARY CONTROL |
| WRAP DEVICE BUS CONTROL | 8C/ | | [0-7] BUS WRAP DATA |
| WRAP DEVICE BUS SPECIAL | 8D/ | | [0-7] BUS WRAP DATA |
| RQ RECEIVE QUEUE PLUG CHARACTER | 88/ | | [0-7] PLUG DATA |
| IQ INTERRUPT QUEUE PLUG | /98 | | [0-7] NOT USED |

IMMEDIATE OPERATION — WR/RD BITS

| Operation | WR/RD Bits | Format |
|---|---|---|
| SLAR SCANNER LINE ADDRESS REGISTER | A0/ /NOT USED | [0-3 NOT USED][4-7 LINE ADDRESS] |
| D REG. DATA REGISTER | A1/5E | [0-7 DATA] |
| SCANNER RESET RQ LINE ADDRESS FIFO (HEX '00' INDICATES RQ EMPTY) | A2/ /A2 | [0 RCV DATA][1 STATUS][2 PLUG][3-7 LINE ADDRESS] |
| SCANNER ENABLE RQ RECEIVE DATA/ STATUS (HEX '00' INDICATES RQ EMPTY) | A3/ /A3 | [0-7 RECEIVE DATA OR LINE STATUS] bits 2,3,4,5,7 |

STATUS
- DATA SET CHECK
- EVEN VRC ERROR
- ODD VRC ERROR
- SYNCHRONOUS COMPARE
- STOP BIT CHECK

| Operation | WR/RD Bits | Format |
|---|---|---|
| IQ INTERRUPT FIFO (HEX '00' INDICATES IQ EMPTY) | NOT/A4 USED | [0-2 INTERRUPT TYPE][3-7 LINE ADDRESS] |

| Interrupt | Bit 0 | Bit 1 | Bit 2 |
|---|---|---|---|
| RECEIVE QUEUE EMPTY | 0 | 0 | 0 |
| TRANSMIT BUFFER QUEUE ST | 0 | 0 | 1 |
| TIM OUT | 0 | 1 | 0 |
| DEVICE INTERRUPT | 0 | 1 | 1 |
| OVERRUN | 1 | 0 | 0 |
| PLUG INTERRUPT | 1 | 0 | 1 |

FIG. 22

LCB

| |
|---|
| SENSE STATUS WORDS |
| INTERRUPT CONDITIONS |
| DATA BUFFER |
| FAT ADDRESS |
| CCT ADDRESS |
| ORDER ADDRESS |
| LINE DEFINITION |
| MONITOR CONTROL TABLE |
| BRANCH & LINK STACK |
| SYNCHRONOUS CONTROL |
| TIMER CONSTANTS |
| POLLING CONTROL |
| SYSTEM SAVE AREA |
| CURRENT DCB |

FIG. 23

PROGRAMMABLE DATA PROCESSING COMMUNICATIONS MULTIPLEXER

BACKGROUND OF THE INVENTION

The improvements described herein relate to a communications processor and in particular to one which includes multiplexing means for a plurality of communications lines controlled by the processor.

Examples of earlier communications multiplexing processors are described in U.S. Pat. Nos. 3,842,405 and 3,909,791 assigned to the assignee of the present application and in the "3705 Communications Controller - Theory and Maintenance" manual No. SY27-0107 published and distributed by the International Business Machines Corporation.

The present application illustrates subject matter which is claimed specifically in the following copending applications each filed on Nov. 29, 1977: Application

| Serial No. | Inventors | Title |
|---|---|---|
| 855,572 | D. M. Nagel et al | Programmable Communications Subsystem For a Data Processing System |
| 855,578 | D. M. O'Neal et al | Programmable Data Processing Communications Multiplexer |

SUMMARY OF THE INVENTION

The improved multiplexing mechanism is adapted to programmably control data transmission over lines of differing priorities, line speeds, code structures, electrical interfaces and control protocols using common routines and hardware.

The improved mechanism includes a periodically accessed scan table containing the addresses of locations in a control store to sequentially read out from the control store the data, status and control information associated with each communication line. A common set of logic responds to the control store information to control the transmission of data between the communication lines and the multiplexing apparatus.

A receive data queue and a transmit interrupt queue are used to control the flow of transmitted data between the multiplexing apparatus and a programmable controller.

Line priority is provided in part by assigning higher priority line addresses in priority order within the scan table and by entering the addresses of the highest priority lines in more than one scan table location so that these lines are accessed more frequently than lower priority lines. The transmit interrupt queue provides hardware interrupts to the controller, thereby prioritizing data transmit functions over receive data functions.

The queues are in the form of continuously running shift registers to move entries from the queue input to output for first-in-first-out handling.

Means are also provided for interleaving accessing of the control store by the controller with accessing of the control store by the scan table.

The logic which responds to the output of the control store is also effective to write update information and data back into the control store.

The present invention concerns a programmable digital data processing communication multiplexer subsystem (PCS) incorporating a time division multiplexing scanner. The subsystem of the invention is designed for use with the I/O (input-output) bus of a Series/1 computer system.

The Series/1 computer system includes a central processing unit (CPU), a read-out memory or store, and a multiplicity of customer or user substations connected to the I/O lines. These customer stations may comprise printers, discs or MLCAs (multi-line communications adapters). Each of these substations also includes a suitable channel attachment or adapter.

The following description will concentrate only on the programmable communications subsystem (PCS) of the invention which is connected to the I/O bus of the Series I computer system. The acronyms used in this description are:

PCS = Programmable Communications Subsystem
LCB = Line Control Block
ROS = Read only storage
CRC = Cyclic redundancy code
LRC = Longitudinal redundancy code
CLAR = Controller line address register
Stack = Memory register logical arrangement
SLAR = Scanner line address register
Modem = Modulator-demodulator
CS - Cycle steal
Latch = Logical element behaving in known single bit memory manner
SAR = Storage address register
ALU = Arithmetic logic unit
HEX = Number system to the base sixteen
Dutchess = Module of electronic circuitry
P/N = Part number
FAT = Function address table
DCB = Device control block
PLA = Program logic array
MLCA = Multi-line communications adapter
CPU = Central processing unit of the Series/1 computer system
DAR = Data access register
IAR = Instruction address register
BYTE = 8 binary digits
NIBBLE = 4 binary digits
FSU = Functional storage unit
BAL = Branch and link
LDRP = Load and increment - DARS instruction
LDC = Load via the C register instruction
STRP = Store and increment - DARS instruction
IOMP = Input to a memory and increment - DARS instruction
STC = Store via the C register instruction
MC = Move DARS to C register instruction
EXIT = Exit the interrupt level instruction
INTR = Force an interrupt level instruction
DIS = Disable interrupt instruction
ENB = Enable interrupt instruction
PCR = Program condition save register
IPL = Initial program load
LDA = Load absolute instruction
STA = Store absolute instruction
ST = Store instruction
LD = Load instruction
MIO = Memory to output instruction
IOM = Input to memory instruction
NSI = Next sequential instructions
CYBIT = Cycle Control bit (address)
SERDES = serializer-deserializer The PCS subsystem of the invention incorporates the following features which solve problems hereinafter described.

(1) PHYSICAL AND LOGICAL SEPARATION OF THE ELECTRICAL INTERFACE, THE CODE STRUCTURE AND THE PROTOCOL

This aspect of the invention solves the problem of obsolescence due to a technologically changing environment. The methods and techniques used to obtain this objective are:

(A) Novel packaged and intermixable electrical interface features:
  (1) EIA Data Set Interface
  (2) EIA Full Duplex Interface
  (3) EIA Synchronous Direct Attach
  (4) EIA Asynchronous Direct Attach
  (5) Auto Call Interface
  (6) TTY Interface
  (7) Digital Network Interface
  (8) Asynchronous 1200 bps modem
  (9) Synchronous 1200 bps modem The foregoing units are so packaged that data emanating from them have a common and consistent electrical interface to the remainder of the subsystem and yet provide the required novel electrical interface to the network or attached terminal. When a changing environment requires a change of terminal type or network attachment this may be accomplished by changing only the electrical interface and would not necessarily require a change in the programming system.

(B) Code structure independence allows the user to attach new terminal types utilizing different code structures without the necessity of rewriting his existing communications programs. This problem is solved through the means in which the controller is micro-programmed, the objective being accomplished by employing indexing techniques as opposed to specifying absolute binary characters within the communication programs.

(C) Protocol independence, like code structure independence, allows the user to alter the network and terminal configurations without the necessity of rewriting his existing communications programs. This problem is also solved through the means in which the controller is microprogrammed. The objective is accomplished by a technique utilized in the PCS which includes specifying an index value into a table, which is translated into a subroutine stating address, to select the appropriate protocol program, as opposed to writing individual programs for the various protocols required.

(2) MULTIPLY SHARED AND OVERLAPPING COMMUNICATION COMMAND STRUCTURES

Another aspect of the invention allows the user programmer to write his communications programs in a manner which disregards the physical line addressing and the plurality of communications lines that will concurrently be executing the same program. This hardware feature provides for 32 levels of automatic reentrancy.

This problem is solved through the line address register which automatically directs storage access to one of 32, 128 byte storage blocks and the appropriate CRC, channel interface and scanner hardware registers.

(3) PRIORITIZED SERVICE REQUEST QUEUING MECHANISM

This feature enhances the through-put capacity of a communications multiplexer by prioritizing receive and transmit operations in such a manner that real time transmit service requests are prioritized over non-real-time receive requests, and high data rate lines are prioritized over low data rate lines. Controller transmit interrupt structure and transmit and receive hardware queues are used in conjunction with various micro-programmed task scheduling techniques to achieve the desired result.

(4) PRIORITY SCANNING SEQUENCE

Another aspect of the subsystem of the invention is a feature which provides an adaptive priority allocation based on the transmission rate of a given communications line. This feature allows high speed lines to be accepted for service more frequently and reduces the probability of high speed lines being overrun due to servicing of lower speed lines. Both of these advantages are achieved by a scan table storage element and circuitry which prevents further scanning of lines requiring service if a line has been found which requires service. The priority of the line is dynamically assigned by placing its address in the appropriate relative position of the scan table. In addition, high speed line addresses may be placed in the scan table a plurality of times, thereby increasing the polling frequency for service requests.

(5) GENERALIZED POLYNOMIAL HARDWARE CRC GENERATOR

This feature solves the problem of generating a cyclic redundancy check character of any polynomial up to 16 bits in length simultaneously for up to 32 communication lines, each having its own polynomial and operating at varying character lengths and at differing transmission rates. These objectives are accomplished through a time division multiplexed generalized CRC processor accompanied by data storage elements for maintaining partial results.

Various objects appear from a reading of the foregoing abstract and the foregoing brief description of the invention. Other objects and further scope of applicability of the present invention will appear from the following detailed description. It should be understood that the detailed description indicates one embodiment of the invention and is given by way of illustration only since changes and modifications may be made within the spirit and scope of the invention. It should also be understood that the foregoing abstract of the disclosure is for the purpose of providing a non-legal brief statement to serve as a searching tool for scientists, engineers, and researchers, and is not intended to limit the scope of the invention as disclosed herein nor is it intended it should be used in any way to limit the scope or fair meaning of the appended claims.

BRIEF DESCRIPTION OF THE DRAWINGS

FIG. 7 shows the data flow for transmit and receive operations within the program logic array PLA. This figure shows the control and control store of FIG. 4 and the interconnections thereof.

FIG. 7 shows in detail some of the components of FIG. 4.

FIGS. 8 to 12 inclusive are signal timing charts given to aid in the understanding of the operational description of the controller part of the invention;

FIG. 14 is an example of line address assignments programmed into the scan table of 4;

FIGS. 15 to 18, inclusive, aid in an understanding of the overview or general overall recapitulation of the Programmable Communications Subsystem (PCS) of the invention, given after detailed descriptions of the major components of the PCS;

FIG. 19 illustrates the arrangement of FIGS. 19a to 19c;

FIGS. 19a, 19b and 19c taken together show the components of FIG. 4 in greater detail;

FIGS. 20, 21 and 22 illustrate scanner control operations and the format of the operation words; and FIG. 23 illustrates the format of a line control block.

HOST PROCESSOR TO SCANNER UNIT DATA TRANSFER

Figure 1:
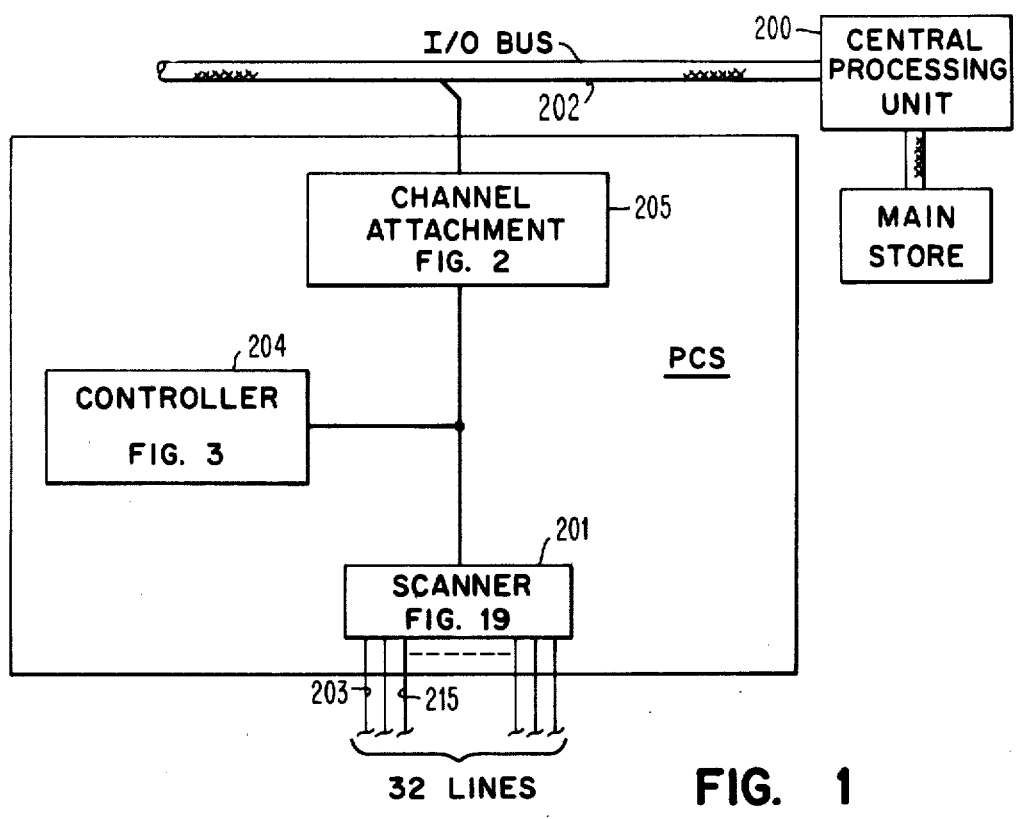
FIG. 1 is a block diagram showing the major components of the Programmable Communications Subsystem (PCS) of the invention.

Referring to FIG. 1, there will now be described the manner in which data is transferred from the main storage unit of the host processor 200 to the scanner unit 201 of the Programmable Communications Subsystem (PCS) via the host processor I/O interface bus 202. This will sometimes be referred to as a "TRANSMIT" operation because the data being transferred is intended for transmission by one or more of the 32 communications lines connected to the output of the scanner unit 201. The host processor operations associated with such data transfer are described in detail in U.S. Pat. No. 4,038,642, granted on July 26, 1977, to Bouknecht et al and assigned to the same assignee as the present application, and hence such operations will not be described in detail herein. The host processor I/O bus 202 herein corresponds to the I/O interface bus 35 shown in such patent. The PCS apparatus of the present invention is attached to such interface bus in place of one of the I/O attachment units or control units 34 of such patent. Thus, as far as the host processor is concerned, the PCS unit of this application appears to be another one of the I/O control units 34 of such Bouknecht et al patent.

In describing the movement of the data bytes from the host processor to the PCS, it is assumed that the cycle seal (CS) communications mode is being used and that at some earlier point in time an OPERATE I/O (OIO) instruction was issued in the host processor and that the appropriate I/O command and control information associated with this instruction has already been transferred to the PCS. For sake of example, it is assumed that the OPERATE I/O instruction was issued for an I/O device connected to the scanner output communications line 203. It is also assumed that both the host processor and the PCS controller 204 are both initially busy with other tasks.

Figure 19A:
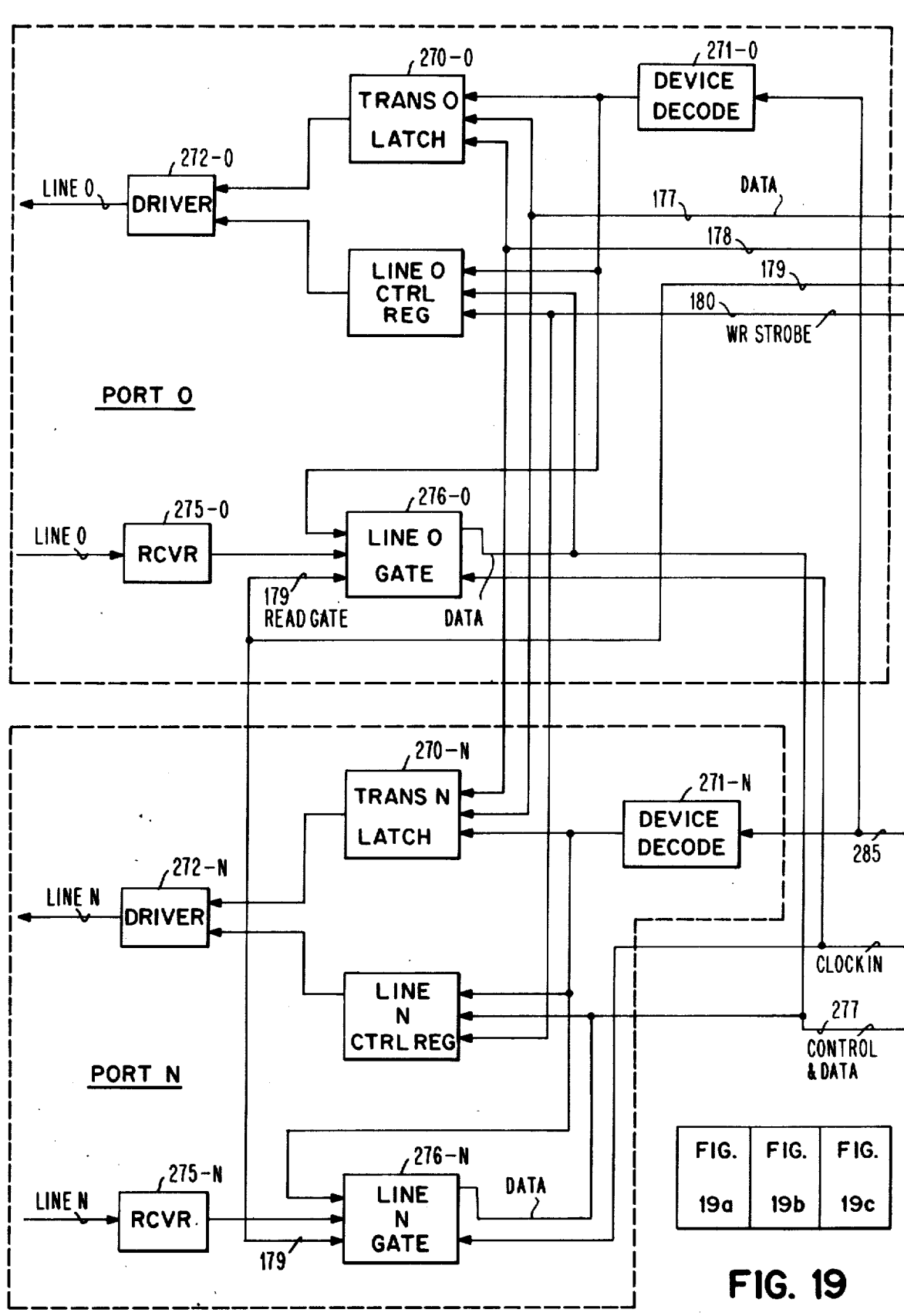
Figure 19B:
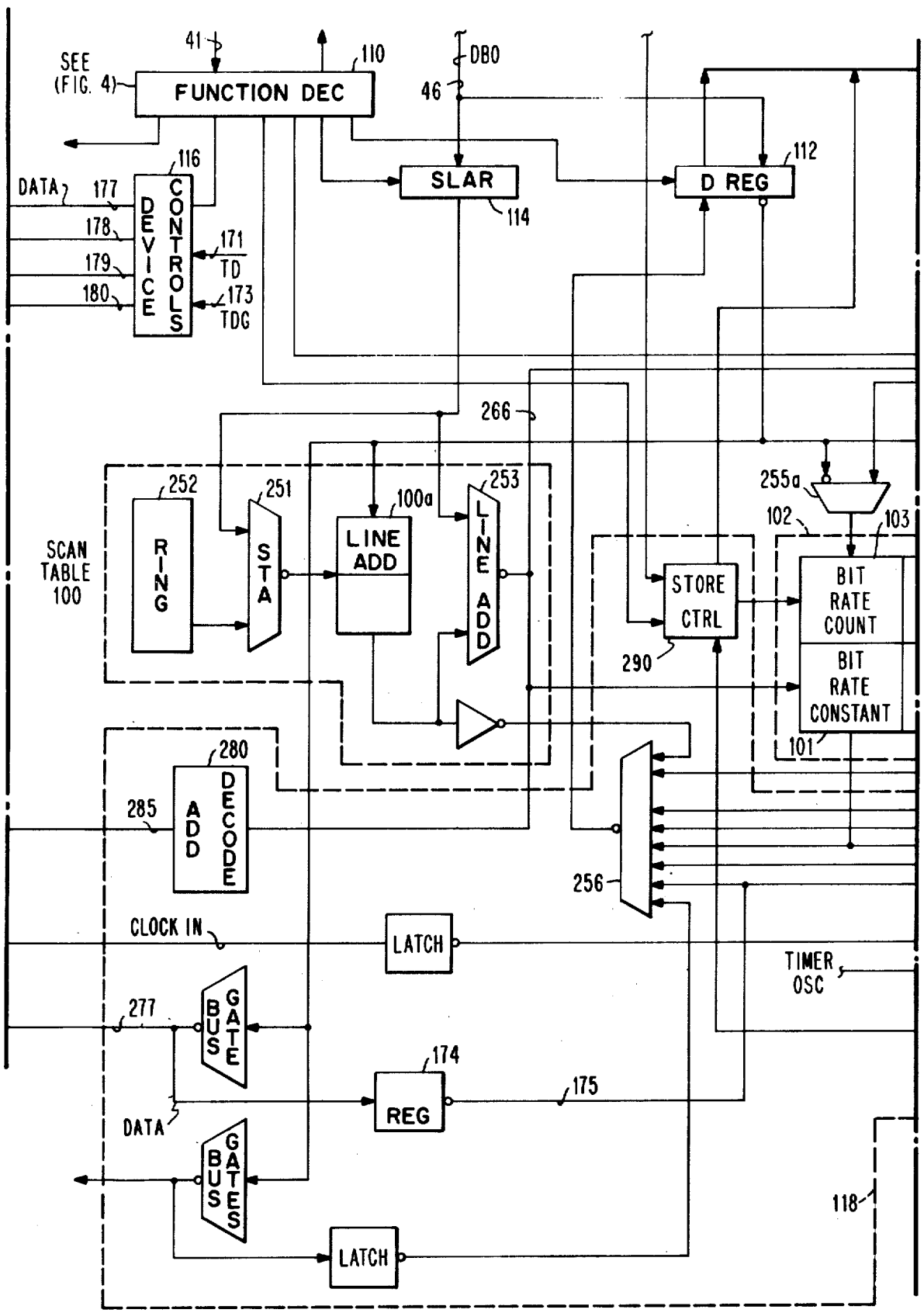

At some point in time, the scanner 201 sends an interrupt request to the controller 204 telling it that it needs more data to transmit over the communications line 203. This is accomplished by way of the interrupt request line 287 shown in FIG. 19C. This request is supplied to the control unit 134 which is shown in the detailed FIG. 3 showing of the controller 204. As a result of this interrupt request, the current task being executed by the microcode control program in the read only storage (ROS) 128 of the FIG. 3 controller is interrupted and the control program branches to a transmit interrupt handling routine. This interrupt handling routine causes the communications line address appearing in the output stage of the interrupt queue 104 (FIG. 19C) to be transferred via the controller data bus in (DBI) 44, A and B registers 148 and 150 and ALU 152 to the R0 and R1 registers in register stack 102 of the FIG. 3 controller. This line address is, for the present discussion, assumed to be the line address for the communications line 203. The interrupt routine then transfers this line address value from the register stack 102 and sets it into the controler line address register (CLAR) 38 (FIG. 2) and into the scanner line address (SLAR) 114 (FIG. 19B). In each case, this is accomplished by way of stack output bus 110, selector 145, A and B registers 148 and 150 and the controller data bus out (DBO) 46.

At each setting, the same identical 5-bit line address is set into each of CLAR 38 and SLAR 114. Thus, from a theoretical standpoint, these two registers 38 and 114 could be replaced by a single register. In practice, however, it is more economical from a hardware standpoint to provide two separate registers which can be individually located closer to the other hardware elements with which they are respectively associated.

The line address in CLAR 38 does several things. For one thing, it supplies address bits via CLAR output line 39 to the controller storage unit 132 (FIG. 3) for enabling the control program in ROS 128 to address the proper line control block (LCB), in this example, the line control block (LCB) for the communications line 203. In this regard, each of the storage units 128, 130 and 132 is physically subdivided into four modules, each module having a capacity of 4096 bytes. Normally, these storage units 128, 130 and 132 are addressed by address bits 0-15 on storage address bus 206. The four higher order bits (bits 0-3) select a particular one of the 4096-byte modules. This is accomplished by way of storage select unit 207. The remaining lower order address bits on the storage address bus 206 are then used to select the desired byte within the selected module.

The line control blocks (LCB's) are located in the lowermost 4096-byte module in the storage unit 132. There are 32 such line control blocks, one for each communications line. Each line control block is 128 bytes in size. Each line control block is used to store various control and status information for its particular communications line. Each line control block also includes a two-byte buffer location for temporarily buffering data as it is being transferred from the host processor to the FIG. 19 scanner (unit 201 of FIG. 1) or vice versa. FIG. 23 is a map or chart showing the format and contents of a line control block.

The address wiring for the portion of storage unit 132 containing the line control blocks is modified so as to enable the 5-bit line address in CLAR 38 to directly select the particular line control block to be used at any given moment. In particular, the address lines used to define the starting addresses of the LCB's, namely, address bit lines 4–8, are disconnected from the normal storage address bus 206 and are instead connected or wired so as to receive the five line address bits from CLAR 38, this connection being made by way of the five-bit bus 39. Thus, CLAR 38, in effect, provides the starting address for the desired line control block. The particular byte within the selected 128-byte LCB is selected by the remaining lower order bits on the normal storage address bus 206. Thus, CLAR 38 selects the particular LCB to be accessed and the microcode within ROS 128 selects (via SAR 0–3) the particular byte within such LCB.

Figure 2A:
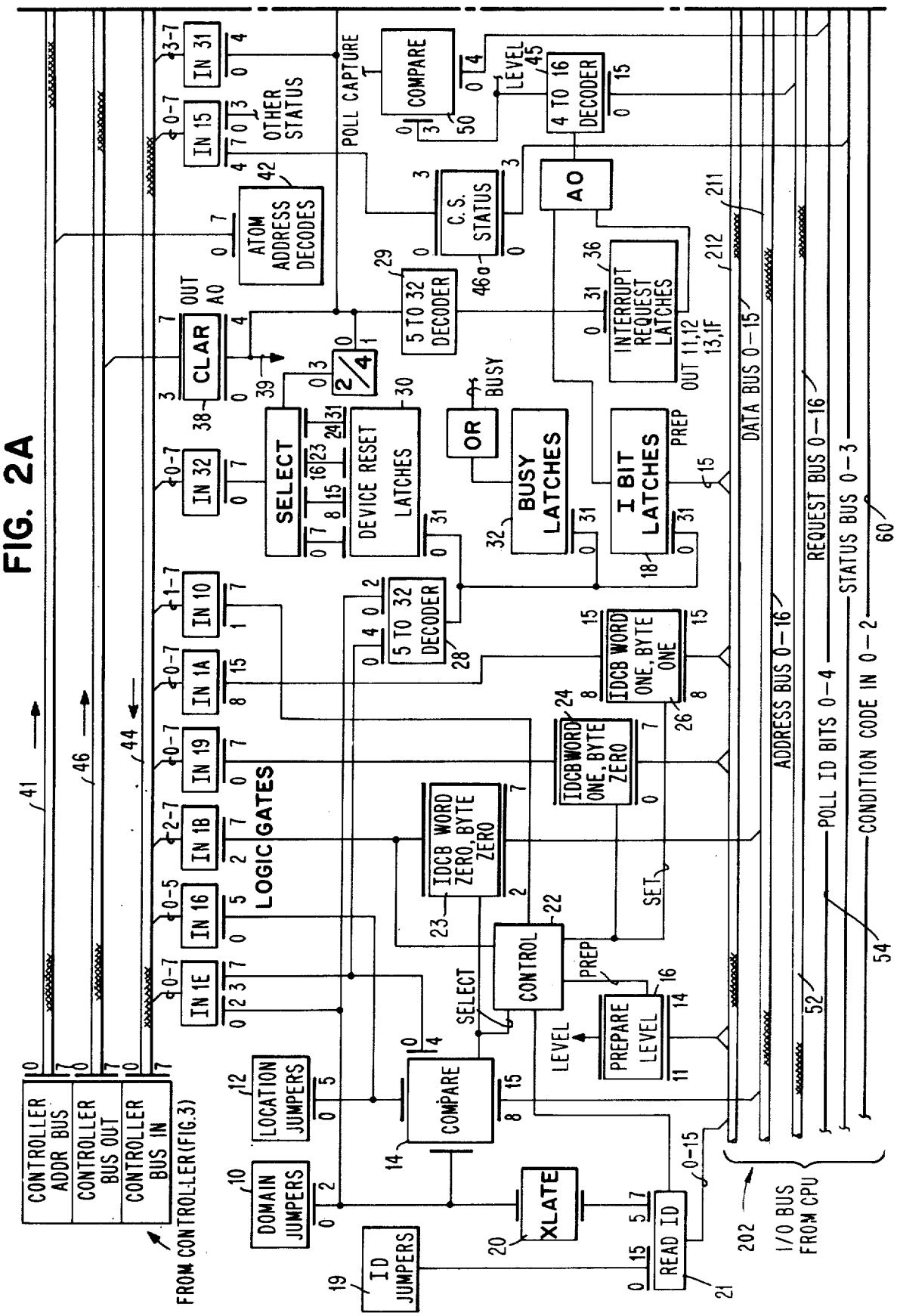
FIGS. 2a and 2b taken together show the major components of the Channel Attachment utilized in the PCS of the present invention.
Figure 2B:
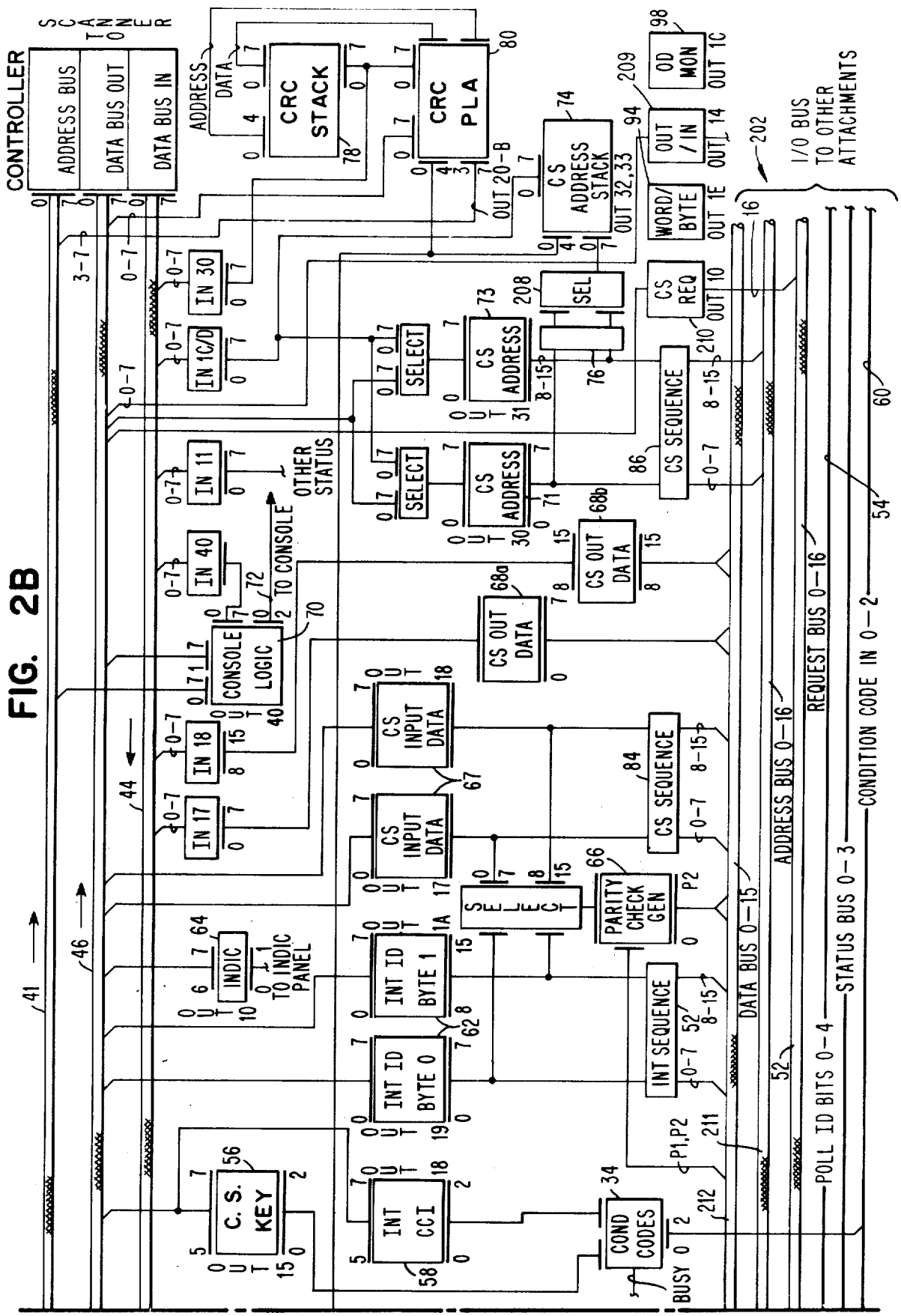

A further function provided by CLAR 39 is the addressing of the cycle steal address stack 74 (FIG. 2). This address stack 74 contains 32 two-byte storage locations, one for each of the 32 communications lines. For any given communication line, its storage location in stack 74 is used to store the host processor main storage address to which or from which data is to be transferred during cycle steal operations. The storage location for any given communications line is initially loaded during the preliminaries following the issuance of the operate I/O instruction so as to contain the main storage starting address for the particular data transfer in question. Thereafter, such storage location in stack 74 is updated after each byte or word is transferred so as to contain the main storage address for the next byte or word to be transferred for that particular communications line.

For a given communications line, CLAR 38 supplies the line address to the address stack 74. The controller control program in ROS 128 then issues two successive transfer instructions to the address stack 74, the first setting the first address byte from stack 74 into the cycle steal address register 71 and the second setting the second address byte from stack 74 into the cycle steal address register 73. The main store address in registers 71 and 73 will be supplied to the host processor during the performance of the cycle steal request. While this main storage address is in registers 71 and 73, it is also used to update the address stack 74, this being accomplished by way of incrementer 76 and selector 208. This selector 208 passes one address byte at a time back to the address stack 74 to update the main store address in the storage location for the particular communications line in question.

A further function provided by the controller line address register (CLAR) 38 is the addressing of the cyclic redundancy check (CRC) programmed logic array (PLA) 80, this CRC PLA 80 also being shown in FIG. 2. CLAR 38 also supplies the coded line address value to the decoder 29, which in turn controls the selection of the interrupt request latches 36. The two higher order bits in CLAR 38 are also used to provide the selection control for the device reset latches 30.

As seen from the foregoing, the communications line address (literally, the communications line identifying number) in CLAR 38 simultaneously supplies address information to various parts of the Channel Attachment of FIG. 2 and the controller of FIG. 3 (the LCB addressing in storage unit 132) so that these parts or elements can select their respective items for the particular communications line being considered at a particular moment. At the same time, the companion line address register, namely, scanner line address register (SLAR) 114 (FIG. 19B), which contains the same line address as does CLAR 38, is performing various addressing functions in the scanner 201. The point is that the companion CLAR 38 and SLAR 114 provide the address selection for various elements scattered throughout the PCS, which elements have, in some respects, differing addressing requirements. This usage of CLAR 38 and SLAR 114 considerably simplify the handling of these addressing requirements.

Getting back to the discussion of the movement of data from the host processor to the scanner and keeping in mind the previous assumptions with respect to being in the middle of a series of cycle steal transfers for the communications line 203, at the appropriate point in time and in the manner discussed above, the control program in ROS 128 (FIG. 3) causes the line address for the communications line 203 to be set into CLAR 38. The control program then accesses the LCB for communication line 203 and examines the appropriate status field in such LCB and sees that there is in progress for this communications line a host processor to scanner data transfer operation and that the data buffer in the LCB is ready to receive the next chunk of data from the host processor. For sake of example, it is assumed that the data chunks being transferred are two-byte data words. As a result of this determination, the control program issues the appropriate instructions to move the desired main storage address from the address stack 74 (FIG. 2) to the cycle steal address registers 71 and 73. The control program also sets an output/input indicator latch 209 to indicate that the host processor is to output data to the PCS apparatus. Then the control program sets a cycle steal request latch 210 to active the cycle steal request line (bit 16 line) on the host processor request bus 52.

After receipt of the appropriate reply form the host processor, the cycle steal sequence gates 86 are activated to set the main storage address residing in registers 71 and 73 onto the host processor address bus 211. The host processor receives this address and fetches the desired word of data from its main storage unit and places such data on the host processor data bus 212. Upon receipt of the appropriate control signal from the host processor, the two bytes of data on the data bus 212 are set into respective ones of the cycle steal out data registers 68. As mentioned, the internal operations required in the host processor to recognize the cycle steal request and to put the desired data onto the data bus 212 are described in the above-referenced U.S. Pat. No. 4,038,642 to Bouknecht et al.

The FIG. 3 controller then operates to read the data word from the data registers 68 (FIG. 2) and to store it into the data buffer in the line control block assigned to the communications line 203. This is accomplished in several steps. First, the control program in ROS 128 (FIG. 3) issues an IN instruction to transfer the byte of data in cycle steal data register 68a (FIG. 2) into a pair of four-bit registers R0 and R1 located in register stack 100 in the FIG. 3 controller. As a first part of this controller instruction, the data byte in register 68a is transferred by way of gates IN 17 and controller data bus in (DBI) 44 and set into the A and B registers 148 and 150 shown in FIG. 3. The four bits in the A register 148 are then transferred by way of ALU 152 and set into the R0 register in stack 100. Then the four bits in the B register 150 are transferred by way of ALU 152 and set into the R1 register in the stack 100. The control program in ROS 128 thereafter issues a store instruction to read the data from the R0 and R1 registers (stack 100) and to store it into the line control block for communications line 203, such LCB being located in the storage unit 132. This is accomplished by successively transferring the contents of registers R0 and R1 via the stack out bus 110, selector 145 and assembly bus 146 to the A register 148 and the B register 150, respectively. The byte in A and B registers 148 and 150 is then transferred to and stored into the storage unit 132 by way of the storage unit input bus 213. At this moment, the storage unit 132 is being addressed by the line address bits from CLAR 38 to select the proper line control block and by the lower order address bits on the primary storage address bus 206 to select the proper byte within the selected line control block.

The foregoing steps are then repeated for the second byte of data residing in the second cycle steal data register 68b (FIG. 2). In other words, the FIG. 3 controller issues an IN instruction to transfer the second byte from register 86b to the R0 and R1 registers in stack 100. The FIG. 3 controller then issues the store instruction to transfer the second byte from the R0 and R1 registers to the LCB data buffer in the storage unit 132. At this point, the complete data word now resides in the data buffer in the line control block for communications line 203.

With respect to the communications line 203, the FIG. 3 controller now waits until the FIG. 19 scanner tells it that it is ready to receive more data for the communications line 203. In the meantime, the FIG. 3 controller may attend to the handling of various chores for the other communications lines.

Figure 19C:
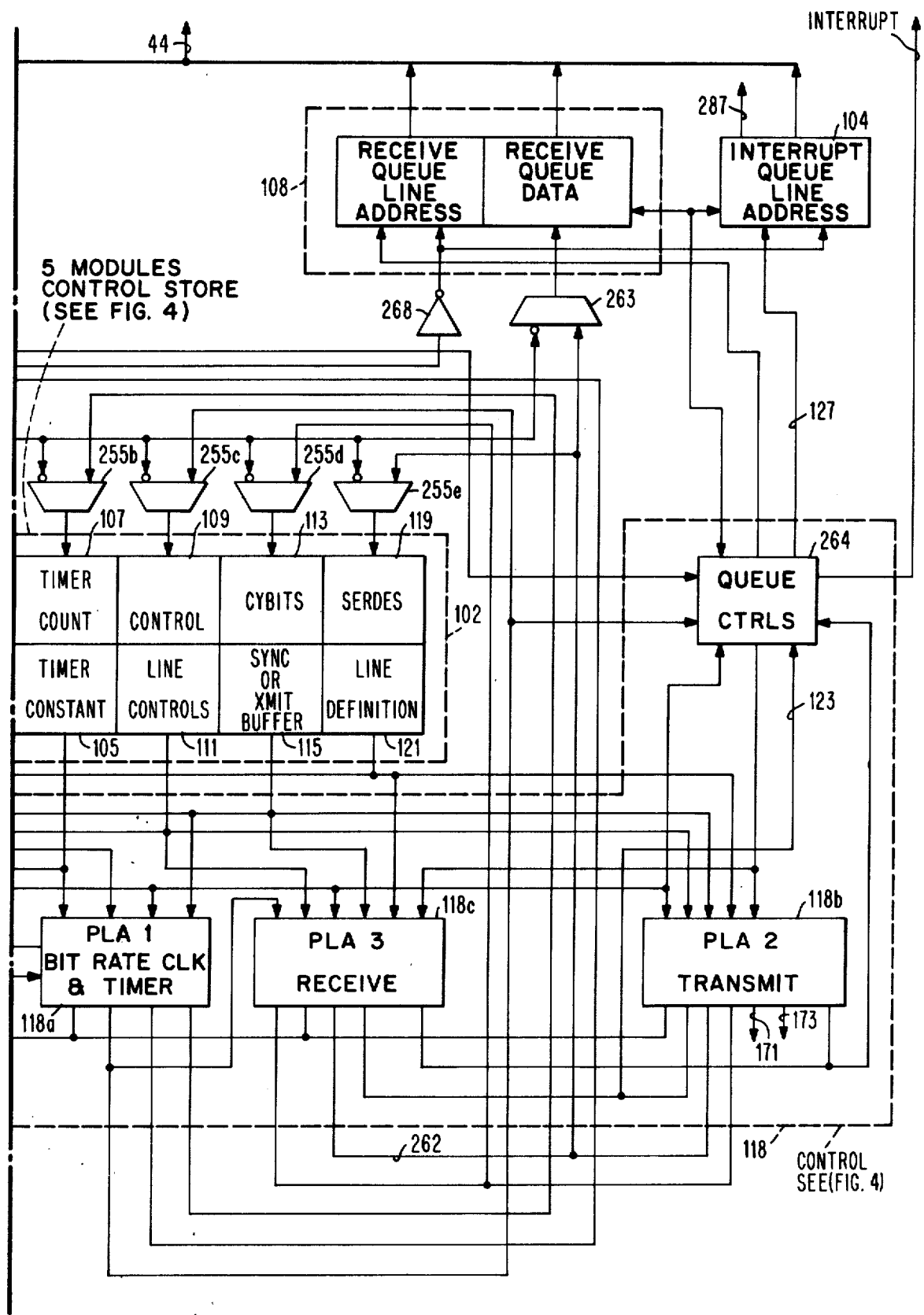

At some point in time, the FIG. 19 scanner completes the serial-by-bit transmission of a data byte previously transferred thereto for the communication line 203. Shortly after such completion, the scanner sets the 5-bit line address and a 3-bit status field into the transmit interrupt queue 104 (FIG. 19). The coding of the status field indicates that the scanner is ready to receive another byte of data from the FIG. 3 controller for the communications line 203. The interrupt request line 287 may already be at the interrupt level because of another line address item previously entered into the interrupt queue 104 and still pending therein. If not, then the queue control 264 sets the interrupt request line 287 to the interrupt level as a consequence of the placing of the communications line 203 item into the interrupt queue 104. The interrupt request line 287 of FIG. 19C runs to the control unit 134 in the FIG. 3 controller. This interrupt request line 287 is continuously monitored by the control program in ROS 128 to produce an immediate interrupt of any other task then being performed. Thus, the handling of transmit interrupt requests takes priority over all other tasks that may be performed by the FIG. 3 controller.

When the interrupt request line 287 goes to the interrupt level, the control program in ROS 128 immediately branches to its transmit interrupt handling routine. In particular, the control program branches to its interrupt handling routine and issues a controller IN instruction for purposes of transferring the oldest pending item in the transmit interrupt queue 104 to the register stack of the FIG. 3 controller. For simplicity of explanation at this point, it is assumed that the oldest pending item in the transmit interrupt queue 104 is the status/line address entry for the communications line 203. This one byte entry has a format of "SSSLLLLL" where S denotes a status bit and L denotes a line address bit. The controller IN instruction takes this status/line address byte from the transmit queue 104 and transfers it via the controller data bus in (DBI) 44 to the R0 and R1 registers in the "on level" register stack 102 of the FIG. 3 controller. More particularly, the output byte from the interrupt queue 104 is transferred by way of DBI 44 and set into the A and B registers 148 and 150 in the FIG. 3 controller. The 4 bits in the A register 148 are then transferred by way of ALU 152 to the 4-bit R0 register in the register stack 102. Then, the 4 bits in the B register 150 are transferred by way of the ALU 152 and set into the 4-bit R1 register in the register stack 102.

Thereafter, an OUT instruction is issued to transfer the line address value in register stack 102 to the controller line address register (CLAR) 38 (FIG. 2) and the scanner line address register (SLAR) 114 (FIG. 19B) by way of the controller data bus out (DBO) 46. More particularly, the interrupt byte in the register stack 102 is set into the A and B registers 148 and 150, 4 bits being set into the A register 148 and then the next 4 bits into the B register 150. The combined value of A and B registers 148 and 150 is then set on the data bus out (DBO) 46 and the controller address, which is the same for both CLAR 38 and SLAR 114, is placed on the controller address bus out (ABO) 41. This causes the 5-bit line address field on DBO 46 to be set into each of the 5-bit CLAR 38 and the 5-bit SLAR 114. The 3-bit status field is not passed to CLAR 38 and SLAR 114 because no wiring is provided between DBO 46 and CLAR 38 and SLAR 114 for these bits.

The setting of the line address for communications line 203 into CLAR 38 (FIG. 2) enables the addressing of the line control block in storage unit 132 for the communications line 203. More particularly, the control program in ROS 128 issues a read instruction, the four higher order bits of which address the LCB area of the storage unit 132. Thus, the line address bits in CLAR 38 are effective to select the particular LCB for communications line 203. The lower order address bits on the storage address bus 206 at the same time select the first byte in the 2-byte data buffer in this selected LCB. This accesses the first data byte previously stored in the LCB data buffer and this data byte is set into the 4-bit R0 and R1 registers in the register stack 100. This is accomplished by way of the storage data out bus 157, the selector 145, the assembly bus 146, the A and B registers 148 and 150, and the ALU 152.

The control program in ROS 128 of the FIG. 3 controller, then issues an OUT instruction for transferring the data byte from the controller register stack 100 to the data register (D REG) 112 in the FIG. 19 scanner. This is accomplished via stack out bus 110, selector 145, assembly bus 146, A and B registers 148 and 150 and the data bus out (DBO) 46. Also, the controller address placed on the address bus out (ABO) 41 for this OUT instruction is set into the function register 110 in the FIG. 19 scanner for providing further control information for the FIG. 19 scanner.

The data byte in the data register 112 of the FIG. 19 scanner is then set into the transmit buffer 115 of the control store 102 at the proper transmit buffer location therein for the communications line 203. This addressing of the proper transmit buffer location is provided by the line address in SLAR 114. Thereafter, this data byte for communications line 203 is transferred to the serializer-deserializer (SERDES) register and is serialized and transmitted out over the communications line 203 in the manner described elsewhere herein.

The next time the FIG. 19 scanner needs a bit of data for the communications line 203 (when transmit buffer is emptied), it will be taken from the second byte in the LCB data buffer of the communications line 203 line control block in the storage unit 132. After this second data byte is set into the transmit buffer 115 in the FIG. 19 scanner, a further interrupt request is entered into the transit interrupt queue 104 for the communications line 203, but this time the status field in such request is coded to indicate that more data needs to be obtained from the host processor and put into the controller LCB. When this new interrupt request is honored by the control program of the FIG. 3 controller, the FIG. 3 controller then operates to issue another cycle steal request to the host processor to initiate the transfer of another two-byte data word from the host processor to the FIG. 3 controller (via the FIG. 2 Channel Attachment), such data word being set into the LCB data buffer of the communications line 203 LCB in the manner previously considered.

From the foregoing, it is seen that data to be transferred on the communications line 203 is transferred from the host processor to the line control block data buffer two bytes at a time (assuming the case of word length data transfers). The data is then transferred one byte at a time from the line control block data buffer to the transmit buffer in the FIG. 19 scanner. This process continues until all of the data for the particular OPERATE I/O instruction in question has been transferred to the scanner, serialized and transmitted by the communications line 203. Needless to say, similar operations may at the same time be occurring in a multiplexed manner for one or more of the other communication lines.

SCANNER UNIT TO HOST PROCESSOR DATA TRANSFER

There will now be considered the manner in which data is transferred in the opposite direction, namely, from the FIG. 19 scanner to the host processor to which the PCS apparatus is attached. These are called "receive" operations because the data being transferred to the host processor is the data being received over one or more of the communication lines. In general, as the scanner completes the deserialization of each byte of data being received over one or more of the communication lines, such byte of data is set into the receive queue 108 (FIG. 19C). Each time a byte of data is set into the receive queue 108, there is also set into the receive queue 108 a line address/status byte having the "SSSLLLLL" bit format, the five line address bits "LLLLL" being coded to identify the particular communications line over which the accompanying data byte was received. The "SSS" field is the status field and, in this case, is coded to indicate the existence in the receive queue 108 of a valid data byte which needs to be handled.

For simplicity of understanding, the detailed explanation will be for the case of a particular communications line, for example, the communications line 215, which is assumed to be receiving data from a remote device. It is assumed that the data is being transferred to the host processor in a cycle steal manner and that several data bytes have already been transferred to the host processor for this particular communications line 215.

With this in mind, as the FIG. 19 scanner completes deserialization of a newly arrived byte of data for the communications line 215, such data byte together with the line address and status field for communications line 215 are set into the receive queue 108. At some point in time, this data byte and its line address status byte reach the output stage of the receive queue 108. At some point thereafter, the task scheduler program in the FIG. 3 controller completes any higher priority tasks that may have been pending and then looks at the receive queue 108 to see if it has any work to be done. This is accomplished by sensing the "SSS" status field in the output stage of the receive queue 108. Since the communications line 215 data byte is now in the output stage, the accompanying "SSS" field says that there is indeed work to be done. As a consequence, the task scheduler commences a "receive" operation. In other words, it tells the control program in ROS 128 (FIG. 3) to branch to the microcode routine for doing a receive operation.

As a first major step in this receive routine, the ROS 128 issues an IN instruction to transfer the status/address byte in the output stage of receive queue 108 to the four-bit R0 and R1 registers in the controller register stack 100. This is accomplished by way of the data bus in (DBI) 44, the A and B registers 148 and 150, and the ALU 152.

The next major instruction in the receive routine is an OUT instruction which transfers the 5-bit line address value from the register stack 100 and sets it into the controller line address register (CLAR) 38 (FIG. 2) and the scanner line address register (SLAR) 114 (FIG. 19B). This is accomplished by way of the stack out bus 110, the selector 145, A and B registers 148 and 150 and the data bus out (DBO) 46.

The next major step in the receive routine is an IN instruction to transfer the data byte in the output stage of the receive queue 108 to the R0 and R1 registers in the register stack 100. This likewise is accomplished by way of DBI 44, A and B registers 148 and 150 and ALU 152.

The next major instruction in the receive routine is a store instruction to transfer the data byte in the register stack 100 to the storage unit 132 and to put it in the first byte position in the two-byte data buffer in the line control block for communications line 215. The selection of the appropriate line control block is controlled by the five intermediate order address bits supplied to storage unit 132 by the CLAR 38 via bus 39. The movement of the data byte from the register stack 100 to the storage unit 132 is by way of stack out bus 110, selector 145, A and B registers 148 and 150 and the storage input bus 213. Since this is the first data byte set into the two-byte data buffer for this particular line control block, the appropriate indicator bit in the line control block is set to indicate that another byte of data is needed before a transfer is made to the host processor. The receive routine then signals the task scheduler that it has completed its immediate task.

At some later point in time, the next byte of data has been received by the communications line 215, deserialized by the FIG. 19 scanner, set into the receive queue 108 and worked its way to the output stage of the receive queue 108. At some point thereafter, the task scheduler again looks at the receive queue 108 and notes that there is work to be done, in this instance, to transfer the new data byte for communications line 215 to the line control block for the communications line 215. This is accomplished in the same manner as just described for the previous data byte for the communications line 215, only in this case the new data byte is set into the second byte position in the data buffer in the line control block.

In this case, however, since the LCB data buffer is now full, the receive microcode routine does not terminate but instead performs some additional steps so as to transfer the two-byte data word in the LCB data buffer to the host processor. In particular, two successive sets of READ and OUT instructions are performed for successively transferring the two data bytes in the LCB data buffer to the register stack 100 and then to the cycle steal input data registers 67 in the FIG. 2 channel attachment. The first OUT instruction sets the first LCB data buffer byte into the lefthand CS input data register 67 and the second OUT instruction sets the second LCB data buffer byte into the righthand CS input data register 67. Additional instructions are issued to transfer the main storage address in the communications line 215 slot in the cycle steal address stack 74 to the cycle steal address registers 71 and 73. Also, the out/in indicator latch 209 is set to indicate an input operation for the host processor. The cycle steal request latch 210 is set to place a cycle steal request on the cycle steal request line of the host processor request bus 52.

After acknowledgment of the cycle steal request by the host processor, the cycle steal sequence gates R4 are activated to place the two-byte data word in registers 67 on the host processor data bus 212 and the cycle steal sequence gates 86 are activated to place the main storage address in registers 71 and 73 (the address at which the two-byte data word is to be stored) on the host processor address bus 211. The host processor then transfers the data word on bus 212 to the main storage unit and stores it at the main store address provided by way of the address bus 211. After receipt of the proper acknowledgment signal from the host processor, the control program receive routine notifies the controller task scheduler that it has completed its current task, whereafter the task scheduler determines the next task to be performed by the FIG. 3 controller.

As seen from the foregoing, data is transferred from the FIG. 19 scanner to the appropriate line control block in the FIG. 3 controller one byte at a time. Each time two bytes have been accumulated in the line control block data buffer, such two bytes are then transferred from the line control block to the host processor by way of the cycle steal input data registers 67 in the FIG. 2 channel attachment. This transferring of data from the receive queue 108 to the line control block and then to the host processor continues until all of the data for the particular OPERATE I/O instruction for the communication line 215 being considered has been completed.

Figure 4:
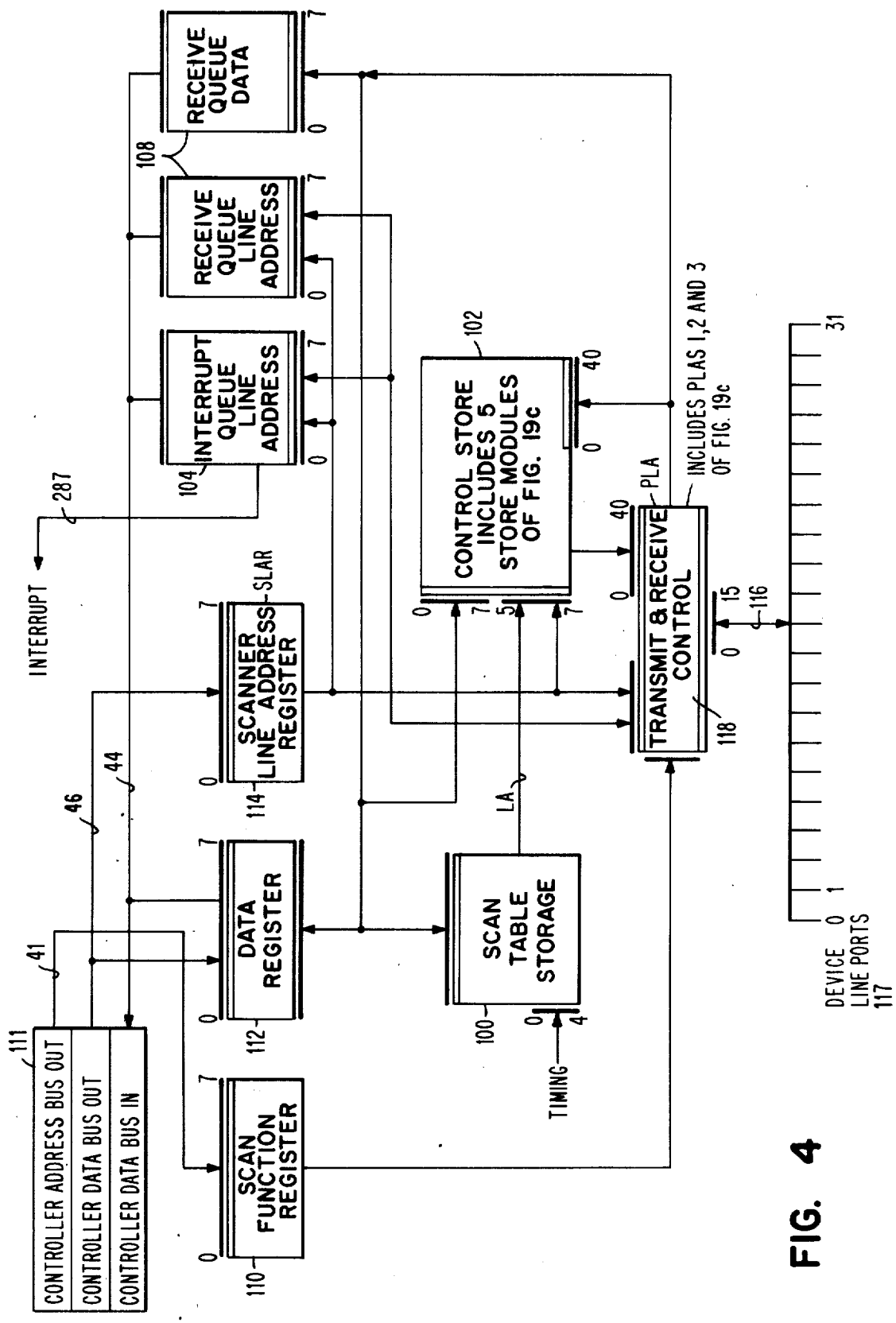
FIG. 4 shows schematically a general picture of the entire scanner of the PCS of the invention and FIGS. 7, 19a, and 19b show in greater detail the components of FIG. 4.

The scanner will now be described briefly, reference being directed to FIGS. 4, 7 and 19. Much of the details of the scanner will be described later with respect to the individual figures. The scanner comprises a scan table 100, a scan table address register 251, a ring 252, a line address gate circuit 253, a control store 102 and transmit and receive control logic 118 in the form of three program logic arrays (PLA) 118a, 118b and 118c.

The control store 102 has a plurality of locations therein, each of which is assigned to one of the communication lines. Each control store location comprises a plurality of fields or registers 101, 103, 105, 107, 109, 111, 113, 115, 119 and 121, as illustrated in FIGS. 19b and 19c. Each of these control store locations, together with the logic 118 controls for its respective communication line the sequence of operations which must be performed in order to transmit data between the communication line and the respective serdes register 119 illustrated in FIG. 19c. It will be appreciated that each of these fields 101 to 121 inclusive are duplicated for each and every communication line coupled to the scanner. The functions performed by each of these control store fields in each of the locations will be described in greater detail below.

For present purposes, however, it will be sufficient to identify the functions of fields 113, 115 and 119. The serdes field 119 acts as a register for holding the character bits as they are being transmitted to a communication line or being received from a communication line. The PLA logic 118 does the actual serialization and deserialization of data transmitted serially by bit over the communication lines and the transfer serially by character from the serdes to a receive queue 108 as shown in FIG. 19c. The transmit buffer field 115 is an additional level of buffering between the respective LCB storage area in the controller store 130 and the serdes field 119.

The CYBITS field 113 stores address or logic selection bits for selecting the specific logic circuits of the program logic array 118 when its respective location in control store 102 is read out. Each time that the location of the control store 102 is read out, its CYBITS information selects the logic for performing desired functions if any are to occur on that particular step. In the event that functions are performed, the PLA logic 118 updates the CYBITS and stores the updated CYBITS back into the field 113 of the corresponding control store location. In a similar manner, other fields such as the bit rate count and timer count are updated as required each time that their respective control store location is read out.

Figure 6:
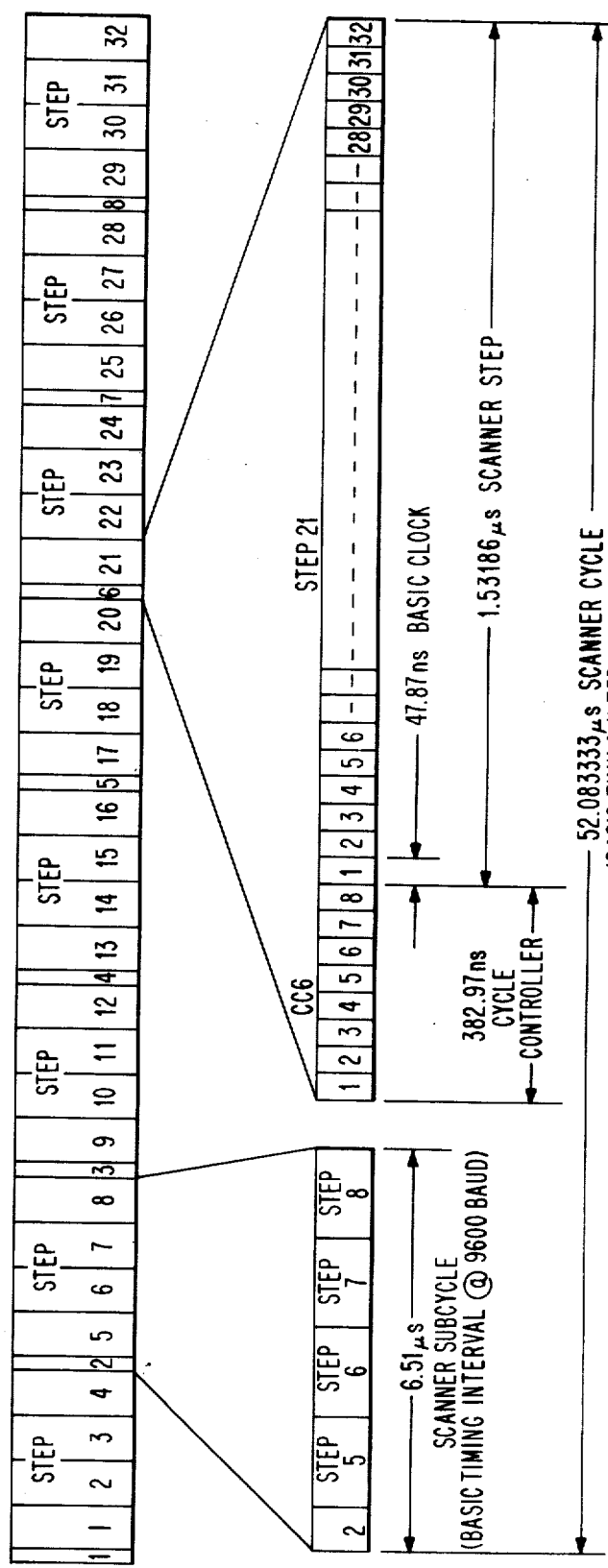
FIG. 6 is a representation of one scan cycle from the scan table.

Accessing of the control store locations is provided by way of line addresses stored in the scanner line address register (SLAR) 114 and in the scan table 100 FIG. 6 illustrates the manner of accessing of the control store 102 alternatively by SLAR 114 and scan table 100 Every fifth step, the controller of FIG. 2 is given access to the control store 102 by using the address in SLAR 114 and the gating circuit 253. The next four steps for accessing the control store 102 are assigned to the line address register 100. When the controller of FIG. 2 accesses the control store 102 to enter data into the control store, the data is provided by way of the data register 112 and the input gates 255a to 255e inclusive of the control store 102. When the controller reads data from the control store 102, the data is transferred back to the controller by way of the gating circuit 256 and the data register 112, again making use of the address in the SLAR register 114. Fields within the control store location are selected by store controls 290 under control of function decode 110.

Whenever the control store 102 and its associated transmit and receive control logic 118 are executing control functions to perform the receive and transmit functions, the addressing of the control store 102 is by way of the scan table 100. In the preferred embodiment, the scan table 100 includes 32 locations each of which is adapted to store the line address for one of the communications lines as well as the control store location corresponding to the communication line. In the preferred embodiment the programmable communications subsystem is capable of handling 32 communications lines through the respective device line ports. As a result, the preferred embodiment of the scan table 100 includes 32 positions of storage, each position capable of storing the address of one of the 32 lines. Similarly, the control store 102 of the preferred embodiment has 32 locations, each of which stores the information associated with the receive and transmit functions for a respective communications line. In the event that fewer than 32 lines are coupled to the programmable communications subsystem, the excess number of positions in the scan table 100 need not be used and the excess locations in the control store 102 will not be used. Attention is directed to the fact that the same five bits in the preferred embodiment are used as a line address, an address into the corresponding position of control store 102 and indirect address bits for accessing the LCD corresponding to the particular line address.

In the typical application, there will be fewer than 32 communications lines. The excess locations in the scan table are then typically used to prioritize the lines for transmit and receive operations. As illustrated in the upper 3 lines of FIG. 6, higher speed lines may be accessed more frequently than the lower speed lines by storing the address of the higher speed line at two or more locations of the scan table. Since the 32 positions of the scan table 100 are accessed each scanner cycle time the particular higher priority line and its associated control store location will be accessed during one cycle as many times as its address is stored in the scanner table 100.

The sequential accessing of the scan table locations is provided by the scan table address register 251 which is incremented each step time to access the line address in the next succeeding scan table position.

Figure 13:
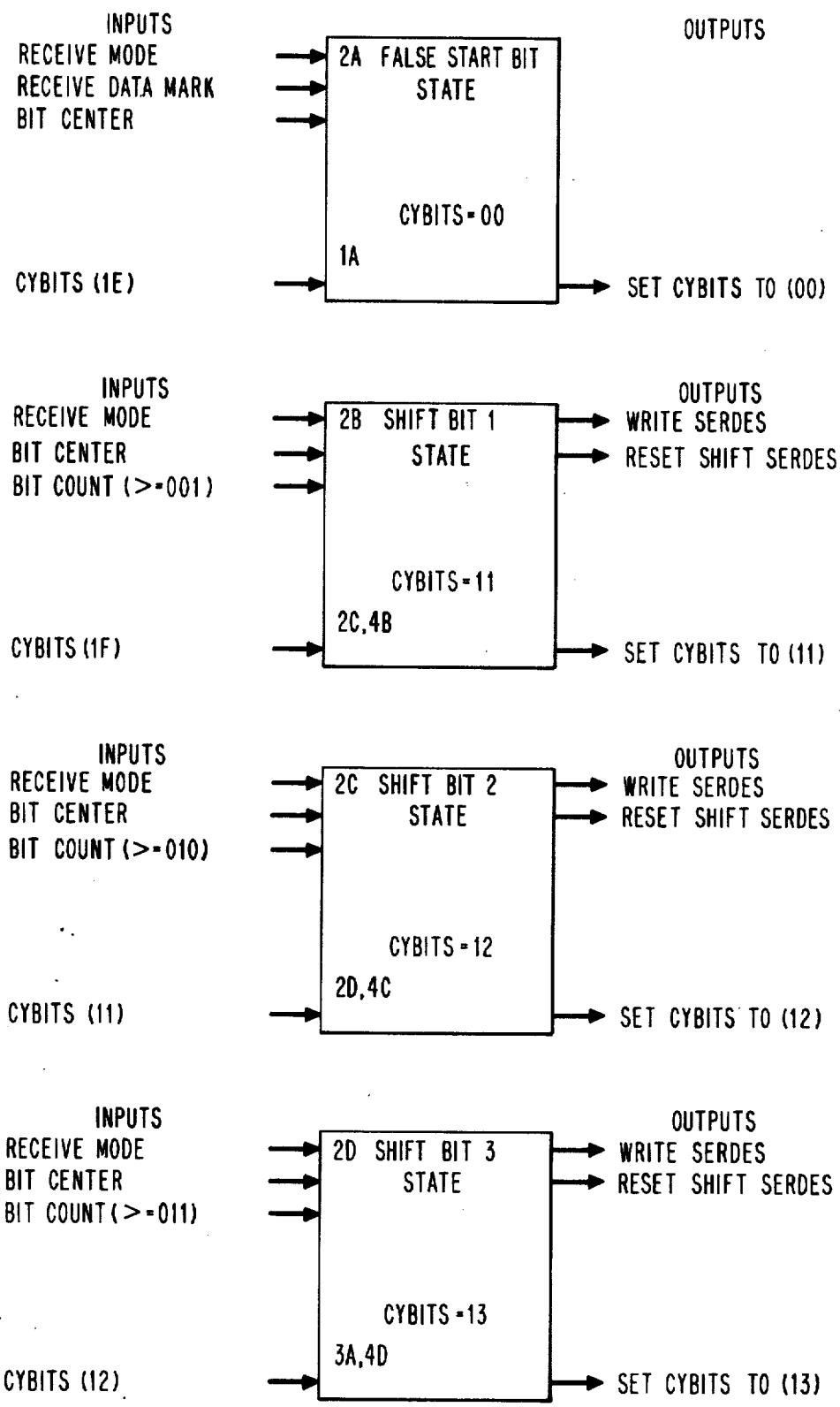
FIGS. 13a to 13i, inclusive, are data flow of the transmit and receive functions performed by the transmit and receive control 118 of FIGS. 4, 7, 19a and 10b.
Figure 13D:
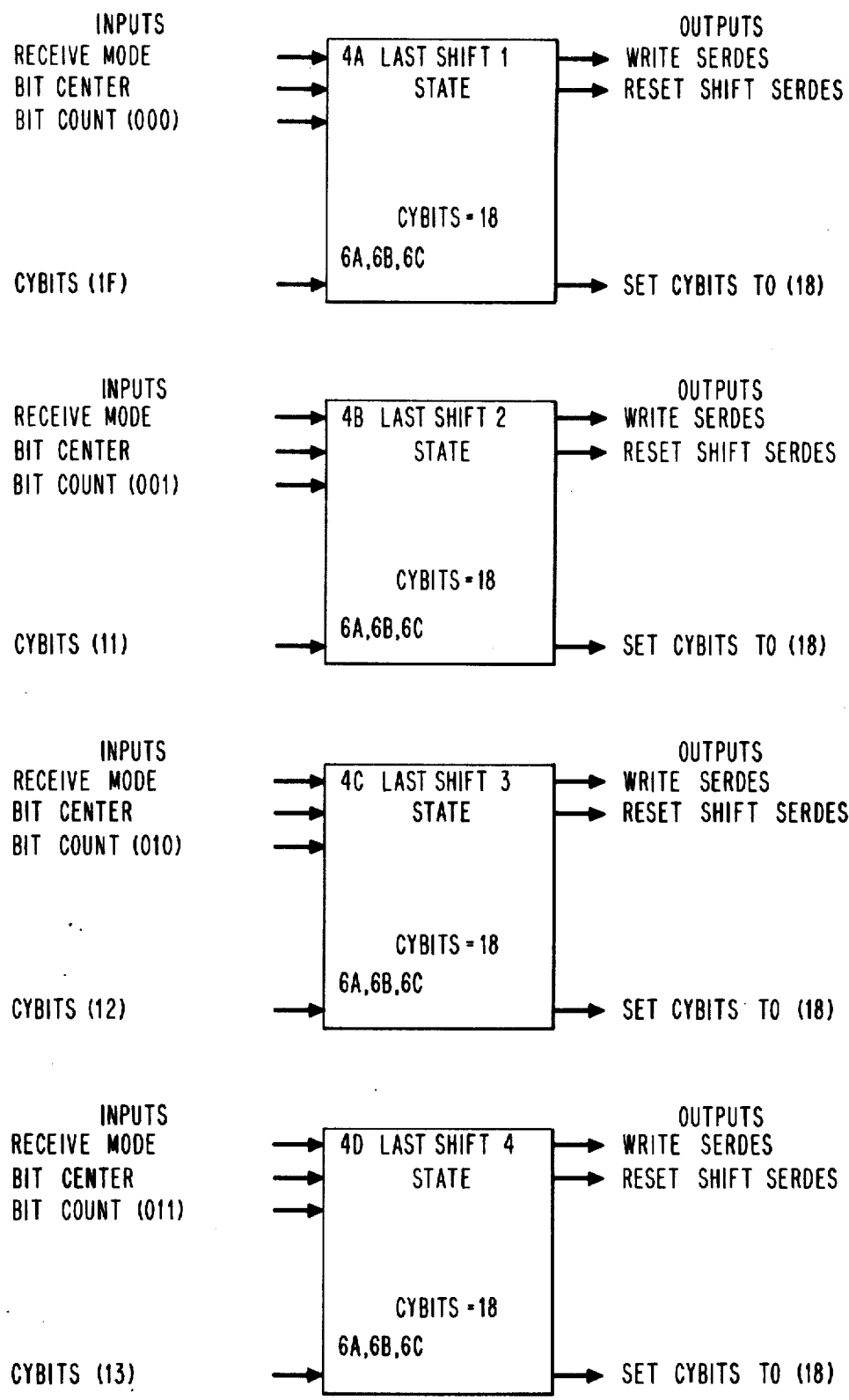
Figure 13E:
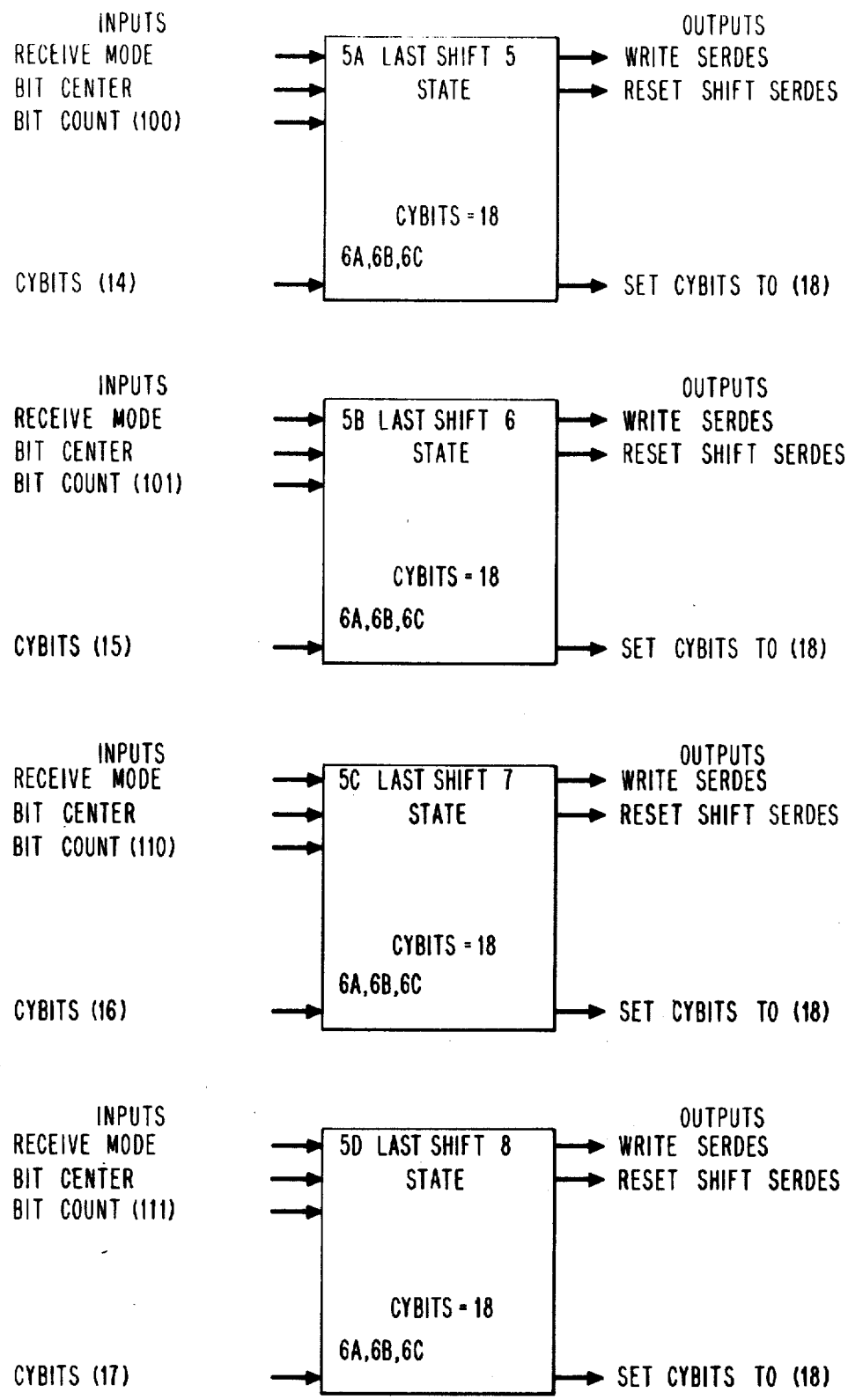
Figure 13F:
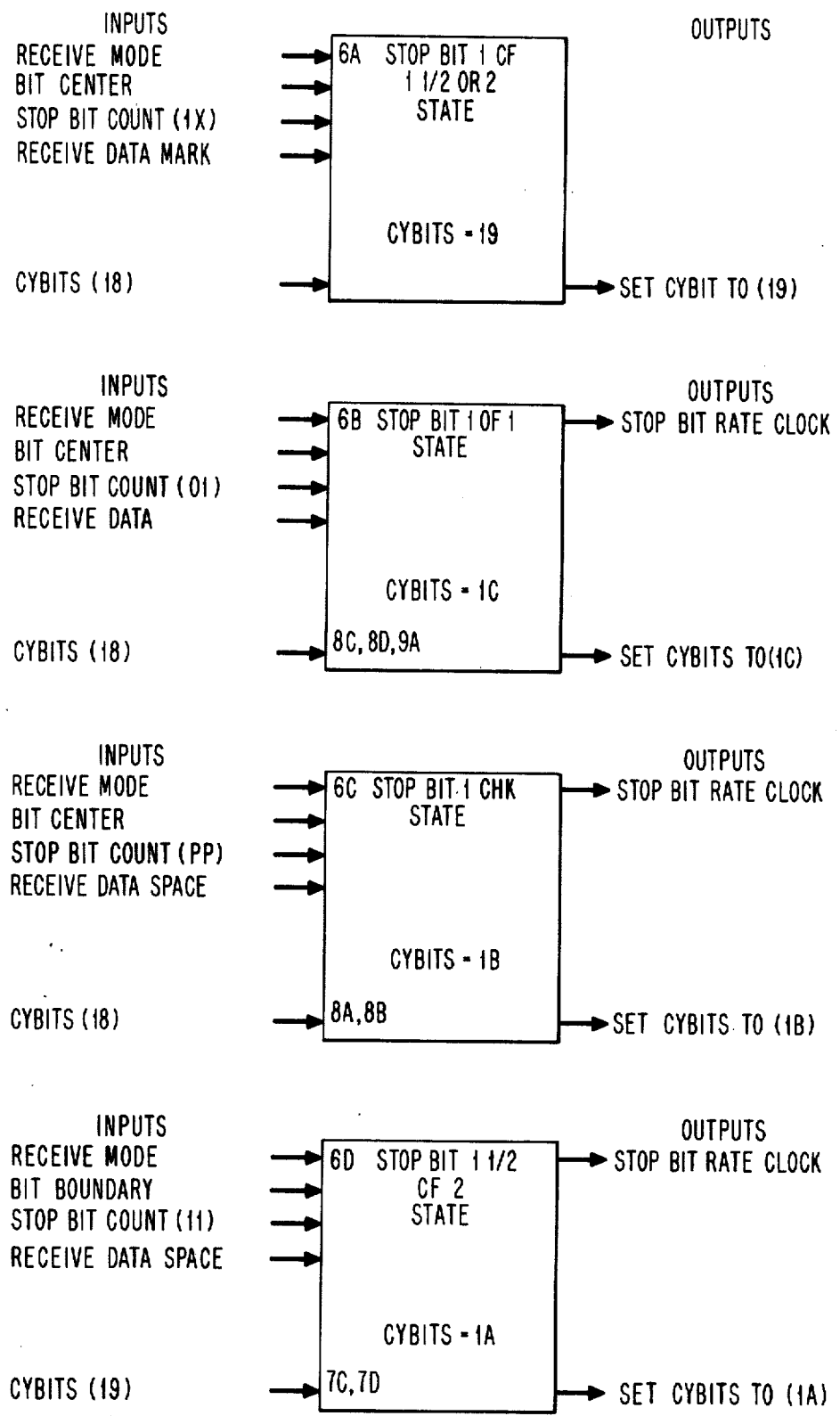
Figure 13I:
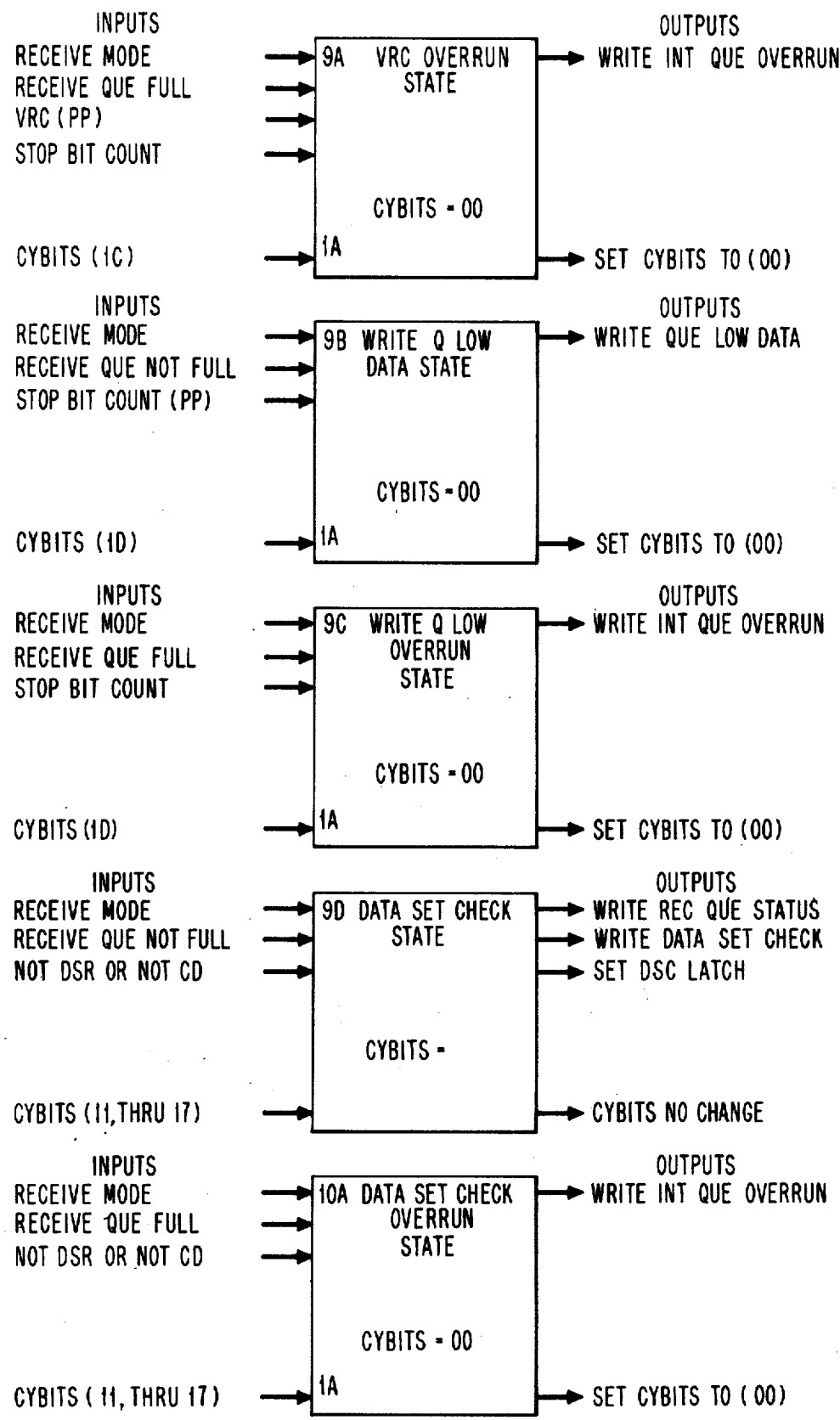

The receipt of a multiple bit character of data into the scanner via line 0 will now be described using the asynchronous receive example of FIG. 13. It will be assumed that the control store location for the line 0 over which data is being received has already been initialized and that its serdes field or register 119 is empty. The control store location will be accessed by the line address register one or more times during each complete cycle of the scan table depending upon the number of times its address is stored in the scan table 100. As will be described in more detail below, each time that the control store location is read out, the transmit and receive control logic 118 will be selected by the CYBITS field of the control store location to perform a next succeeding function. However, the particular functions required for the receiving of data require other control store inputs since data is being received at a much slower than the rate at which the control store 102 is being accessed. Each time that the particular control store location is read out by the scan table 100, the logic 118 will respond to the various timing count and control bits applied thereto until all of the states required to perform a function provide the proper input. At that point in time the control logic 118 performs the function and updates the information in the control store location as required. Each succeeding operation is performed as the input to the control logic 118 are received in the required combination. The inputs and outputs for each operation for receiving asynchronous data is shown in FIG. 13a through 13i, inclusive.

When the CYBITS for line 0 equal 10 and the other inputs, required for the third from top function in FIG. 13a, are present, read out of the control store location for line 0 produces the output "START BIT RATE CLOCK". Logic 118 responds to this signal to set a bit in field 109 of the control store location for reorder the decrementer effective for line 0. During the next read out of the control store location, the bit rate constant in field 101 is transferred to bit rate count field 103. Each succeeding read out of the control store location by scan table 100 decrements the bit rate count by one until the count reaches zero at which time a "BIT CENTER" pulse is produced, indicating that the start bit of received data is available. The last function block of FIG. 13a is executed, resetting the Serdes field 110 and setting the Serdes shifter in logic 118.

During succeeding readouts of the control sotre location the bit rate count field 103 is set by the constant field 101 and decremented to zero; the first zero condition indicating a bit boundary, the second a bit center for the first data bit. The function in FIG. 13b with a CYBITS 1F input is ready for execution.

The first receive data bit is now available via port 0, receiver 275-0, gate 276-0, bus 277, register 174 and bus 175, and is applied to the receive data line 260 of the control logic 118. It is gated into the serdes shifter 120. Depending upon the type of data being received as defined by the line definition field 121 of the respective control store location (input BIT COUNT (>=001), the first receive data bit is shifter by the shifter 120 and inserted into the appropriate bit position of the 8 bit serdes field 119 of the respective control store location. The line definition field 121 permits characters having from 1 to 8 bits. Assuming for purposes of this description that an eight bit character is being received, the control store location corresponding to line 0 over which the data is being received will be accessed cyclically as illustrated in FIG. 6 until such time has passed that the next receive data bit is detected at the communications line port 0 and transmitted again via the receive data line 260 to the serdes shifter 120. During this interval of time, the bit rate count has been initialized twice and decremented to zero. However, when the receive data is available on the line 260, the appropriate timing and control signals including CYBITS 11 input (FIG. 13b) are available for the control logic 118 to transfer the next data bit into the shifter 120. At the same time the first bit which has been stored in the serdes is also in the serdes shifter 120. The shifter 120 is controlled to shift the both data bits into the proper bit positions of the serdes shifter from which they are transferred to the serdes field 119 of the particular control store location. In a similar manner, the next six bits are entered into the serdes shifter 120 properly positioned and then transferred to the serdes field 110. Succeeding access of the control store location will perform the succeeding steps as the input data conditions are met to write the status and line address into the receive queue 108 and then to write the received character into the receive queue. The data is transferred from serdes field 119 via the control logic 118, bus 252 and gate 263 into the receive queue 108. The serdes field 119 of the particular control store location is reset preparatory to receiving the next succeeding character.

At the same time that the newly received data is being transferred from the serdes field 119 to the receive queue 108, the queue controls 264 transfer to the receive queue 108 status bits which identify the type of data which has been transferred into the receiver queue. For example, this data might be message data, status data or control word data. Also, at this same interval and time, the output of the line address which has been gated through the gate 253 is entered into the receive queue 108 by way of a bus 266 and a gate 268. Thus, the entry stage of the receive queue has stored therein three types of data, the status bits which indicate the type of data, the line address that the data was received from the data itself. This information is moved by the queue 108 toward its output stage for subsequent transfer to the DCB assignment to line 0.

Under program control, the controller transfers the data, line address and data type to the hardware registers of the controller. The line address is transferred to the CLAR register 38 and the data character is transferred to the LCB assigned to line 0. When an event such as the receipt of an end of transmission character for a particular line is stored in the receive queue 108 and subsequently transferred to the controller, the controller detects this character and inserts a unique plug character and the line address into the queue 108 via SLAR 114, D register 112 and gates 268, 263.

The controller invalidates and discards any characters for the particular line entered into the queue 108 between the end of transmission character and the plug character.

The receive queue 108 of the preferred embodiment is in the form of a continuously running parallel shift register of known construction which moves data from its input stage to its output stage in a time period shorter than the time required by the controller to gain access to the output stage. Succeeding entries are stacked in stages following those storing preceding entries. As each entry is removed from the queue 108, succeeding entries are advanced toward the output stage. The queue 108 also includes hardware indicating the empty or non-empty condition of the queue 108.

The transmit interrupt queue 104 is of similar construction.

The transmission of data by the multiplexer from the control store 102 to the port for line 0 will now be described. The accessing of the locations in control store 102 by the scan table 100 and by the controller via the SLAR register 114 is essentially the same as that which was described with regard to the receipt of data. Specifically, during one cycle time of the scan table each of the addresses in scan table 100 will be accessed in sequence to select locations in the control store 102 for performing selected operations. These accesses of control store 102 will be interleaved with controller accesses as illustrated in FIG. 6.

Transmit functions are similar to those described for receive functions except that the bit boundary signal instead of the bit center signal are used to time each bit transmission.

For purposes of this description, it will be assumed that the transmission of data from the controller to port 0 associated with line 0 has already been initiated and that at least the first two characters intended for transmission will have been stored in the serdes register 119 and the transmit buffer 115 of the control store location assigned to port 0. The scan table 100 will be accessed cyclically to continuously read out locations from the control store including the location assigned to port 0. Each time that this location is accessed, the character stored in the serdes register 119 of the location will be transferred to the logic 118. After initial functions have been performed, the first bit of the character in the serdes 119 of the respective location will be ready for transmission. The next time that the control store location is read out and the character transferred from the respective serdes 119 into the logic 118, the first bit of the character will be transmitted to the port 0 by way of the serdes shifter 120 (FIG. 7), the transmit data line 171 (FIG. 19C), the device controls 116 (FIG. 19B), the output line 177 of the control 116 to the transmit latches 270-O to 270-N (FIG. 19A). At the same time, a transmit data gate (TDG) is also issued out of the logic 118b of FIG. 19C to the transmit data gate line 173, through the device controls 116 to the transmit latches 270-0 to 270-N. The receipt of these two signals will prepare the transmit latch 270-0. At the same time, the address of line 0 which appears at the output of the gate circuit 253 of FIG. 19B will be applied to the address decode circuit 280 of FIG. 19B. The output 285 of the address decode circuit 280 is applied to all of the device decodes 271-0 to 271-N of FIG. 19A. Since the address of line 0 was applied to the address decode circuits 280, only the device decode circuit 271-0 will be rendered effective to apply an output signal to the transmit latch 270-0. Therefore, only the transmit latch 270-0 of line 0 will be set if the bit transmitted is a logical 1. As long as the latch 270-0 is held in the set state, it applies and output bit signal to the line driver 272-0 for line 0. This signal will not be removed from line 0 until the transmit latch 270-0 is set or reset when the next character bit is transmitted.

Figure 7:
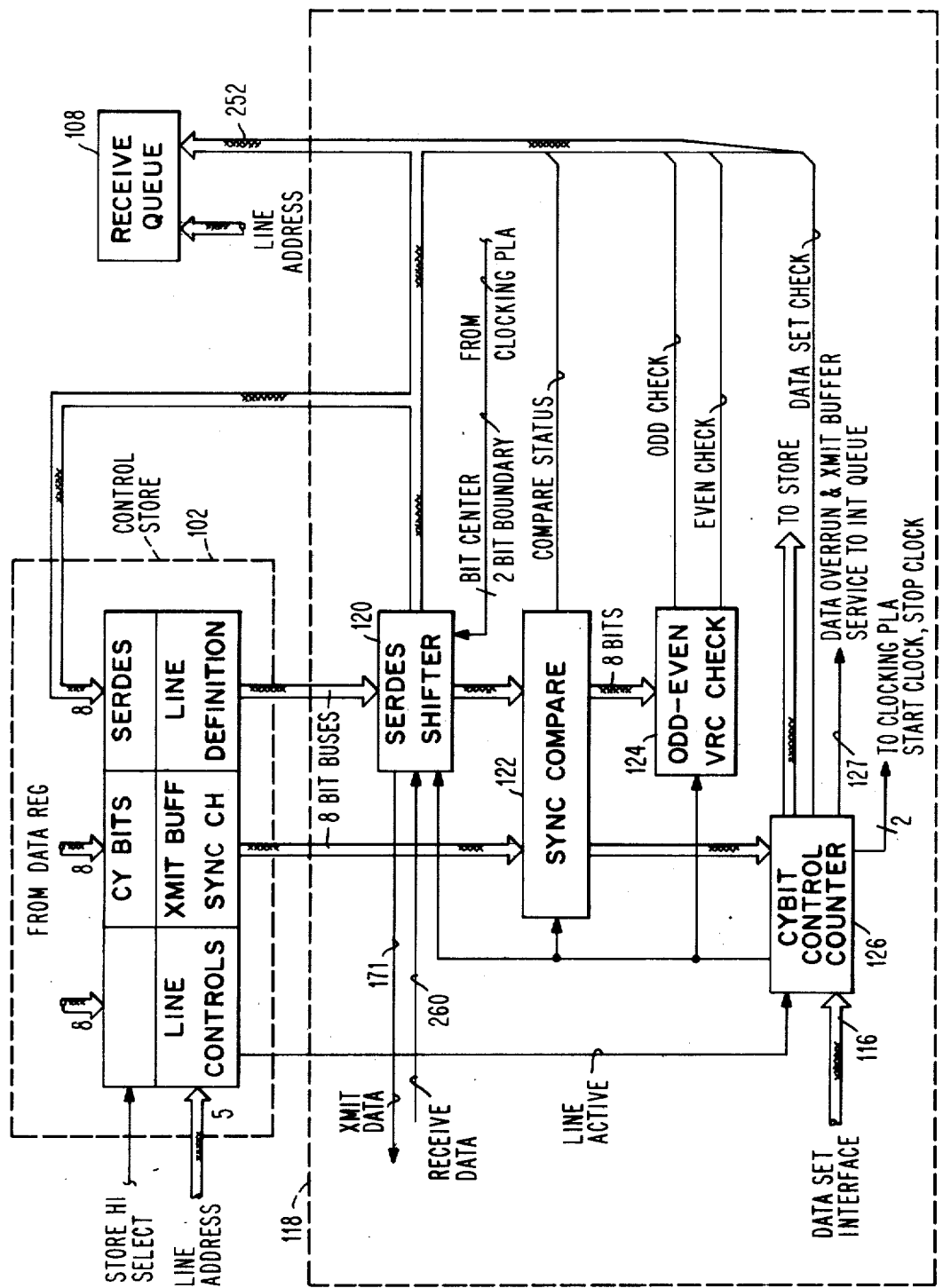
Figures 12, 18:
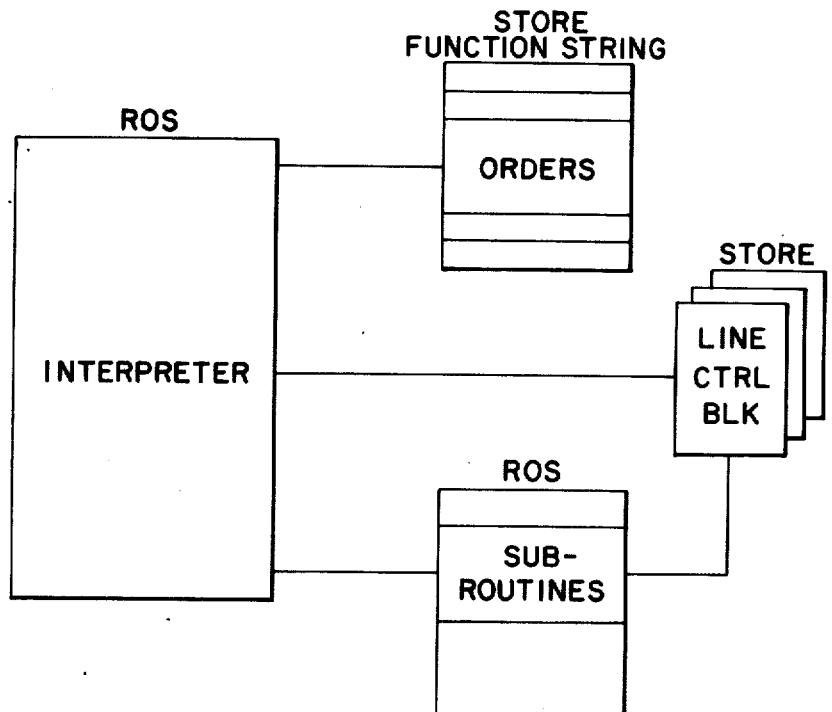

As in the previous description with respect to a bit receive operation, the line definition field 121 of the particular location in control store 102 associated with line 0 applies appropriate controls to the serdes shifter 120 in FIG. 7 for determining how many bits are in a character and the direction in which bits should be transmitted, that is from the lowest order bit to the highest or vice versa.

In a similar manner, each of the remaining bits of the character in the serdes 119 will be transmitted to line 0 until all of the bits in the character have been sent. At this time the logic 118 is effective for transferring the next character, to be transmitted from the transmit buffer field 115 of the location in control store 102 assigned to line 0, into the corresponding serdes field 119.

At the same time, the logic 118 transfers line address 0 from the output of the gate circuit 253 of FIG. 19B to the transmit interrupt queue 104 of FIG. 19C by way of its output bus 266 and gate 268. The queue controls 264 also cause the interrupt type data to be entered into the transmit interrupt queue 104 by way of bus 127. The interrupt queue 104 now has stored in the entry stage thereof the line address zero and the interrupt type which is being requested. As in the case of the receive data queue 108, the interrupt queue 104 is in the form of a continuously running parallel shift register which moves data from the lowermost input position thereof to the uppermost output position therein. The time required for this operation is very short in relation to the time that the controller executes one cycle of operation. The transmit interrupt queue 104 also includes a hardware mechanism for indicating the empty or non-empty condition thereof. With the line 0 address and its interrupt type entered therein, this hardware produces an output interrupt signal on line 287 which is coupled to the control circuitry 134 in FIG. 3A. The control 134 causes the controller, at the conclusion of the execution of the current microprogram word execution, to force a hardware interrupt to a subroutine which is used for handling the data transmission function.

This routine will read the transmit interrupt request data which comprises the address of line 0 and the interrupt type from the queue 104. As mentioned above, the speed with which the queue moves data from its entry location to its output location is faster than the time within which the controller can gain access to the output position of the queue 104. Under control of this routine the controller will transfer the line address into its hardware registers and then into the CLAR and SLAR registers 28 and 114. The controller will then access the LCB assigned to line 0 making use of the line address in the CLAR register as a part of the addressing mechanism. A byte of data intended for transmission over line 0 will be transferred from the LCB in the store 132 in FIG. 3B to the data register 112 in FIG. 19B. Under program control, the controller sets the functions decode register 110 with control information which will cause a transfer of the data in the register 112 into the transmit buffer 115 of the location in control store 102 assigned to line 0 when the controller next gains access to the control store 102.

The SLAR register 114 is used for selecting the correct location in the control store 102 for this function.

Returning to the portion of this description at which the next character to be transmitted was shifted from the transmit buffer field 115 to the serdes field 119, the other operations associaed therewith will be described. It was mentioned earlier that during any one complete scan of the control store locations by the scan table 100 only one transmit request could be made. This is achieved by setting a suitable inhibit latch (not shown) in the queue controls 264 to inhibit further transmit interrupt requests until the scan address register 251 is again set to the address of the first position in scan table 100. At this time the inhibit latch in the queue controls 264 is reset by the ring 252 to permit further interrupt request to be handled.

Accessing of the locations in control store 102 continues in cyclical fashion and each of the bits in the character stored in the serdes register 119 associated with line 0 is transmitted out under control of the bit rate count, the line definition field and the CYBITS field 113.

The PCS of the invention has for its primary objective to allow users to attach a large variety of communications devices; for example thirty two communications devices, to the Series 11 computer system. The Series/1 computer system is disclosed in U.S. Pat. NO. 4,047,161, granted Sept. 6, 1977 to Michael I. Davis, assigned to the assignee herein.

The central processing unit, CPU, of the Series/1 computer system informs the printer, disc or MLCA connected thereto, to start the function that it is designed to do, whether it is to print data from the printer, read or write data on the disc, etc.

Referring to FIG. 1, the Channel Attachment (FIG. 2 of the PCS) is connected to the I/O bus of the Series/1 computer system through an interface, not shown, but disclosed in U.S. Pat. No. 4,038,641 granted July 26, 1977, and also assigned to the assignee herein. In effect, the Channel Attachment is the hardware necessary to interface the novel PCS of the invention to a well-defined I/O (input-output) channel. The controller (FIG. 3) in the PCS is subservient to the CPU and is informed by the CPU to start receiving or transmitting on one of the thirty-two lines connected to the programmable scanner (FIG. 4, 7, and 19) in the PCS. The PCS remainds inactive until started by a command from the CPU. This command triggers the PCS to pass information from the I/O line to or from one of the thirty-two paths connected to the scanner. The requirements for the PCS Channel Attachment satisfied by the present invention are:

1. It accommodates up to 32 device address (or lines)
2. It enhances operation in the area of initiating interrupts or a cycle steal operation from the controller.
3. Provides a cyclic redundancy code generator/checker peripheral for the controller (not specifically part of the Channel Attachment).
4. Provides logic to interconnect the controller to a hand-held console at the PCS card file (again not specifically a part of the Channel Attachment equipment).

In satisfying the foregoing requirements, the invention makes obsolete the need to use multiple modules doing substantially the same function.

The Channel Attachment (FIG. 2) of the invention includes the following major components: Domain, location and ID bit fields 10, 12, and 13 respectively. The domain bits establish the number of addresses in a continuous block of addresses for the PCS. One of four domains specified by the bits can be selected; 4, 8, 16, or 32 device addresses, thereby leaving the unused device addresses available for future use or expansion. Three domain bits are available; D8, D16, and D32. If a bit field of 000 is specified, a domain of 4 is selected by default. The location bit field of block 12 defines the precise placement of the block of addresses or domain size within the address space. The I/O space available to the Series I CPU is 256 addresses, i.e., there are 256 address spaces.

The comparator 14 in the PCS Channel Attachment compares on a bit-to-bit basis. There are data flow inputs to the address compare circuit from the domain, ID, and location bits fields as well as the Series/1 address bus. If the two field inputs are identical, then the electronic output from the comparator is a "ONE" and this output informs the Channel Attachment of the PCS that there is an I/O command from the CPU directed to the PCS. The domain and location bit fields are compared in the comparator 14 against the I/O command device address coming from the CPU and makes a decision whether or not the I/O command is directed toward a particular device within the PCS. If the location and domain both conform to the desired address, then the comparator produces an output "ONE" (select signal) which enables the circuitry to register the accompanying interface signal for an interpretation by the controller (FIG. 3). The controller will then read in the data associated with the I/O command and act appropriately.

The ID bit field 13 allows the Channel Attachment to be configured to present the Series/1 designated identification of the PCS controller/Channel Attachment feature when a Read-ID OIO is executed to a device address within the domain of the feature on the channel.

The domain bit field. In the case of multiple device address Channel Attachment system configurations which arise that require less than the full span of possible addresses, then the range, or domain of the addresses the Channel Attachment recognizes, must be adjusted for conservation of the valuable I/O address space within the channel. The domain allows this in the PCS Channel Attachment. The Channel Attachment may be set to recognize four ranges of device addresses:

One to four addresses (1–4)
Five to eight addresses (5–8)
Nine to sixteen addresses (9–16)
Seventeen to thirty-two addresses (17–32)

The domain is specified to the logic via three bits, designated domain 5-8 bit, domain 9-16 bit, and domain 17-31 bit. Actual domain-to-bit configuration is:

| Bit 17-32 | 19-16 | 5-8 | Actual recognized domain |
|---|---|---|---|
| 0 | 0 | 0 | Four addresses |
| 0 | 0 | 1 | Eight addresses |
| 0 | 1 | 0 | Sixteen addresses |
| 1 | 0 | 0 | Thirty-two addresses |

The translation logic 20 between the domain bit field and the Read ID gate 22 onto the Series/1 channel data bus translates the above configurations into a three bit field which reports the domain in the ID as a binary encoded power of two. That is, if the domain is 4 addresses, the field is B'1010. For all combinations

| Domain Bit | 17-32 | 9-16 | 5-8 | Reported domain in ID word, Bits 5-7 |
|---|---|---|---|---|
| | 0 | 0 | 0 | 010 |
| | 0 | 0 | 1 | 011 |
| | 0 | 1 | 0 | 100 |
| | 1 | 0 | 0 | 101 |

Since the parity of the byte 0 of the ID word depends on the number of 1 bits in the ID byte, and the number of 1 bits depends on the domain, maintaining odd parity requires following the rule of thumb that says if the domain is 4 or 16 addresses, specify the parity bit for byte 0 of the ID for a 1, and for a 0 otherwise.

The location bit fields 12. The Series/1 has a total range of 256 I/O device addresses, and the various attached devices must be distributed in this address space for each to have a distinct device address. In the case of the PCS, with the variable domain as described above, the location bit field is used to specify the base address in the range recognized by the Channel Attachment with its specific configurations. Six bits are necessary to completely specify an 8 bit address when 2 are "Don't-Care", as in the case of domain =4. When the larger domains are specified, more bits of the address become "Don't Care" and less of the location bits are necessary to make up the total address specification (when the address bits are referred to as "Don't-Care", that means in the sense of whether a particular 8 bit device address is within the valid range of a particular PCS with a particular domain and location bit configuration. Thus, domain significant location bits 4 addresses six (address bits 0,1,2,3,4,5)
8 addresses five (address bits 0,1,2,3,4)
16 addresses four (address bits 0,1,2,3)
32 addresses three (address bits 0,1,2)

If other than the significant location bits are specified, in the case of the higher domains, they will be ignored in the hardware, and the decision of whether the Series/1 device address is within the PCS area of recognition (as specified in the doamin and location bit fields) will be made only on comparison of the significant location bits for a particular domain.

The device address compare circuit 14. This block of the data flow inputs the doamin and the location bit fields, as well as the Series/1 address bus, bits 8-15. These bits contain the device address bits(8) during an OIO sequence, and this block makes the decision whether the OIO device address (DA) is directed to the PCS or not based on the particular configuration of bits. If the decision is "yes", this DA is within the PCS domain. A signal called card select is raised to other logic to indicate selection via the channel. The other function of this block is to translate the bits of the DA previously called "Don't-Care", into the 'Relative Device Address' (RDA) for indication to the rest of the logic and the controller. The RDA is a 5 bit field with absolute unsigned binary range of 00000 to 11111 which is the PCS internal address of which line is represented by the Series/1 DA. Regardless of the specified domain, a PCS will always have a RDA of 00000, 00001, 00010, and 00011. This is true even if the domain is 4 and the location bits place the range of 4 at, for instance, a DA of HEX 5C (0101 1100). Without translation, the internal PCS addresses would be 11100, 11101, 11110, and 11111. This would appear to the controller (FIG. 3) as the upper four addresses out of the total possible range of 32, even though only 4 devices are active. When the domain is 32 adresses, no translation is necessary since the 5 low order bits of the Series/1 DA exactly equal the RDA within the PCS controller (FIG. 3).

The prepare level register 16. This four bit register holds the bits 11 to 14 of the prepare OIO command data which represents the interrupt level, binarily encoded, on which the CPU wants any of the prepared lines to interrupt. Since there is only one register for all 32 potential lines, all are prepared to interrupt on the same level. Whether any particular line can interrupt is further controlled on a line-by-line basis as described below in the description of the I-bit latch 18. The prepare level register is set on any prepare command to a valid DA within the domain of the PCS.

The control block 22. This block contains all of the logic relative to the Channel Attachment functions. Most of the control lines to the blocks shown in FIG. 2 come from this area. The path shown to the controller DBI (Data Bus In) represents the status latches read into the controller with an IN command to controller I/O address X'10'. The lines exiting to the Read-ID gate 22 and the prep level register 16, and the IDCB-word one register 24 are representative of many others throughout the logic flow.

IDCB word 0, byte 0 register 24. This 6 bit register holds bit 2 through 7 of the Series/1 address bus for the controller to read as the specific function definition of an OIO command to one of the PCS addresses. The 6 bits of data are registered upon selection during an OIO and at data strobe time. Byte 0 of the IDCB word 0 is fully defined in the Series/1 documentation and will not be explained here except as it applies to the PCS hardware functioning. Bits 0 and 1 of the byte are not registered as bit 0 is always not on if the OIO is device-directed (not channel directed), and definition of the PCS allows for bit 1 to be 1 only (write).

One IDCB word 1 byte 0 register 24. This 8 bit register holds bit 0 through 7 of the Series/1 data bus for the controller to read as the high order byte of the second word of the IDCB associated with the OIO. In the PCS, since start OIO commands are the only allowed commands (that the controller sees) the second word of the IDCB always contains the address of the DCB to be fetched by the controller.

The IDCB word 1, byte 1 register 26. This 8 bit register holds bit 8 through 15 of the Series/1 data bus for the controller to read as the low order byte of the second word of the IDCB associated with the OIO. In the PCS, since start OIO commands are the only allowed commands (that the controller sees) the second word of the IDCB always contains the address of the DCB to be fetched by the controller.

The 5 to 32 decoder of the device address 28. This circuit element is in the store module and serves to select one of the thirty-two latches within 30, 32, and 18 in either the device reset 30, busy 32, or I-bit latch stacks 18 as a function of the latched device address for a particular OIO. The domain enters the element for conversion of the device address to the relative device address.

The device reset latches 30. This stack of 32 latches, one for each of the possible lines in the PCS, serves to register on a per line basis the occurrence of a device level reset. This reset clears any busy condition or interrupt condition for the address line and remains latched for reading (and reset) by the controller (FIG. 3) for the line reset actions to be taken in the microcode. For the device reset latch N:

Set=(RDA N) (Halt device) (Data strobe)
Reset=((Controller sense strobe) (CLAR bits 01=\*\*)+Halt I/O+machine check+system reset'+POR
\*\*=00 for N=0 to 7, 01 for N=8 to 15, 10 for N=16 to 23, 11 for N=24 to 31.

The busy latches 32. This stack of 32 latches holds the device busy condition for each of the potential lines within the Channel Attachment. The latches are used to respond, via hardware 34, when an OIO is directed to a device within the domain of the PCS (as registered in the compare block). When the RDA=N for an OIO and device N busy latch is set, a signal called "any-device-busy" does to the condition code generation block 34 to report busy to the OIO within the time of command. The setting of the busy latch is also a requirement for the controller to set interrupt request for Device N. For the busy latch N:

Set=(RDA N) (Start of Channel Attachment busy)
Reset=(Device reset device N)+Halt I/O+machine check+POR+system reset+(Int reg dev N) (Int service gate) (Not PCI)

The I-Bit latches 18. This stack contains 32 I bits for each of the lines within the PCS. The I bit is in Bit 15 of the prepare word, and is used to control interrupt requests on a device basis. If the I bit is 0, a device may not interrupt, and if the bit is on, the device may. The I bit is the ultimate mask of the request onto the interface of the channel, and a prepare command to a device with an interrupt request on the channel with bit 15=0 will cause logical removal of the request. This condition will cause setting of a latch which will inform the controller that the interrupt request for the device last requesting was not concluded, and that it must be represented at another time when the I bit is on for that device. If a device is unprepared, the interrupt request latch 36 will still be set for that device if it was on. When the end of the interrupt service time for any ensuing interrupt request that made it to conclusion occurs, all request latches that are on will be reset. Use of the unprepared-while-requesting latch will keep the controller up with the state of the individual requests. For the I-bit latch N:

Set=(RDA N) (Prepare Command) (Data bus bit 15=1) (Data Strobe)
Reset=(RDA N) (Prepare Command) (Data bus bit 15=0) (Data Strobe)+POR+System Reset The CLAR 38. The Controller Line Address Register (CLAR) is used by various elements within the Channel Attachment as an indication of the device (or line) the controller is addressing. There is a duplicate copy of the CLAR 38 in the scanner which is set from the bits 3 to 7 of the controller data bus out which serves the same function.

The interrupt request latch stack 36. This stack of 32 latches gives a latch for each of the lines to present an interrupt request onto the channel. To set any one, the controller sets the line address in the CLAR which is decoded into 1 of 32 by the 5 to 32 decoder 29. The controller issues the particular out instruction to set the desired type of interrupt (PCI, controller end, or device end interrupt, as further defined in the interrupt ID). The latch is set and is the logical condition for which that type of interrupt is met. For the interrupt request latch N:

Set=(RDA N) (Set Int Reg) (Device N Busy)+(RDA N) (Set PCI+Cont End)
Reset=(Interrupt Service Gate)+Halt I/O+Machine Check+POR+System Reset+Device Reset Device N The controller address decoder 42. This block is a decoder of the controller I/O addresses from bus 41 used within the Channel Attachment. The addresses are found in the I/O list included herein. The combinatorial decode of the addresses serve as a gate of the input data onto the controller DBI (Data Bus In) 44, and the decode added with the controller strobe serves as a strobe signal TC latch data off the DBO 40. The scanner (FIGS. 4, 7, 19 a and b) also receives the controller address bus and there is a similar decode block to decode another set of I/O addresses used within the scanner.

The cycle steal status register 46. This 4 bit register latches the 4 status bits off the Series/1 channel status bus at the end of a cycle steal operation. These bits are available for the controller to determine the ending status of the cycle steal along with some other Channel Attachment status (IN X '15').

The 4 to 16 decoder 48 and level compare block 50. This element of the Channel Attachment presents the interrupt request out onto the proper line of the interface request bus 52. The request bus has 17 lines: 16 for the total possible number of interrupt levels and 1 for the cycle steal request. When an interrupt request for any device is set, the request goes onto the proper line of the request bus 52 as a function of the level latched in the prepare level register 16. When the channel polls the devices on the channel for interrupt service, a comparison is made between the poll ID bus 54 4 bits and the requesting level for an interrupt poll capture sequence. There is a capture sequence for cycle steal also, but not on a priority level structure. In this case, all devices request 'On the same level' and the poll is captured by the device nearest the channel source of the poll signal with a cycle steal request pending.

The cycle steal key register 56. This 3 bit register receives the key from the controller prior to a cycle steal request going onto the channel. The key is gated onto the condition code bus (3 bits) of the channel following a cycle steal poll capture by the Channel Attachment to accompany the cycle steal address and the data, if an inbound operation.

The interrupt condition code register 58. This 3 bit register gets the interrupt condition code from the controller prior to the issuing of the interrupt request for a particular device (as specified in the CLAR). The condition code is gated onto the channel condition code bus 60 in the service time following the interrupt poll capture sequence.

The condition code generation block 34. This logic element outputs three bits onto the condition code bus as per this table:

| Output | Condition or Time |
|---|---|
| CS Key | Cycle steal sequence |
| Int CCI | Interrupt sequence |
| 001 | Addressed device busy |
| 010 | Exception |
| 110 | Controller (Channel Attachment) busy |
| 101 | Interface data check |
| 111 | None of the above conditions |

The interrupt ID register 62. This 16 bit register receives two bytes of data relative to the following interrupt request from the controller. The word is gated onto the data bus of the Series/1 channel during the time following the interrupt poll capture by the Channel Attachment.

The two bit latch to the indicators 64. This 2 bit register is loaded from the controller DBO, bits 6 and 7, on an out address of X'1D' to the PCS file. These two indicators are used on bring up of the microcode to show the state of the bring up.

The parity check/generate element 66. This logic element is a 16 bit wide parity tree which has an input either the Series/1 data bus or the output of a multiplexer looking at the cycle steal data in of the interrupt ID. When an OIO is directed to the PCS via the Channel Attachment and the second word of the IDCB in on the data bus, the tree forms a parity signal which is used to indicate good or bad odd parity on the bus. When the Channel Attachment is gating data onto the data bus, during a CS input operation or during an interrupt sequence, the tree generates parity by byte for presentation to the channel. Whichever source is inputted for generation or checking, the other is not active so as not to interfere.

The cycle steal input data register 67. This 16 bit register holds the inbound data from the controller until the requested cycle steal (to the CPU of Series/1) is honored with a poll sequence, and the data is gated onto the data bus.

The cycle steal output data register 68. This 16 bit register receives the outbound data to the device from the CPU on a cycle steal sequence requested with the input indicator to the channel off. The data is registered for reading into the controller when the request is no longer active as reported to the controller in the status.

The console control logic 70. This logical element attaches the hand held console 71 to the controller via a serial data path 72. The logic contains a 7 bit register loaded from the controller with an OUT X'40' which sets a 4 bit data character directed to the addressed data target (specified in 3 bits) within the console. The 7 bits are serially passed to the console off the channel attachment over the cables to the scanner, through the scanner and to the connection on the PCS file. An entry in the console causes 8 bits of serial data to be registered in the control logic which is read by the controller with an IN to I/O address of X'40'.

The cycle steal address register flow. This is a novel function in the PCS Channel Attachment which does a partial subchannel function in the upkeep of the cycle steal address for the 32 potential cycle stealing lines. The loop from the CS address register through the incrementer 76 into the stack and back into the register is used to update the initialized address by 1 or by 2, depending on word or byte mode. The stack 74 is initialized by two outs from the controller through the address registers 71, 73 to set the initial 16 bit cycle steal address into the stack location defined by the CLAR setting. The stack is in an 8 bit by 64 byte configuration, so the CLAR 38 bits specify the high order 5 bits and the OUT, either X'32' or X'33', specified the odd or even location in the stack. When a cycle steal operation is ordered by the controller, with the key and data (if inbound) and the CLAR previously set, the control logic associated with this flow loads the byte 0 of the address register 71, 73 from the even location of the stack, and then byte 1 with the byte from the odd location. Thus, the address associated with this setting of the CLAR (the device, or line, requesting the CS) is available for gating onto the address bus during the ensuing CS sequence. Meanwhile, the value in the address register is being combinatorially incremented by 1 (if the request is in byte mode) or by 2, and the control logic loads the two bytes back into the stack. Any of the 64 bytes in the stack may be read into the controller by setting the CLAR for the line or interest, and doing an IN at X'10' or X'ID for the even or add bytes respectively. This read capability allows retrieval of the residual CS address should an error occur within a sequence.

The cyclic redundancy check (CRC)flow 78 and 80. This is also a new function in the PCS Channel Attachment which gives hardware aid to the controller in the area of calculation of a communications check character for concatenation onto the message during transmission, or for comparison during reception. A stack 78 is associated with the function for holding of the values on a per line basis. These values are the generation polynomial and the partial remainder, 4 bytes per line. The flow allows initialization of the stack through the PLA of the remainder, and setting of the 2 bytes of the polynomial into the stack. Which area of the stack is used is specified by a previously set CLAR value to dictate line address. An OUT instruction from the controller of X'27' with the byte character as the output data on the DBO causes the PLA to cycle and to calculate further on the CRC for that line based on the stacked values of partial remainder, and the generator polynomial. Another pair of OUT instructions command the PLA to retrieve the remainder to the stack output for retrieval into the controller for either transmission or comparison. CRC PLA 80 includes a CRC generator which operates substantially in the manner described in U.S. Pat. No. 3,678,469 assigned to the assignee of the present application.

The interrupt sequence gate 82 gates the interrupt ID word onto the Series/1 channel data bus during the service-gate-in sequence.

The cycle steal sequence gates 84 and 86 gate the cycle steal input data in the cycle steal address onto the channel busses at service in time of the cycle steal sequence.

Block 92 represents the power-on reset latch.
Block 94 represents the cycle steal word/byte indicator. Block 96 represents the cycle steal in/out indicator. Block 98 is the operation monitor trigger.

THE CONTROLLER I/O ADDRESS LIST

The following table lists the controller in and out instructions with the I/O addresses within the controller I/O address space (X'OO' to X'FF'). The table also shows if there is any data associated with the instruction, and whether the controller line address register (CLAR) must be set before the I/O instruction is executed.

| Out addresses | | |
|---|---|---|
| OUT ADRS | CLAR | |
| OUT /10 | N (no) | Reset the power-on-reset latch in the channel attachment. An internal signal at power-on time sets the latch. OUT/10 resets it. |
| OUT /11 | Y (yes) | Set interrupt request for the addressed (via CLAR) device if that device's I bit is on and the busy latch for that device is on |
| OUT /12 | Y | Set interrupt request for the addressed (via CLAR) device if that device's I bit is on and the busy latch for that device is on. This out will additionally set the block-busy-reset latch which will prevent reset of the devices busy latch at the end of the interrupt service time. |
| OUT /13 | Y | Set interrupt request for the addressed device if the devices I bit is set, but without regard to the condition of the device busy latch. |
| OUT /14 | N | Set the input indicator on. In /14 resets it. |
| OUT /15 5-7 | N | Set the CS key 56 and do a CS request. This request must be preceded by either setting of the two bytes of cycle steal address (out /30/ and /31) by the controller microcode, or by an automatic setting from the CS Address stack (cut /16). Either way, the CS data must be set in the input register 66 (out /17 and /18) prior to this out if the transfer is inbound to the CPU, and the byte mode latch must be set if the transfer is 8 bits. |
| OUT /16 | Y | Move the 16 bit cycle steal address for this setting of the CLAR 38 into the cycle steal address register 71, 73 in preparation for a CS request. The address in the register will then be incremented by one or two depending on the setting of the word indicator, and will be restored in the stack. This out should follow the setting of the word indicator (if desired) and the CLAR, and will be used prior to initiation of CS request via auto update. |
| OUT /17 0-7 | N | Load the CS input data register, byte 0 |
| OUT /18 0-7 | N | Load the CS input data register, byte 1 |
| OUT /19 0-7 | N | Load the int ID reg 62, byte 0 (the interrupt information byte IIB or interrupt status byte ISB |
| /1A 0-7 | N | Load the int ID reg, byte 1 (the device address) |
| OUT /1B 5-7 | N | Set the interrupt request 58 cond-code-in bits. |
| OUT /1C | N | Toggle the CP monitor flip/flop 98. This will alternately turn the OP monitor indicator on and off (off at reset), and will indicate no microcode activity if stuck in either state. |
| OUT /1D 6,7 | N | Load bit 6 and bit 7 of the DBO in the status indicators of the PCS file. |
| OUT /1E | N | Set the byte mode latch 94 on. This must be set prior to the CS request, and will be reset at the end of the CS sequence. |
| OUT /1F | N | Set interrupt request 36 for device zero (the CLAR must be set to '00000'B prior to this out) if device zero's I bit is on, but without regard for the condition of the device zero busy latch. This out also sets the block-busy-reset latch to prevent reset of the device zero busy latch, if set, at the end of the interrupt service time. |
| OUT /20 0-7 | Y | Load the CRC polynomial, byte 1, in the FSU. |
| OUT /21 0-7 | Y | Load the CRC polynomial, byte 0, in the FSU. |
| OUT /22 0-7 | Y | Load the initial CRC remainder, byte 1. |
| OUT /23 0-7 | Y | Load the initial CRC remainder, byte 0. |
| OUT /24 | Y | Move the remainder, byte 1, to CRC output. |
| OUT /25 | Y | Move the remainder, byte 0, to CRC output. |
| OUT /26 | Y | Clear to CRC remainder to X'0000'. |
| OUT /27 0-7 | Y | Calculate CRC using the remainder, polynomial and character |

-continued

| Out addresses | | | |
|---|---|---|---|
| OUT ADRS | | CLAR | |
| OUT /2B 5-7 | | Y | Set the three bit code. Bit 5 always = 1, bit 6,7 =: 00 for 8 bit characters, 10 for 7 bit, 01 for 6 bit and 11 for 5 bit' characters. |
| OUT /30 0-7 | | Y | Load cycle steal address register 71, byte 0. This load will be used for setting of the cycle steal address without automatic update. |
| OUT /31 0-7 | | Y | Load the CSAR 73, byte 1. This out is used as explained for out /30. |
| OUT /32 0-7 | | Y | Load byte 0 (bits 0-7) of the initial cycle address into the address stack from DCB. This and the following load must be done for a particular device address prior to a cycle steal via automatic address update (out /16 followed by out /15). |
| OUT /33 0-7 | | Y | Load byte through 80 into 78 (bits 8-F) of the initial cycle address into the address stack from DBO. |
| OUT /40 1-7 | | N | Load the console register 70 (outbound to display). Bits 1-3 Address of data target Bits 4-7 Hex data field |
| OUT /AO 3-7 | | Y | Load the CLAR 38 (and the SLAR) (in the scanner) with device address. Those out's marked with the asterisk require a following 'Dummy' instruction that doesn't change the controller DBO (such as a branch to the next sequential instruction NSI). |

| IN Addresses | CLAR | |
|---|---|---|
| IN /10 0-7 | N | Sense the PCS controller and I/F status. Bit 1 is PCS file not reset (the power-on-reset signal from the PCS supply). Bit 2 is the POR latch in the scanner. The latch is set by PCS scanner POR, or by an out /A4, and is reset by Out /A5. Bit 4 is Channel Attach busy from OIO. Bit 5 is Channel Attach POR latch. Bit 6 is Channel Attach busy from OIO or device reset Bit 7 is controller end interrupt required. |
| IN /11 0,1 | N | Sense some more Channel Attach information Bit 0 is interrupt request is on channel interface. Bit 3 is CRC PLA busy executing an initiation or calculate operation. Bit 7 is some device had an interrupt request and the request was removed from the Channel interface by the device being unprepared. |
| IN /14 | N | Reset the input indicator. Out /14 sets it. |
| IN /15 0, 3-7 | N | Sense cycle steal information Bit 0 is a cycle steal request on the I/F. Bit 3 is OK to change CLAR setting. Bit 4 is storage data check bit of CS error status. Bit 5 is invalid storage address CF CS error. Bit 6 is protect check bit of CS error. Bit 7 is interface data check bit of CS error. |
| IN /16 0-5 | N | Read the PCS location bits which are high order bits of the P/T device address. All 6 are significant for a domain of 1-4, 5 are significant for 5-8, 4 for 9-16, and only the 3 high order location bits are significant for a domain of 17 to 32 device addresses. |
| IN /17 0-7 | N | Read the CS output data reg, byte 0. |
| IN /18 0-7 | N | Read the CS output data reg, byte 1. |
| IN /19 0-7 | N | Read the OIO data register, byte 0 (IDCB word 1, byte 0). |
| IN /1A 0-7 | N | Read the OIO data register, byte 1 (IDCB word 1, byte 1). |
| IN /1B 2-7 | N | Read the OIO function (IDCB word 0, bits 2-7). |
| IN /1C 0-7 | Y | Read the residual address, byte 0, from the cycle steal address stack. The address read |

-continued

| IN Addresses | CLAR | | |
|---|---|---|---|
| | | | will equal the initialization value (out /32 and /33) plug the number of out/16's done times the setting of the byte indicator. |
| IN | /1D 0-6 | Y | Read the residual address, byte 1, from stack. |
| IN | /1E 0-7 | N | Read the domain bits and the device address.<br>Bit 0 is the domain bit for domain 17-32.<br>Bit 1 is the domain bit for domain 9-16.<br>Bit 2 is the domain bit for domain 5-8.<br>Bits 3-7 are the five low order bits of the OIO device address (IDCB word O, bits 11-15) translated into relative device address by the domain bits |
| IN | /1F | N | Reset the channel interface bush latch.<br>The latch is set by an OIO to a device within domain, or by a device reset to one of the devices. |
| IN | /30 0-7 | Y | Read CRC output, after an Out /24 or /25. |
| IN | /31 0-7 | N | Read the PCR save register and the CLAR.<br>Bit 0 is the carry indicator<br>Bit 1 is the zero indicator<br>Bit 2 is the non-zero indicator<br>Bits 3-7 get the setting of the CLAR. |
| IN | /32 0-7 | Y | Sense the device reset conditions for the addressed devices (CLAR setting). Bits 0 and 1 of the CLAR will specify which 8 device reset latches. 00 will get dev 0-7, 01 will get 8-15, etc. This sense will reset any of the latches which were set prior to the In, and should be issued if bit 6 and N out bit 4 of the PCS cont and I/F status byte were on (IN/10). |
| IN | /33 | N | Reset any of the interrupt request latches that may be set in the RMS module after an out to set interrupt request and a request pending not sensed after, or after the unprepared-while-interrupt pending latch is sensed. |
| IN | /40 0-7 | N | Sense the console register (inbound from console)<br>Bit 0 is transaction complete<br>Bit 1 is console unplugged<br>Bit 2 is data valid<br>Bit 3 is function<br>Bit 4-7 are the hex data field from the keyboard |

Figure 3A:
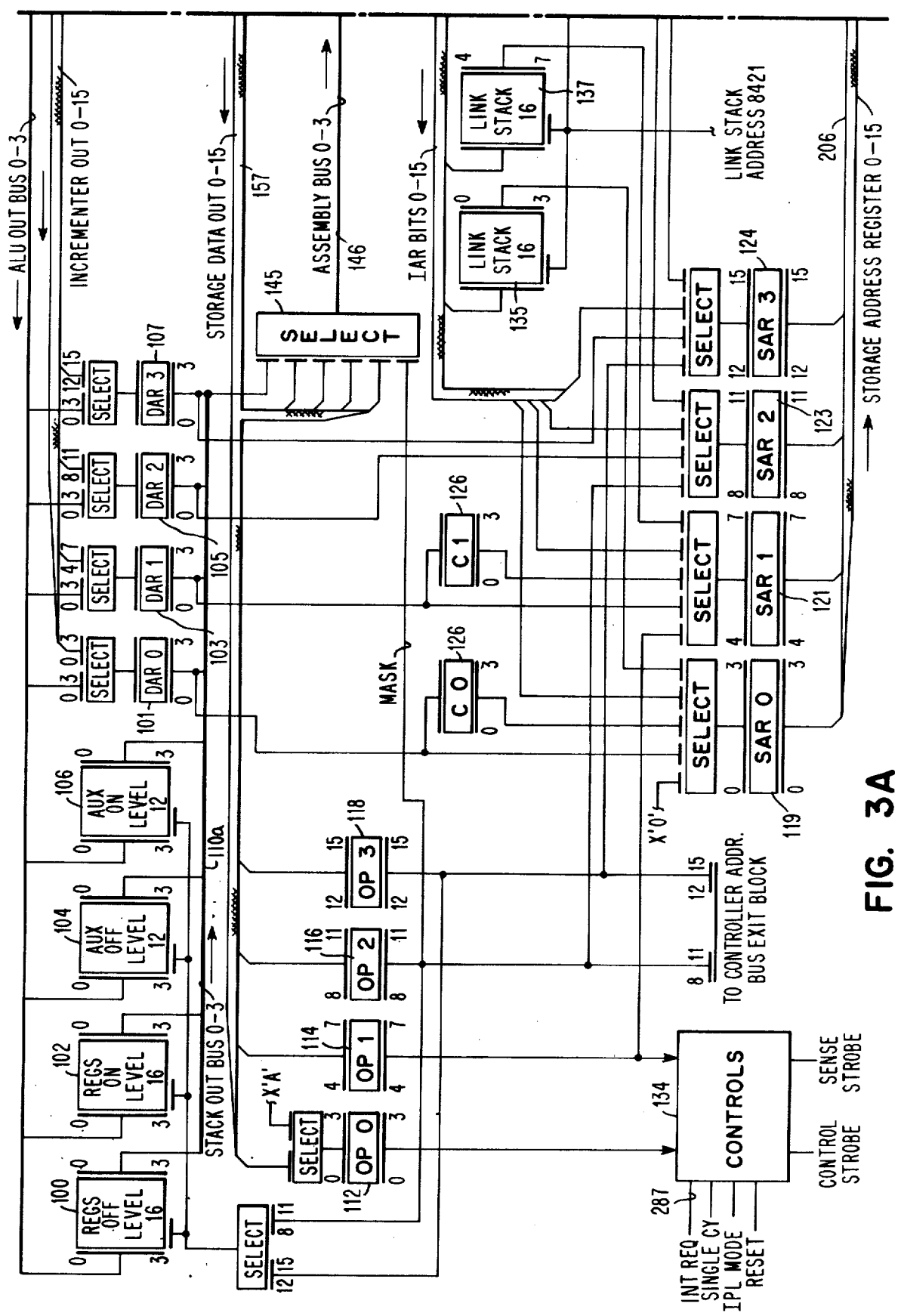
FIGS. 3a and 3b taken together show the major components of the controller utilized in the PCS of the present invention.
Figure 3B:
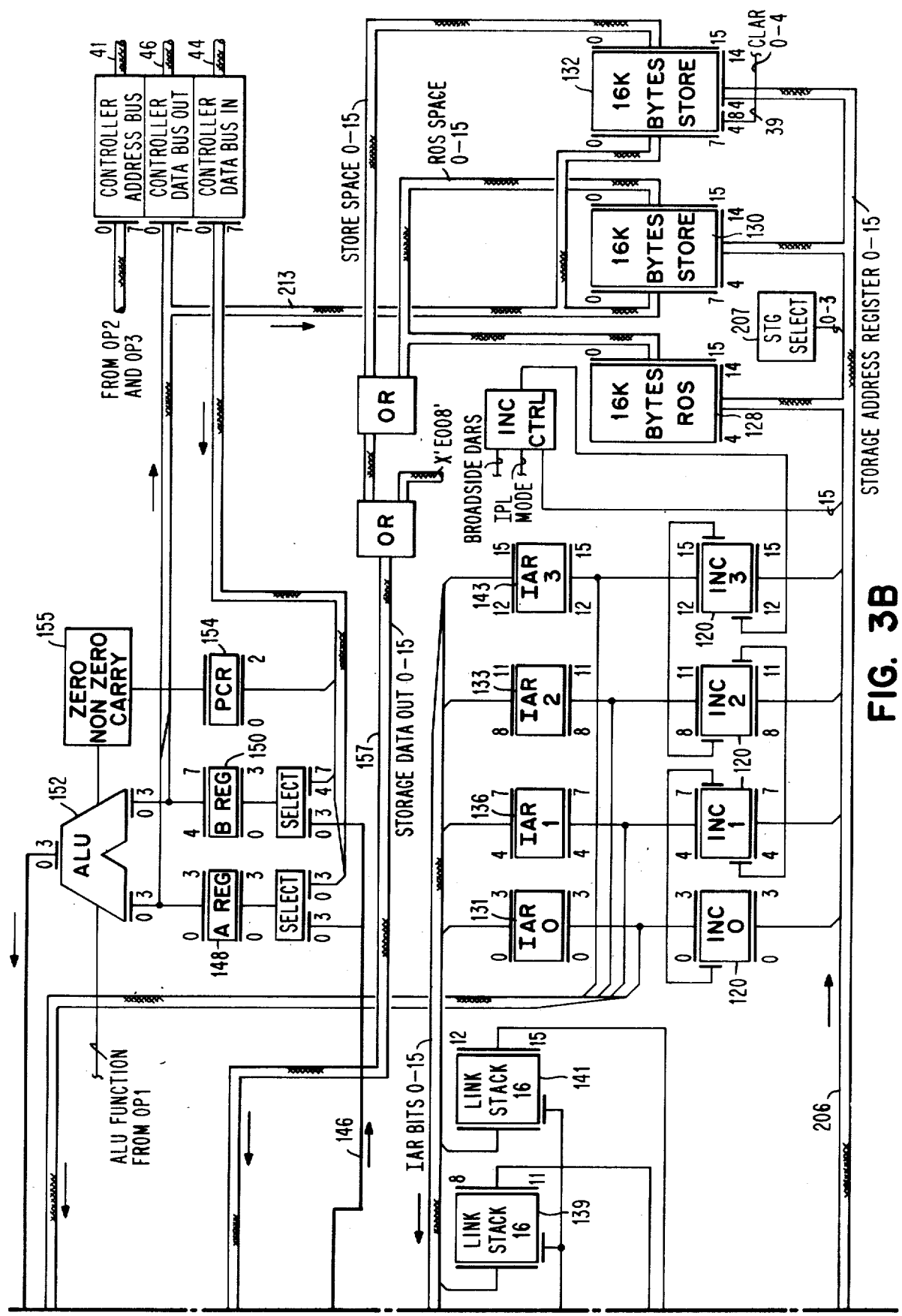

THE PCS CONTROLLER (FIGURE 3A and 3B)

The controller is a high speed (750 nanosecond cycle time) purpose, four bit digital computer with one level of interrupt, 16 bit address ability, and a 16-level branch and link (BAL) capability.

Among the capabilities of the controller are:

(1) A sixteen bit by sixteen word, push-pop store stack to allow nesting of up to sixteen levels of branch and link (BAL).

(2) An additional nibble (4 bits) added to the storage address register, the instruction address register, the incrementer which feeds the IAR, and the multiplexer which is the SAR source to provide 16 bits of storage address data flow.

(3) A fourth data access register, DAR 3, which gives the DARs the 16 bit wide address flow capability.

(4) Another set of the register and auxiliary register stacks which become active when on the interrupt level.

(5) A sixteen bit wide data path from the incrementer to the four data access registers. This gives a broadside load capability of the DARs, with the incremented value of the storage address, when the DARs are the source of the effective address and the incrementation is specified.

(6) Some circuitry which can be switched upon the right conditions to insert a fixed branch and link (BAL) instruction onto the storage out data path to effect an interruption of normal processing within the controller.

(7) A three bit register with a path into the Data-Bus-In which will be loaded with the program conditions (indicators) upon execution of the forced BAL for interrupt.

(8) An eight bit register, the C register which becomes the high order two nibbles of the storage address when executing a memory reference instruction using this addressing mode.

DATA FLOW

The following text is associated with the data flow diagram (FIG. 3) of the PCS controller. The blocks in the flow diagram are four bits wide in most of the cases, so the 16 bit registers are depicted as 4-nibble wide blocks to show the differences on a nibble basis.

THE STACKS

The register stacks 100, 102, 104, and 106 are the four blocks in the upper left corner of the flow. They are 4 bits wide by 16 registers deep, and there is a register and auxiliary register stack for both off and on the interrupt level. The data source into all of the stacks is the 4 bits out of the ALU over bus 108 and all stacks dot together on the stack out, dot (open collector) bus 10, address of which of the 16 registers within each stack module is sourced from either nibble 3 (bits 8–11) OP 116 or 4 (bits 12–15) of the OP register 118. (It is to be noted that this field is inverted in the instruction, that is, if register 0 is to be addressed, a register address field of 1111 must be specified in the nibble of the instruction). The write pulse is present in most of the instructions, but which of the stacks is actually written to is controlled by which of the stacks is selected during the write pulse. Selection is also the controlling signal of which stack gated onto the stack out bus.

THE DARs

The four DARs 101, 103, 105, and 107 are four 4 bit registers which architecturally are the four low order registers of the aux stack 104, 106. That is, when the aux stack is the selected target or source, and the stack address is 0000 through 0011 (actually 1111 through 1100), the aux stack is not selected, but one of the 4 DARs (Data Access Registers) is. The DARs serve a special function, as the name implies. They are often the source of the effective address on memory reference instructions. They are loaded, like the other registers in the stack, from the ALU Out bus 108 either from data from a mask field 118 (OP2) of the instruction or from a move from another reg in the stacks.

Another source of data is available to each of the DARs in the 16 bits out of the incrementer 120. Certain instructions listed above in the new instruction area, use the DARs as the EA(effective address) source for memory reference. They then become the source into the SAR 119, 121, 123, and 124 to address storage, and thus, as the flow shows, the incremented value of the SAR contents is available at the output of the incremented 120. It is this incremented value which is set back into the DARs in a broadside manner (as opposed to one DAR at a time loaded from the ALU out bus). Most of the time, the incrementer is adding 2 to the value in the SAR as the value is the instruction address (as opposed to effective data address) which is a byte address of a 16 bit word. Two special cases require the incrementer to increment by 1 only. One is this broadside case, when the byte effective address wants to be advanced by 1 only, and the other is during IPL (initial program load) which will be described later.

THE C REGISTER

The other destination of the DARs (0 and 1 only) is the C register 126. This is a hold register which provides the two most significant nibbles of effective address during memory reference instructions using the C register.

THE OP REGISTER

The four nibbles of the OP registers 112 through 118 show, as a source, the 16 bit data out of storage 128, 130, 132, one at a time over bus 157. Nibble zero can also be forced to X'A' during IPL, again to be explained later. Generally, nibble zero of the OP register 112-118 serves as a differentiator between the different class groups of the instruction set. Most of the use of the bits of OP0 112 go into the control logic of the control block 134 to perform the different timings and gatings of the various instructions.

OP1 (114) Bits 4–7, serve both as the bits of OP0 (112) and sometimes as the second most significant nibble of the effective address on memory references or branches. OP2 (116) and OP3 (118) nibbles (Bits 8–15 total) register various fields for various instructions. In the stack oriented instructions, the nibbles provide (inverted) stack addresses, or an immediate data mask. In some memory reference instructions, the bits become the low order 8 bits of the EA, and in the I/O OPs, these bits are the I/O device address. Since the branch instructions always have an even (Bit 15=0) EA, because the 16 bit instructions are always on even byte address boundaries, bit 15 of the OP register becomes a further instruction modifier for the various instructions within the branch group.

THE SAR

The SAR 119, 121, 123, 124 or Storage Address Register, is a 16 bit register loaded from various data sources on a nibble basis. Nibble 0 (119), bits 0–3, can be loaded from:
DAR0 (101) on memory reference instructions, or branches via DARs 101, 103, 105, and 107,
C0 126, when the C register is specified as part of the EA source,
IAR0 131, during normal instruction fetch cycles, Nibble 0 of the link stack 135 during return instructions or, loaded to 0000 when the forced BAL of interrupt takes place.

Nibble 1 of the SAR 121 can be loaded from;
OP1 (114), DAR1 (103), C1 (126) IAR 1 (136), or Nibble 1 (Bits 4–7) of the link stack Nibble 2 can be loaded from
OP2 (116), DAR2 (105), IAR2 (133) or Nibble 2 of the link stack 139

Nibble 3 can be loaded from;
OP3 (118), DAR 3 (107), IAR3 (143), or Nibble 3 of the link stack 141.

SELECT ONTO THE ASSEMBLY BUS

There is a six way multiplexer which selects one of 60nibbles onto an open collector dot bus called the assembly dot bus which is the internal data source of the A and B registers (148, 150). The six nibbles are;
The stack out bus 110, fed by the stacks 100, 102, 104, and the DARs 101, 103, 105, and 107, The 4 nibbles of the storage data bus out 152, OP2 (Bits 8–11), or the mask in some instructions.

It is over this path that data is routed to the stacks from the mask OP2 (116), from other stack registers, or from memory. All cases require registration in the A-B registers, and flushing through the ALU to pass the data.

THE LINK STACK

The sixteen bit registers in the Branch and Link (BAL) stack 135, 137, 139, 141 are each fed with the respective four bit nibble of the IAR, and each in turn feeds it's output data into the respective nibble of the SAR selection circuit. The address of this stack of registers comes from an up/down counter in the control 134. The counter is initialized to 1111, and the first BAL encountered first advances the count to 0000 and then writes the IAR value into the stack. Hereafter, all BAL instructions will advance and write in the same manner, and all return instructions will read the output into the SAR, and then will decrement the count. This gives the 16 levels of subroutining nesting, with the only requirement that the first OP using the stack is a BAL, and that one level is always left for a forced BAL if interrupts are enabled.

THE IAR

This is a 16 bit wide register which holds the instruction address (always an even effective value). Its source is the output of the incrementer 120 which is adding 2 to the current address registered in the SAR. In the case of sequential instruction execution, the address in the SAR will have come from the IAR, and thus the loop of IAR to SAR to INC to IAR will advance through sequential word storage addresses. When a branch is taken, the SAR will be loaded from another source, and the IAR will in turn be loaded with the address of the instruction beyond the branch-to-location.

THE INCREMENTER

This is a 16 bit wide combinatorial logic element that is configured to add one or two to a 16 bit binary unsigned integer presented at its input. The input always looks at the value in the SAR, and the output is a data source for the IAR and the DARs. Control of whether the incrementation is by 1 or 2 depends on what the value in the SAR represents. If it is an instruction address, the incrementation is by two. If the value in the SAR is an effective byte address in main storage, either during a load or store instruction, or during IPL (Initial Program Load), then one is added to the value of the SAR.

THE ALU 152 AND THE A-B REGISTERS 148, 150

The ALU is a 4 bit combinatorial logic element designed to perform common arithmetic or logical operations on two 4 bit binary fields registered in the A and B registers. The output of the ALU is the data bus to the DARs and the stacks. Control of the function of the ALU is from nibble OP1 114 in the case of the ALU OPs of the instruction set. In other cases, the ALU is set in the flush data mode to pass data from the A register through to the ALU out bus 108. The conditions of the output of the ALU are registered in three bits, the PCR 155, described below.

The A-B registers are the 4 bit holding registers at the diadic input of the ALU. There are two data sources into each of the registers. One, for both, is the assembly bus, fed by the 6 possible sources listed above. The other source for each is half of the 8 bit data bus-in (DBI). In registering this data source, the A and B registers are functioning as holding registers for input data either on the way through the ALU, in flush mode, to the stack registers for an input instruction, or just to the indicators of the PCR for a sense instruction. The output of the A-B registers also serve as the data bus-out (DBO) of the controller. Thus, the registers are loaded with data from the register stack on an out instruction or on a store instruction, when the data destination is storage.

THE PROGRAM CONDITION REGISTER 155

This three bit register is the indicator bits, zero, non-zero, and carry. These bits are fed signals representing their respective functions from the output of the ALU. They are reset at the beginning of most of the ALU OPs, unless summary mode is indicated in the operator, in which case they are clocked only after the output of the ALU has settled through the combinatorial logic to the indicator bit inputs. Thus, in summary mode, the indicators accumulate the summary condition of the nibbles fed through the ALU since the last non-summary operation.

THE PROGRAM CONDITION SAVE REGISTER 154

This three bit register in the PCS controller latches the three indicators listed above on an interrupt switch condition. There is a data path from the output of this register to the controller data bus in, bits 0, 1, and 2. At the end of the interrupt service routine, these bits may be read via the IN instruction, and the condition of the indicators may be reestablished via appropriate microcode.

THE READ ONLY STORAGE (ROS 128)

The ROS contains the microcoded instructions. The Read/Write store 130 and 132 receives the user's function string. Listed below are instructions supported by the PCS controller including effective addressing and interrupt control. The listed operator and operand syntax forms are common. Variations and extended mnemonic forms of these exist on other host preparation facilities.

| Register to register mode Name or Function Desired | Assembly-Syntax Operator | Operands |
|---|---|---|
| Add | A | RX,RY |
| Add with carry | AC | RX,RY |
| Move | M | RX,RY |
| Subtract with borrow | SB | RX,RY |
| Subtract | S | RX,RY |
| Compare | C | RX,RY |
| Subtract Summary | SS | RX,RY |
| Compare Summary | CS | RX,RY |
| And | N | RX,RY |
| Test | T | RX,RY |
| And Summary | NS | RX,RY |
| Test Summary | TS | RX,RY |
| Or | O | RX,RY |
| Or Inhibit | ON | RX,RY |
| Exclusive or | X | RX,RY |
| EOR Inhibit | XN | RX,RY |

| Dar to Dar Mode Name or Functions Desired | Assembly-Syntax Operator | Operands |
|---|---|---|
| Add | A | DX,DY |
| Add with carry | AC | DX,DY |
| Move | M | DX,DY |
| Subtract with borrow | SB | DX,DY |
| Subtract | S | DX,DY |
| Compare | C | DX,DY |
| Subtract Summary | SS | DX,DY |
| Compare Summary | CS | DX,DY |
| And | N | DX,DY |
| Test | T | DX,DY |
| And Summary | NS | DX,DY |
| Test Summary | TS | DX,DY |
| Or | O | DX,DY |
| Or Inhibit | ON | DX,DY |
| Exclusive Or | X | DX,DY |
| EOR Inhibit | XN | DX,DY |

| Register to DAR Mode Name or Function Desired | Assembly-Syntax Operator | Operands |
|---|---|---|
| Add | A | RX,DY |
| Add with Carry | AC | RX,DY |
| Move | M | RX,DY |
| Subtract with Borrow | SB | RX,DY |
| Subtract | S | RX,DY |
| Compare | C | RX,DY |
| Subtract Summary | SS | RX,DY |
| Compare Summary | CS | RX,DY |
| And | N | RX,DY |
| Test | T | RX,DY |

-continued

| | | |
|---|---|---|
| And Summary | NS | RX,DY |
| Test Summary | TS | RX,DY |
| Or | O | RX,DY |
| Or Inhibit | ON | RX,DY |
| Exclusive Or | X | RX,DY |
| EOR Inhibit | XN | RX,DY |

DAR to Register Mode

| Name or Function Desired | Assembly-Syntax Operator | Operands |
|---|---|---|
| Add | A | DX,RY |
| Add with Carry | AC | DX,RY |
| Move | M | RX,RY |
| Subtract with Borrow | SB | DX,RY |
| Subtract | S | DX,RY |
| Compare | C | DX,RY |
| Subtract Summary | SS | DX,RY |
| Compare Summary | CS | DX,RY |
| And | N | DX,RY |
| Test | T | DX,RY |
| And Summary | NS | DX,RY |
| Test Summary | TS | DX,RY |
| Or | O | DX,RY |
| Or Inhibit | ON | DX,RY |
| Exclusive or | X | DX,RY |
| EOR Inhibit | XN | DX,RY |

Mask to Register Mode

| Name or Function Desired | Assembly-Syntax Operator | Operands |
|---|---|---|
| Add | A | MM,RY |
| Add with carry | AC | MM,RY |
| Move | M | MM,RY |
| Subtract with Borrow | SB | MM,RY |
| Subtract | S | MM,RY |
| Compare | C | MM,RY |
| Subtract Summary | SS | MM,RY |
| Compare Summary | CS | MM,RY |
| And | N | MM,RY |
| Test | T | MM,RY |
| And Summary | NS | MM,RY |
| Test Summary | TS | MM,RY |
| Or | O | MM,RY |
| Or Inhibit | ON | MM,RY |
| Exclusive or | X | MM,RY |
| EOR Inhibit | XN | MM,RY |

Mask to DAR Mode

| Name of Function Desired | Assembly-Syntax Operator | Operands |
|---|---|---|
| Add | A | MM,DY |
| Add with carry | AC | MM,DY |
| Move | M | MM,DY |
| Subtract with borrow | SB | MM,DY |
| Subtract | S | MM,DY |
| Compare | C | MM,DY |
| Subtract summary | SS | MM,DY |
| Compare Summary | CS | MM,DY |
| And | N | MM,DY |
| Test | T | MM,DY |
| And Summary | NS | MM,DY |
| Test Summary | TS | MM,DY |
| Or | O | MM,DY |
| Or Inhibit | ON | MM,DY |
| Exclusive or | X | MM,DY |
| EOR Inhibit | XN | MM,DY |

-continued

Input Mode

| | | |
|---|---|---|
| Input from Device | IN | DEVAD |
| Sense Device | SNS | DEVAD |

Interrupt Control

| | | |
|---|---|---|
| Exit Level | EXIT | |
| Force Interrupt | INTR | |

Byte Move to C Register

| | | |
|---|---|---|
| Move to Register | MC | |

Output Mode

| | | |
|---|---|---|
| Output to Device | OUT | DEVAD |
| Direct Input and Output | DIO | DEVAD |

Interrupt Control

| | | |
|---|---|---|
| Disable Interrupts | DIS | |
| Enable Interrupts | ENB | |

Load Mode

| | | |
|---|---|---|
| Load Memory to Regs | LDR | RX,RY |
| Load Memory via C Reg | LDC | VALUE |
| Load Mem to Regs and Inc | LDRP | RX,RY |
| Memory to I/O Device | MIO | DEVAD |
| Memory to I/O and Inc | MIOP | DEVAD |
| Load Absolute Address | LDA | STGAD |

Store Mode

| | | |
|---|---|---|
| Store Memory to Regs | STR | RX,RY |
| Stor Memory via C Reg | STC | VALUE |
| Stor Mem to Regs and Inc | STRP | RX,RY |
| Store I/O Data IO Stg | IOM | DEVAD |
| Stor I/O and Incr DARs | IOMP | DEVAD |
| Store Absolute Address | STA | STGAD |

Branch Mode

| | | |
|---|---|---|
| Branch and Wait | BAW | STGAD |
| Branch no carry | BNC | STGAD |
| Branch carry | BC | STGAD |
| Branch Unconditionally | B | STGAD |
| Branch and Link | BAL | STGAD |
| Branch not zero | BNZ | STGAD |
| Branch Zero | BZ | STGAD |
| Return | RTN | STGAD |
| Branch via DARs | BVD | STGAD |

Associated with every memory reference instruction is an effective main storage address of the byte to be fetched or the location into which the data byte will be stored. The following list contains all of the PCS controller memory reference instruction, and shows the formation of the 16 bits (four nibbles, 0,1,2, abd 3) of the main storage address used as the effective address in the instruction. For instance, the table shows the LDRP instruction moves a byte of data from the effective memory address (EA0, Bits 0–3, through EA3, Bits 12–15) to the registers specified in the last two nibbles of the instruction, and that the EA nibbles are sourced from DAR 0 through DAR 3 respectively. The other nibble sources listed are; C0 or C1, the C register; OP1 through OP3, the nibbles (OP1 is Bits 4–7) of the OP register.

| Nmemonic | Action | Code | EA0 | EA1 | EA2 | EA3 |
|---|---|---|---|---|---|---|
| LD | Byte from EA to RX and RY | 89XY | D0 | D1 | D2 | D3 |
| LDRP | Same, and add 1 to DARs after | 8BXY | D0 | D1 | D2 | D3 |
| MIO | Byte from EA to I/O Addr ZZ | 8CZZ | D0 | D1 | D2 | D3 |
| MIOP | Same, and add 1 to DARs after | 8EZZ | D0 | D1 | D2 | D3 |
| LDC | Byte from EA to R0 and R1 | 8AVV | C0 | C1 | OP2 | OP3 |
| LDA | Byte from EA to R0 and R1 | 9SSS | D0 | OP1 | OP2 | OP3 |
| ST | Rx and RY stored in EA | A9XY | D0 | D1 | D2 | D3 |
| STRP | Same, and add 1 to DARs after | AEZZ | D0 | D1 | D2 | D3 |
| IOM | Byte from I/O ZZ stored in EA | ACZZ | D0 | D1 | D2 | D3 |
| IOMP | Same, and add 1 to DARs after | AEZZ | D0 | D1 | D2 | D3 |
| STC | R0 and R1 stored in EA | AAVV | C0 | C1 | OP2 | OP3 |

| Nmemonic | Action | Code | EA0 | EA1 | EA2 | EA3 |
|---|---|---|---|---|---|---|
| STA | R0 and R1 stored in EA | BSSS | D0 | OP1 | OP2 | OP3 |

There is an effective address associated with the branch instructions also. In most cases, the source of the EA is the OP register, nibbles 1 to 3. This gives 12 bits only, so the 4 most significant bits of the EA are contributed by DAR 0. Thus, to branch to any area of the total address space, set DAR 0 to the high nibble of the EA, and execute the branch. The other branch EA source is on a branch via DAR instruction, where the entire EA, all 16 bits, come from the 4 DARs.

DETAILED OPERATIONS

The operational description of the instructions, interrupt, and IPL, is indicated in timing charts of FIGS. 8 to 12 inclusive which show the essential signals where necessary.

BRANCH-AND-LINK AND RETURN

The branch-and-link and the return instructions uses the push-pop stack in the PCS controller which allows nesting of 16 levels. The up/down counter is implemented in 2 of the new control modules, and uses control signals relative to BAL and RTN to control count direction and clocking. The counter is initialized on controller reset to B'1111'. The first BAL clocks the counter in the count-up direction to 0000 and writes the IAR into the stack at that address. Subsequent BALS clock the counter to count up and then write in the stack, while returns source the stack output into the SAR, and then clock the counter conditioned in the count down direction. The IN instruction EXXX, BAL. is shown in FIG. 9.

FURTHER INSTRUCTIONS

A description of the operation of the novel items within the PCS controller follows: most of the descriptions relate to the data flow diagram or to specifically identified timings or flows.

LDRP

The first cycle of the instruction clocks the 8BXY 16 bit instruction into the OP register at time T0. The decode of the OP nibble causes the selects into the SAR to source the DARs as the 16 bit effective address. The EA value from the DARs is gated into and registered in the SAR at T1 through T3. The select of the STORE or ROS occurs from T4 through T9 is based on the applied address registered in the SAR. Meanwhile, the incrementer is forced to add 0001 to the value in the SAR by the decode of this OP being an incrementing DAR OP (Memory reference and EA from DARs and OP bit 1=0 and OP bit 6=1) and the sum, present at the output of the incrementer, is clocked broadside into the four DARs at T8. The OP2 and OP3 fields of the OP contain the inverted register address of the stack registers which will be the data byte targets for this OP.

During the second cycle of the OP, the full 16 bits of storage at the EA (the odd and even byte) are available at the input to the 6 way multiplexer onto the assembly bus. The two nibbles of the data byte, depending on the EA being odd or even, are passed to the A and B registers for registration on the way of the stack target registers while storage is being used to fetch the next instruction. The nibbles go onto the assembly bus serially, and are clocked into the A and then the B registers. They are passed through the ALU and clocked into the respective stack registers (RX and RY) during the second cycle. Meanwhile, SAR is loaded, again at T1 through T3, with the IAR value pointing at the next sequential instruction. When the LDRP instruction is over, the addressed data byte is in the register stack and the value in the collective four DARs is an effective address one beyond the previous value. The detection of the new pattern, X'8B', in the OP0 and OP1 nibbles, causes the new control module to generate the logic signals required to execute the described operation, but the module outputs a pattern of the OP register bits 4 through 7 so that control modules can be forced to perform in the desired manner. The following table shows the instruction set patterns of the instructions in the OP register as they are fetched from storage, and the control module outputs as a filtered pattern.

| OP0-OP1 Hex Digits | Instr | Actual OP1 Bits 4–7 | Outputted Bits 4–7 |
|---|---|---|---|
| 89 | LDR | 1001 | 1001 |
| 8B | LDRP | 1011 | 1001 |
| 8A | LDC | 1010 | 1010 |
| 8C | MIO | 1100 | 1100 |
| 8E | MIOP | 1110 | 1100 |
| 80 | DIS | 0000 | 1100 |
| 82 | ENB | 0010 | 1100 |
| A9 | STR | 1001 | 1001 |
| AB | STRP | 1011 | 1001 |
| AA | STC | 1010 | 1001 |
| AC | IOM | 1100 | 1100 |
| AE | IOMP | 1110 | 1100 |

It should be noted that most of the filtered outputs of the nibble 1 of the OP register force the pattern to a B'1100'. This makes the OP look like an MIO or an IOM OP to the control logic, so the signals usually accompanying these OPs, control strobe or sense strobe, and the indicators being set, will occur even though the main purpose of the instruction is in another logical area. It is advised that the last two nibbles of the instruction be set to X'00' when they are not of importance, and that an I/O address of X'00' not be used in the external I/O device address set.

MIOP

It is a memory reference, two cycle instruction with the target of the data being an addressed I/O device. The instruction works as the LDRP described above, only the data goes no farther in the controller flow than the A-B registers. A control strobe, at T9 of the second cycle, signals the I/O device addressed in OP2 and OP3 to register the data in the A-B registers, which is the controller data bus out. When the MIOP instruction is over, the addressed data byte is in the A-B registers, and depending on the external attachments, may be registered in the addressed I/O device. The value in the DARs is one greater than the effective address of the data byte passed to the I/O device.

LDC (Load via C Register)

The span of the instruction in the PCS controller with the least significant nibbles coming from the instruction reaches a total of 256. The addition of the C register provided a hold of the most significant nibbles, and the application of the PCS controller uses this instruction to access the LCB bytes with the C register always set to X'80'. Thus, the DARs need not be loaded constantly to access the LCB area of storage. Operation of the instruction is basically in the control of the select multiplexers into the nibbles of the SAR to source the C register and OP2 and OP3 with select signals. The rest of the two cycle instruction is identical to the LDR or LDRP.

STRP

This is a store, two cycle instruction. The first cycle of all store to memory instructions is used to fetch the next OP to follow, as the data to be stored during this OP is not present at the storage input in time to use the first cycle. Thus, during the first cycle, the SAR is loaded with the IAR and storage is cycled to fetch the NSI. Meanwhile, the data byte from the source registers in the stack, RX and RY, is selected onto the stack out bus, through the multiplexer in a nibble serial manner, and registered in the A-B registers for loading into storage during the second cycle. The SAR is loaded with the effective address, the DARs, at T11 of the first cycle. The 16 bit output of the first cycle storage fetch is loaded into the OP reg at T1 of the second cycle, so the NSI actually appears in the OP register during the second cycle of the store instruction, but execution of the OP is inhibited while the operation of the store, actually loading the A-B reg byte into storage at the EA, takes place.

Direction of the conditions of an incrementing -DAR OP, EA sourced from the DARs and not OP bit 1 and OP bit 6, again causes the incrementer to add 0001 to the EA in the SAR, and the output of the incrementer is clocked into the DARs in broadside manner at T8 of the second cycle. Meanwhile, the data byte in the A-B registers is written into storage at the EA. When the instruction is over, the data byte from the source registers, RX and RY, is written into storage at the EA and the DARs contain the value of the EA plus 0001. The instruction set into the OP register at T1 of the last cycle of the store OP begins execution in the next cycle, and the OP register is not clocked as usual at T0.

IOMP

This is a variation of a store I/O data to storage instruction. It works basically like the STRP described above but the data is registered in the A-B registers from an addressed I/O device rather than from two of the nibble registers in the stack. The I/O address is present in the OP reg from loading of the OP at T0 of the first cycle until the NSI is clocked into the OP register at T1 of the second cycle. The external decode of the address gates some data source onto the data bus in, and the byte is clocked into the A-B registers at T4 of the first cycle. As in an IN instruction, a sense strobe is outputted at T9 of the first cycle to signal to the external device acceptance of the data byte.

STC

This, like the LDC instruction, is identical to the store instruction described above, but the source of the effective address is controlled by the signals used to source the DARs and OP3 into the SAR. The effective address makeup allows the data byte in R0 and R1 to be stored in any byte address within the 256 byte range 'indexed' off the base contained in the C register. See the timing chart of FIG. 11.

MC

The Load-the-C-Register instruction is an operation in the PCS controller which clocks the data nibbles in the D0 and D1 registers into the two nibbles of the C register respectively. The instruction nibble O, B'0111', is used for out instructions, so this is a case where the detection of the pattern, X'74XX', is needed to control not only the desired result of clocking the C register, but needs to inhibit other logical occurrences, in this case, control strobe, from being outputted from the controller. Detection of this pattern of OP0 and OP1 takes place in one of the control modules, and the load C register pulse is generated at T8, with control strobe being inhibited from reaching off card logic.

EXIT

The exit instruction is another variation of the basic OUT OP of the controller where the control strobe is inhibited, but the logic operation of resetting the on level latch is done. This OP does nothing more than reset the latch; it does not return to the point of interruption, nor does it reenable interrupts. The on level latch is used to control which set of the available registers and aux registers are being selected in the stack oriented instructions.

INTR

The Intr instruction pulls the interrupt request, open collector dot line down for the duration of the OP. If interrupts are enabled and the other condition for interrupt are satisfied, the forced branch and link will be inserted in the instruction stream on the second following cycle. Note the interrupt description following hereinafter for full operation of the mechanism.

DIS

The disable interrupt instruction is a variation of the Load OP. The two cycle instruction was chosen because the two cycle OPs are part of the set of un-interruptable OPs, and this avoids the problems of timings involved with the interrupt control instructions being interrupted. The disable OP takes a dummy storage read cycle, that is, the data is not the primary purpose of the OP, but the data byte at the EA (the DARs) will still be loaded into R0 and R1, and the indicators will be set. The primary purpose of the OP is to reset the interrupt allow latch in the interrupt control logic. If an interrupt request had been queued up (see interrupt operation) that was held out by a series of Mode 4 (OP bit 0 on) or higher instructions, the interrupt queue latch will be reset also. The interrupt request line should be driven combinatorially from some logical, external condition (as opposed to pulsed or edge triggered) and if the interrupt isn't taken at this time the interrupt routine will not clear the condition leading to the request and the interrupting condition will still be present when interrupts are reenabled.

ENB

The enable interrupt instruction is also a variation of the Load OP. The primary purpose of the OP is to set the interrupt allow latch. Again, the dummy load will address and read storage into R0 and R1, and will change the indicators. Because it is a Mode 4 instruction, the interrupt will not actually take place, if a request is active at the time of the ENB, until an instruction with OP bit 0 off is encountered.

INTERRUPT

The interrupt mechanism works in the following manner. A sample will be made every controller cycle for an interrupt request. If a request is up at T8 time, and the interrupt allow latch is set, the interrupt queued latch will be set. In the next controller cycle which is a Mode zero through three instruction (that is, OP bit 0 off) and not a Mode 5 second cycle at T2 time, the interrupt switch latch will be set. This latch will:

1. Degate storage output and force a BAL to be clocked into the OP register at next cycle, T0, DAR zero will be degated to B'0000' during the BAL, and the effective branch address will be X'0008'.
2. Inhibit setting of the IAR at T10 of this cycle so that upon return off level the preempted instruction will be fetched for execution.
3. Reset the interrupt allow latch so that the interrupt queue latch will reset at T8 of this cycle whether the request is still active or not.
4. Transfer the present state of the PCR (carry, zero, non-zero) into the PCR save register for resoration prior to level exit.

The on-level latch will set at the rise of the interrupt switch, and will page-in the new set of register and aux stacks for use on the level. After executing the code in the interrupt service routine (either at 0008 or branched to from 0008) which should eliminate the source of the interrupt request, the routine should:

1. Read the PCR save register (decode gate signal in external logic) and restore the indicators via a microcode routine.
2. Execute an ENABLE instruction to reenable interrupts (which were disabled by the switch).
3. Execute an EXIT instruction to turn the on level latch off so that the register and aux register stacks on the 'background' level are reenabled.
4. Execute a RETURN instruction to branch to the preempted instruction. This return is identical to what would be necessary if the routine had been entered from a regular branch and link. In summary, below is a set of logic equations relative to the latches associated with interrupt. Interrupt allow latch:

Set=(T2)(OP X'92XX')
Reset=(T2)(OP X'80XX')+Interrupt switch+controller reset Interrupt queue latch:
Set=(T8)(Interrupt allow)(Interrupt request)

Reset=(T8)(Not interrupt allow)(Not interrupt request)+(T2)(OP X'80XX')+Reset Interrupt switch latch:
Set=(T2)(Interrupt queue)(OP bit 0=0)(Not Mode 5 2nd cycle)
Reset=(T6)(Bal in progress)+Controller reset On level latch:
Set=Interrupt switch
Reset=(OP X'70XX')+Controller Reset This is a timing diagram of three cycles of the controller during the interrupt switch (center cycle)

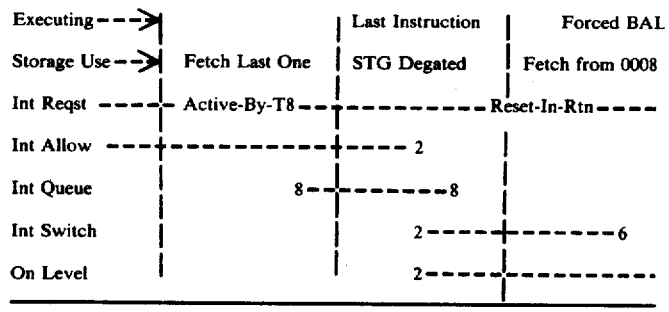

Input/Output Operations

The device address on the address bus, bits 8 through 15 of the OP register, are decoded externally and are used as a combinational gate of data onto the open collector controller DBI. Any instruction with the pattern that satisfies the decode will gate the data onto the DBI, but only during the IN or SENSE instruction will the DBI be looked at (clocked into the A-B registers). The data is actually clocked into the A-B registers at T4 of the controller cycle, and at T9 there is a signal pulse called "sense strobe" to notify an input device that the data has been taken for that particular input address. The output instruction has an accompanying pulse called control strobe for output devices to latch data up if the decode of the address (I/O address) matches during control strobe time. This is to signal that the data on the DBO, the A-B register values, is presented and valid. Data need not necessarily accompany OUT instructions, as the end of the I/O address decode and control strobe provides a pulse which may be used for any local purpose. The sense strobe and control strobe are provided with any of the instructions listed in the set with DDDD DDDD specified as the two low order nibbles of the OP register. This includes the direct I/O, memory to I/O or I/O to memory instructions with or without incrementation of the DARs. In general, sense strobe signals input into the controller A-B registers and control strobe signals output. Note timing chart FIG. 12.

Initial Program Load (IPL)

The main storage on the PCS controller may be IPL'ed from an external logic attachment when Read/Write storage is installed in the ROS address space starting at 0000. The controller IPL input signal forces several conditions within the controller:

1. The OP reg is forced to X'AFFF'. This is an I/O to memory instruction with an I/O address of B'1111 1111'.
2. The controller is forced into single cycle mode.

3. The incrementer is forced to add 0001 to the SAR contents. The external I/O attachments onto the controller data bus in should not have an I/O address of X'FF' as a valid address during normal operation. When the external logic forces the controller into IPL mode, the I/O address of FF will gate the IPL data byte source onto the DBI for loading into storage a byte at a time. Once IPL mode has been entered, a controller reset signal pulse will set the IAR to 0000 for the start of the load. Thereafter, the data byte will be gated onto the DBI, and a start clock pulse will cause the two cycles of the forced I/O-to-Memory operation to take place. The data followed by the start clock pulse may be presented at any rate up to the cycle time of the controller of 1.5 microseconds (for a 2 cycle OP). The controller will clock the data into the A-B registers while doing the fetch cycle of any store-to-memory OP first cycle, and will write the A-B registers into storage, with the IAR as the effective address, during the second cycle. The incremented-by-one value of the SAR will be clocked into the IAR, and, subsequently, into the SAR for the next store. This sequence will take place controlled by the external logic until the last byte is entered (as determined externally). When ended, the IPL mode signal is deactivated, and another controller resets the IAR back to 000 and starts execution, either in single cycle mode or not as determined by the single cycle mode signal, from address 0000.

area of main storage (128×32) to access a particular byte within an LCB for a particular line. The contents of the CLAR are used to replace five of the address bits going to a 4KB area of storage. Thus, any effective storage access within the LCB 4KB block of controller main store will 'page' to the LCB as a function of CLAR contents, and will select the byte within the LCB as a function of the 7 low order address bits not replaced by CLAR bits. This line control block paging is implemented in the PCS controller main store.

MICROCODE PROCESSOR

The intelligence is provided by a microcoded PCS controller. The controller contains Read Only Storage (ROS) and Random Access Memory (STORE) with which the user at the Series/1 level can personalize the various functions available within the PCS to do his particular communications task. In effect, the microcode is a program which is contained in the ROS 128 of the PCS controller. The microcode enables the PCS to be programmable. It takes the user's command and interprets that command into a set of instructions.

Some of the available functions of the PCS controller are:
Testing for special characters or sequences
CRC or LRC accumulate and verify
Special character insert or delete
Timeouts
Attachment control
Auto polling
The user enables the control of these functions on a

```
                                       / /
Cont IPL          /------------------/ / /-----------/
                                       / /
Cont Reset        /---/                / /
                                       / /           /---/
Start Clock       /—/ /—/ /—/ /—/ /—   / / /—/ /—/ /—/
                                       / /
Data Valid on DBI /---/---/---/---/---/ /---/---/---/
                                       / /
```

In effect, the PCS controller is a functional element of the PCS which acts as an interface between the Series/1 computer system and the PCS scanner. The controller essentially takes outbound data from the CPU and passes it along to the scanner (to be described later) in parallel form. The SERDES part of the scanner serializes this data and passes it along to the 32 lines and the user devices connected to these lines, one bit at a time. The controller acts to take the inbound data from the 32 lines which comes into the SERDES part of the scanner serially. The SERDES deserializes this data into parallel form and passes this data onto the PCS controller for subsequent passage to the Series/1 computer system.

LINE CONTROL BLOCK PAGING

This feature enables accessing line dependent information in the PCS controller main store 132 without effective address calculation. The PCS controller keeps, in controller main store 132, a 128 byte block of data for each of the 32 communication lines. The block (LCB) of the store 132 is accessed while the controller is operating on a particular line. The line presently being operated on is identified by a "line address" (binary 00000 to 11111) in the controller line address register 38 (CLAR) of the Channel Attachment to prevent constant calculation of an effective address 'indexing' into a 4K byte perline basis by orders to the microcode which are passed to the controller at initialization time and are contained in the STORE. Groups of these orders form function strings which are used together to execute a format sequence for a particular line discipline.

FUNCTIONAL PARTS

The PCS microcode contains the following units which, together provide the programmable communications function.

1. Event Driven Schedular

This schedular is part of the microcode program and controls the loading of the PCS controller. This allows the controller to service all active lines first. If after servicing all the events (transmitting or receiving of data, etc.) generated by these active lines (devices) the processor still has time left over, the schedular will accept another task (OIO) from the Channel Attachment. To accomplish this, the schedular assigns priorities to all events in the following orders (with the highest priority event listed first):

1. Transmit data
2. Interpretation of orders (PCS operation codes)
3. Device control block chaining
4. Receive operation 5. Presenting interrupts to Series/1 (Device End, Exception Interrupt, etc.)
6. Accept OIO from Series/1
7. Cycle steal Trace data
8. Service C.E. console If the system is running lines at relatively high speed, it will generate various events. The schedular then will direct the processor to service all these events first before it will service the OIO. By doing so, it will prevent another device from being activated and cause more work for the processor.

2. Wait/Post (Program)

There are 7 Wait/Post queues in the processor (program). All but 2 of these queues are software queues. The other 2 are hardware queues. When a line (device) wants to be served by the processor, it generates a queue entry to the module from which it wants service. For example, if a device from one of the 32 lines wants to present a Device End Interrupt to the Series/1, it will put its address into the Interrupt Handler's queue and then go into a wait mode. When the schedular starts the Interrupt Handler, it will then remove the device from its queue and start the process of presenting the device and interrupt into the Series/1 CPU processor.

3. Controller Order Processing

The controller orders are a set of operation-codes used to define PCS controller sequences. The controller fetches orders and data to perform transmit or receive operations such as Write Control Sequences, Write BCC, Read Data, and logical decision operations. The controller fetches each order (operation-code) and passes it to an Interpreter. The Interpreter then examines the op-code and if it is valid, will perform the operation by branches into a subroutine defined by the operation. All intermediate data, indicators and control information generated as the result of executing the order is saved into a block of storage called the Line Control Block (LCB). There are 32 LCB's, one for each of the 32 lines available in the PCS.

4. Function String

A function string is a series of orders that defines a sequence of operations to be performed by the PCS interpreter. A function string may provide a complete communication function or may provide a commonly used function required by other function strings. Function strings provide the ability to communicate with various synchronous and asynchronous devices.

5. Function Address Table

A Function Address Table (FAT) is a 1 to 127 word long table that contains Function String Address. There is one FAT for each of the device types defined in the OPEN instruction. The LCB for each line contains an index into the FAT pointers for that line. Each of the words in the FAT corresponds to one of the possible Function Identifiers that is coded in the Device Control Block (DCB). When a START Command is initiated by the Series/1, the PCS controller uses the Function Identifier as an index into the FAT to locate the Function String that supports the function. The following illustrates that relationship among the DCB, Function Identifier, LCB, FAT, and Function String. By using the Function Strings to define the line disciplines and protocol, it gives the PCS programmability. Also, by assigning different FAT pointers to each device, it gives the device the ability to use any of the Function Strings that are available in the STORE. The PCS is thus able to communicate with any terminal or system type.

6. Communication Control Characters

As described in item #4, the Function String controls the line disciplines. It, therefore, has the ability to decode control characters. Also it has the ability to decode more than one set of characters. For example, a Binary Synchronous Communication (BSC) Function String must be able to decode control characters in EBCDIC as well as in ASCII. The Communication Control Character Table (CCT) is a table of all control characters used by a given character set and line protocol. When the PCS controller decodes the Orders, it fetches the control characters by using the displacement field in the Order to reference the Control Character. During a receive/transmit operation, the controller uses this table to decode whether the receiving/transmitting character is a control character, thereby providing a measure of independence from character sets. The time the control character set selection is made is at open time. "Open time" is the time before communication commences. The PCU issues control information which is stored in the Line Control Block (LCB) for future processing.

Figure 5:
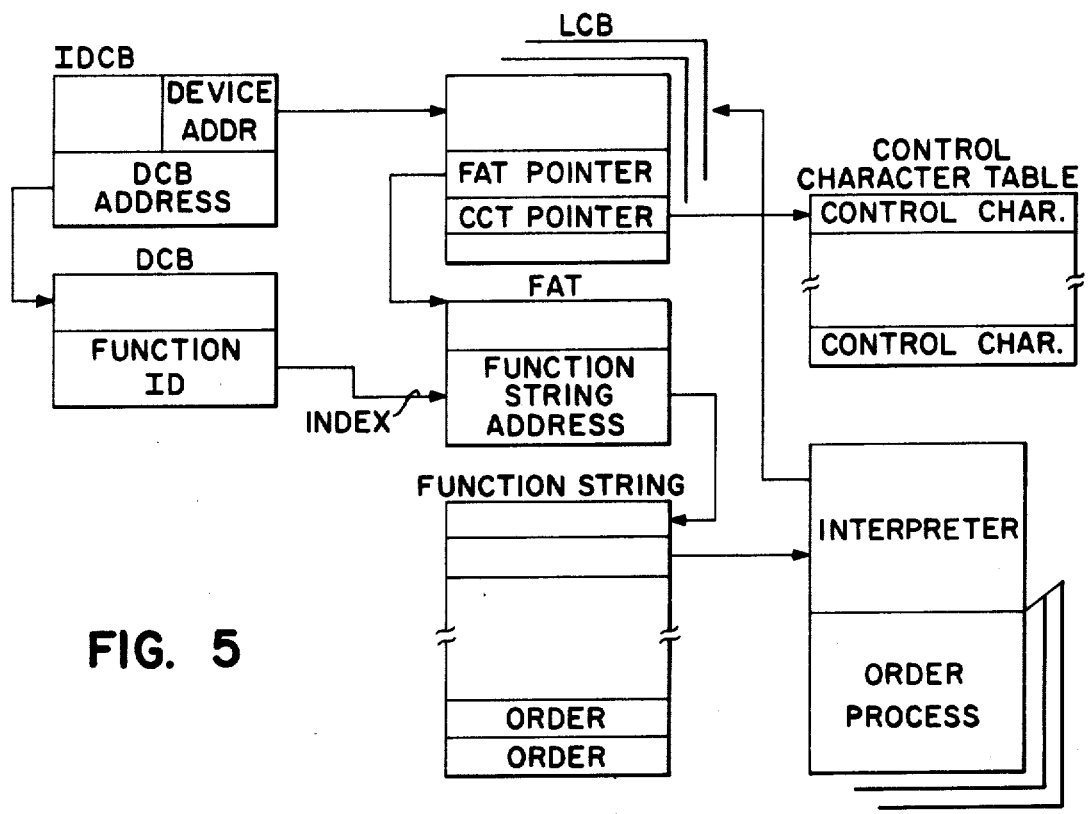
FIG. 5 is a block diagram showing parts of the microcode and their relation to each other.

FIG. 5 represents parts of the microcode and their relation to each other.

SCANNER

The scanner in the PCS of the invention is a novel digital programmable communication time division multiplexer which allows time-shared multiplexing of up to 32 low speed (0–9600 BPS) communication devices, such as teletype's, IBM 2741's, IBM 5100's machines, etc. for communication with the I/O bus of the Series/1 computer. Before proceeding with a detailed description of the scanner, a list of its many functional features will now be given:

1. Serialization and deserialization of characters,
   A. The serialization enables the width of the serializer-deserializer (Serdes) to be program-controlled through line definitions from 8 bits to 1 bit; i.e., the Serdes is loaded and unloaded in parallel 8 bits down to 1.
   B. The scanner can shift left or right (most significant bit or least significant bit) regardless of communication (synchronous or asynchronous, internal or external clocking). The bits per character supported are 1 through 8 synchronous or asynchronous high order bit or low order bit serialized or deserialized first.
3. Supports synchronous or asynchronous operation in any combination of 32 communication lines programmably selectable.
4. Programmably permissable variable line scanning. The same physical line can be set up to be scanned only as frequently as required. The result is an increase in the receive or transmit scan accuracy on a given line. This function also allows lines of higher speeds to be scanned more frequently.
5. Enables one line address of a data communication time division multiplexer to be programmed into more than one scan position.
6. Permits load leveling and interrupt service priority by line speed. To achieve this function there is provided a first-in, first-out queue apparatus. The Interrupt priority is such that only one interrupt will occur during a 32 line scan. The first physical line scanned has the highest speed priority and so on.

7. Provides receive character load leveling. The receive characters as they are received and deserialized from the 32 communication lines are stacked in the receive queue apparatus.

8. For error notification the scanner provides the following checks:
   1. VRC (vertical redundancy checking)
   2. Synch compare notification
   3. Data set checking FIG. 4 shows in block form the general picture of the scanner. Included in this scanner is a set of holding registers, one 112 for data, another 114 for the line address (scanner line address register), and a third 110 for the function to be performed (writing or reading the SCAN table, the control storage 102, or the communication device port controls 116 which connect with device line ports 117). These registers are accessed or multiplexed during the controller cycle and can be loaded at any time by the PCS controller, identified generally in FIG. 4 by 111.

A scan table store 100 is connected to the data register 112. The storage array in this apparatus 100 is programmable. The physical line addresses contained in the storage array 100 are read sequentially at the fixed rate to provide physical line addressing to be used for addressing the communication ports 0 to 32 as well as addressing additional control store which contains line definition, control information, an incrementable address for selecting control functions and data for each of the communication ports.

A transmit interrupt queue 104 and a receive data queue 108 are used as transmit interrupt and receive data buffering. They also provide load leveling for both transmitting and receiving operations. This is explained by using the example of start up conditions where all communication lines (thirty-two) at the same speed require servicing.

The received queue 108 and the transmit interrupt queue 104 are generally in the form of parallel shift register circuits which automatically move data from the entry point of the queue to the output of the queue. One example of this type of buffering is shown in U.S. Pat. No. 3,643,221, entitled "Improved Channel Buffer for Data Processing System", issued Feb. 15, 1972 to the assignee herein.

The PCS controller can postpone receive activity while servicing transmit activity and so on. These queues are also the funnel between the PCS controller and the scanner for the multiplexing of all of the 32 communication lines.

The scanning mechanism has the ability while running to prioritize the transmit interrupt of the individual 32 lines. The transmit interrupt queue 104 stacks line interrupts which are written during each individual STEP (a term referred to hereafter in connection with a description of FIG. 6) when transmit buffer servicing is required.

The fact that the 32 device line ports 117 are in one stack (transmit interrupt queue 104 and received data queue 108) reduces controller loads of addressing each individual device line port and instead only requires addressing two queues. The transmit interrupt queue 104 contains the line address and the physical address of the line (from the scan table), and the receive data queue 108 contains the line address and/or status information for the serviced port. The loading of the line address from the scan table into the queues for servicing is an important aspect of programmable control of the time division multiplexing arrangement of the invention. The ability of the line address in the scan table to itself again address additional control storage and the device ports is also important to the practice of the invention.

The device ports 116 include two bidirectional buses which are controlled during steps and controller cycles and addressed by the scan table storage 100 during steps and (addressed by the scanner line register 114) during controller cycles. This achieves multiplex communication between the scanner and the device ports.

The three PLAs (program logic arrays) in the transmit-receive control 118 (FIGS. 4, 7, and 19) decode the function addressed from the control store 102 and perform that function to control the 32 communication devices connected to line ports 117. The bit rate clock in PLA 1 (FIG. 19) has an interval counter that is used also as an activity counter, and a bit rate clocking mechanism. The timing counter and the bit rate counter are decrement counters. All information from the 32 communication lines 117 for maintaining counts is contained in the control store 102. FIG. 7 shows the data flow (address incrementing) for transmit and receive operations within the program logic array control 118. There are four major sections withing the PLA 118. Namely, the SERDES shifter 120, the comparator 112, the parity check 124 and the cybit control counter 126. In addition, there is a separate clocking PLA shown in FIG. 19, which performs timer and bit rate decrementing. Only the cybit control 126 need be explained. This is the control center of the PLA 118 (which includes PLA 2 and PLA 3 of FIG. 19) that keeps track of the type of communication operation being performed and where the communication operation is at any one time during processing. These cybits are stored incrementing addresses for addressing the functions to be performed by the PLA logic. The address (cybits) of the particular function of the PLA transmit-receive control 118 generates a transmit buffer service as a result of the transmit buffer 115 being empty (or serviced), which in turn is gated with timing on lead 123 to produce shift-in over lead 127 to the interrupt queue 104. The result is a PCS controller interrupt. The sync comparator 122 during synchronous receive mode of operation gets the SERDES shifter 120 into character phase.

The control store 102 which is addressed by the device line addresses contained in the scan table 100 contains nine control words and one function address (cybits for each device line address in the scan table). The description and format of each of the control store words is as follows: Certain of them will be seen in FIGS. 20, 21, 22. Write & Read address used by PCS controller is (89/99)

BIT RATE CONSTANT 101

This is an initial 8 bit count field to be used by a decrementer for the purpose of sampling data from a device line port or strobing data out a device line port. A count of one represents 52 usec (one scan cycle).

BIT RATE COUNT 103 (81/91)

This is the current count field used by a decrementer during counting for the purpose of sampling and strobing data from and to the device ports 117. The field is updated every 52 usec (one scan cycle).

TIMER CONSTANT 105 (8A/9A)

This is the initial 8 bit count field to be used by a decrementer for the purpose of timing events on each of the device line ports 117. Each count represents 50 m sec.

TIMER COUNT 107 (82/92)

This is the current count field used by the timer count decrementer.

BIT RATE CLOCK/TIMER CONTROL BITS 109 (83/93)

A nine bit field used for controlling the bit rate clock and the timer. It is written by the PLA control.

LINE CONTROLS 111 (8B/9B)

This is an eight bit field used by the PLA control and written by the PCS controller. The field is used for activating a line address port, controlling the modes of the timer and selecting the source of the clocking for the bit rate clock.

CYBITS (CYCLE CONTROL BITS) 113 (86/96)

This is an eight bit address field used for addressing a unique transmit or receive function from function list. That function after being performed causes the address to be incremented by one or branch due to special conditions. This address cycling produces the transmit and receive functions and starts and stops the bit rate clock. This control store is written by the PLA control after line activation.

SYNC CHARACTER OR TRANMIT BUFFER 115 (8E/9E)

This is a nine bit field which contains either the next 8 bit transmit character to be sent through the line device port (loaded into the Serdes) if in transmit mode. The ninth bit is an indicator that the buffer is full or just written. In receive mode this eight bit field becomes the sync character which is used by the sync compare to generate character phase. This control store is written by the PCS controller.

SERDES 119 (87/97)

This is a nine bit control field which contains the shifted character which is being assembled or disassembled by the PLA transmit and receive control functions. It is written by the PLA control.

LINE DEFINITIONS 121 (8F/9F)

This is an eight bit control field which contains information used for formatting the character on the line address device port. It determines whether VRC checking is to be done, odd, or even. It determines the mode of operation, synchronous mode or asynchronous mode, 1 stop bit, 1½ stop bits, or 2 stop bits. It determines whether the character is to be assembled or disassembled shifting left or shifting right. It determines the character length 1-8 bits.

As described earlier, the deserialization of characters (the Transmit process) is produced by PLA control logic. The functions are addressed by the CYBITS. The cycling of these addresses, in a manner similar to that explained in FIGS. 13b to 13i, produces a transmit data character bit on line 171 each cycle time. The PLA control logic strobes this transmit character to one of 32 line ports 117 in accordance with the physical line address received from the scan table. The line address is decoded by one of the line devices decode circuits and the transmit data is latched by the transmit data timing strobe 173, 178 (FIG. 19a) in a one bit register (latch) 270 (FIG. 19a) on the individual device logic of one of 32 ports 117. The PLA control information, transmit mode, receive mode and data communication equipment status necessary for starting communications with that device are read by the PLA control logic functions during each step. The assignment of these status lists is as follows and shown in FIG. 21, word 84/94:

DEVICE ATTACHMENT 84/94

There is one additional control word or field kept in a register (FIG. 19a) on each of the device attachments connected to line ports 117 for controlling the devices attached to the line ports (Data Communication Equipment). There is another additional word read as status from the Data Communication Equipment. There are 256 different combinations or possible function addresses for each of 32 communication lines. These addresses (CYBITS) and associated data flow for an asynchronous receive operation are shown in FIGS. 13a to 13i. A summary of just the addresses and their functions for the data flow for both synchronous and asynchronous receive operations is given below.

| Cybits Input states | Receive Cybit States for Normal Eight Bit Asy Character | |
|---|---|---|
| | Output States | Description |
| XX | 00 | Reset |
| 00 2X 40 80 | 10 | Start Asy receive & stop clock |
| 10 | 1E | Detected space & start clock |
| 1E | 1F | Valid start bit, reset SERDES |
| 1E | 00 | False start bit jump to reset |
| 1F | 11 | Bit 1 shifted & data set check |
| 11 | 12 | Bit 2 shifted & data set check |
| 12 | 13 | Bit 3 shifted & data set check |
| 13 | 14 | Bit 4 shifted & data set check |
| 14 | 15 | Bit 5 shifted & data set check |
| 15 | 16 | Bit 6 shifted & data set check |
| 16 | 17 | Bit 7 shifted & data set check |
| 1F 11 12 13 14 15 16 17 | 18 | Last bit shifted |
| 18 | 19 | Stop bit 1 of 1 1/2 or 2 |
| 18 | 1C | Stop bit 1 of 1 |
| 18 | 1B | Stop bit check 1 |
| 19 | 1A | Stop bit 1 1/2 of 2 |
| 19 | 1C | Stop bit 1 1/2 of 1 1/2 |

-continued

| Cybits Input states | Receive Cybit States for Normal Eight Bit Asy Character | |
|---|---|---|
| | Output States | Description |
| 19 | 1B | Stop bit 1 1/2 of 1 1/2 |
| 1A | 1C | Stop bit 2 of 2 |
| 1A | 1B | Stop bit 2 check |
| 1B | 1C | Write stop bit check status |
| 1C | 1D | VRC check & write VRC status |
| 1B 1C | 00 | Write Q IOW status overrun |
| 1D | 00 | Write Q low data and jump to reset or overrun |

| Cybits Input States | Receive Cybit States for Normal Eight Bit Sync Character | |
|---|---|---|
| | Output States | Description |
| XX | 00 | Reset |
| 00 1X 40 80 | 20 | Start sync receive & start clock & Write Serdes reset |
| 20 | 2C | Sync compare |
| 2C | 2D | Write sync compare status |
| 2C | 00 | Write status overrun jump to reset |
| 2D | 2B | Write sync character to Q low |
| 2D | 00 | Write Q low data overrun jump to reset |
| 2B | 2F | Write Serdes reset & jump to shift bit 1 |
| 2F | 21 | Bit 1 shifted & data set check |
| 21 | 22 | Bit 2 shifted & data set check |
| 22 | 23 | Bit 3 shifted & data set check |
| 23 | 24 | Bit 4 shifted & data set check |
| 24 | 25 | Bit 5 shifted & data set check |
| 25 | 26 | Bit 6 shifted & data set check |
| 26 | 27 | Bit 7 shifted & data set check |
| 2F 21 22 23 24 25 26 27 | 28 | Last bit shifted |
| 28 | 2D | VRC check |
| 28 | 00 | Write status overrun |
| 2D | 2B | Write data character to Q low |
| 2D | 00 | Write Q low data overrun jump to reset |
| 2B | 2F | Write Serdes reset & jump to shift bit 1 |

| Cybits Input States | Transmit Cybit States for Normal Eight Bit Asy Character | |
|---|---|---|
| | Output States | Description |
| XX | 00 | Reset |
| 1X 2X 8X | 40 | Start Asy transmit & stop clock |
| 40 | 4F | Send start bit, start clock, XBS interrupt, write Serdes |
| 40 | 40 | Send idle if buffer is not full |
| 4F | 41 | Bit 1 shifted & data set check |
| 41 | 42 | Bit 2 shifted & data set check |
| 42 | 43 | Bit 3 shifted & data set check |
| 43 | 44 | Bit 4 shifted & data set check |
| 44 | 45 | Bit 5 shifted & data set check |
| 45 | 46 | Bit 6 shifted & data set check |
| 46 | 47 | Bit 7 shifted & data set check |
| 4F 41 42 43 44 45 46 47 | 48 | Last bit shifted |
| 48 | 49 | Send stop bit 1 |
| 49 | 4A | Send stop bit 1 1/2 or 2 or continue if 1 stop |
| 4A | 40 | Transmit continue |
| 4A | 00 | Transmit turnaround interrupt & jump to reset |

| Cybits Input States | Transmit Cybit States for Normal Eight Bit Sync Character | |
|---|---|---|
| | Output States | Description |
| XX | 00 | Reset |
| 00 1X 2X 4X | 80 | Start sync transmit & start bit rate clock |
| 80 | 89 | Shift & reset Serdes |
| 89 | 81 | Bit 1 shifted if buffer is full |
| 89 | 88 | Bit 1 shifted of 1 bit char if buffer is full |
| 89 | 8D | Overrun if buffer is not full |
| 8D | 81 | Send mark & reset transmit latch & reset Serdes |
| 81 | 92 | Bit 2 shifted & data set check |
| 82 | 83 | Bit 3 shifted & data set check |
| 83 | 84 | Bit 4 shifted & data set check |
| 84 | 85 | Bit 5 shifted & data set check |
| 85 | 86 | Bit 6 shifted & data set check |
| 86 | 87 | Bit 7 shifted & data set check |
| 81 82 83 84 85 86 87 | 88 | Last bit shifted |
| 88 | 00 | Jump to reset & interrupt if xmit turnaround |

FIG. 6 shows one scan cycle from the scan table. The time given for scanning each line is identified as a STEP. The number of steps is related to the maximum of lines or device ports to be serviced, in this case thirty-two. A scan cycle, which is a multiple of the line speeds, is the period it takes to sequentially read all of the 32 STEPS or each line address. In addition, there is a time slot every four steps called a controller cycle (CC1 through CC8 of FIG. 6) which allows accessability of the PCS controller to the control store 102 which contains line definitions and transmit data characters and control information.

The hardware controller interrupt is the condition of the queue not being empty. The priority is such that only one interrupt is allowed from any one of the 32 lines being serviced during one full scan period or scan cycle. Thus the higher communication line speeds when placed in lower address positions of the line address storage array (called scan table) will be allowed more frequent transmit buffer services, and lines in the higher positions of scan table could possibly be locked out, transmit buffer services not allowed during transmit and thus underrun their communication ports. The performance is based on the period of the scan cycle. A period of 52 usec represents an accuracy of 1/16 of a bit at 1200 bps for 32 lines and this is adequate resolution. Any rate higher than 1200 bps would require prioritization. Note FIG. 6.

The fact that the scan table is loaded via program control allows a physical line address to be scanned during the scan cycle in any physical order wanted. If the line address is substituted in the table more than once (FIG. 6 scan sequence example of 9600 bauds with the line address substituted eight times) this would increase the receive or transmit scan accuracy of the physical line. It also allows fewer lines at higher speeds to be scanned more frequently. An example would be if a 1200 bps line were put in the table twice, then the scan service for that line would be increased from 1/16 of a bit to 1/32 of a bit, thus doubling the accuracy or halving the error rate. Therefore, in order to service a 2400 baud line at 1/16 of a bit it is required that the 2400 baud line address be substituted in the table twice, and so on. An example of the manner in which line address assignments should be programmed into the scan table 100 of FIG. 4 is shown in FIG. 14.

Figure 15:
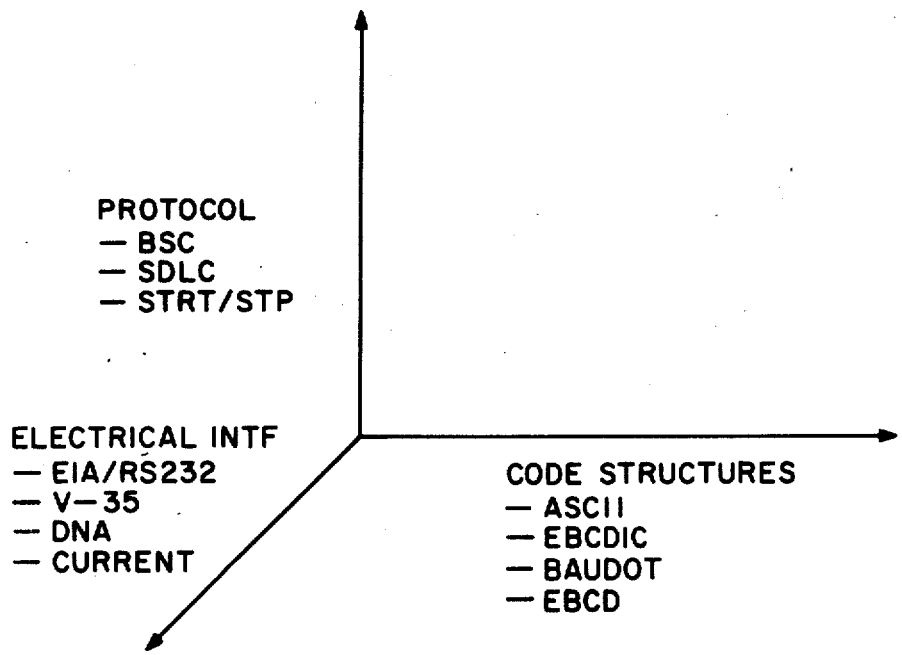

OVERVIEW OF PROGRAMMABLE COMMUNICATIONS SUBSYSTEM MULTIPLEXER (PCS) OF INVENTION the primary objective of the PCS of the invention is to allow users to attach a large variety of communication devices to the Series/1 computer. This objective, among others, necessitates the capabilities for separating three commonly found variables in a communications environment. Note FIG. 15 namely:

A. The electrical interface: This variable allows for a large number of connection and/or termination methods. Some examples may be:
 1. An EIA RS-232 interface
 2. A 20–60 ma current loop.
 3. A Digital Data Services (DDS) interface
 4. A high speed V-35 interface
 5. A loop adapter interface
 6. A modem eliminator (direct attachment)

B. The code structure: This variable allows for various code structures to be selected. Some examples are:
 1. ASCII
 2. EBCDIC
 3. BAUDOT
 4. EBCD
 5. 6-Bit Transcode C. The protocol: This procedural discipline or sequence convention may consist of,
 1. Binary Synchronous Communications (BSC)
 2. Synchronous Data Link Control (SCLC/HDLC)
 3. Start/Stop
 4. Air lines control (PARS/ALC)

The design of the PCS of the invention, has intentionally separated these variables and allows these variables to coexist and intermix. To facilitate these variables, five functional entities have been designed: (Note FIG. 16)

A. A control unit (PCS controller) with
 1. a sufficiently large enough address space (64K bytes).
 2. An addressing mechanism allowing for high speed access to fixed device dependent memory locations. (Line Control Block (LCB) paging)

3. An interrupt mechanism in the controller for high priority task processing.
4. A reasonably fast (750 ns) instruction execution time.

B. A Time Division Multiplexer (Scanner)

Capable of supporting the following dynamically programmable functions.

1. Synchronous or Asynchronous operation
2. 1, 2, 3, 4, 5, 6, 7 or 8 bit character length
3. 1, 1.5 or 2 Stop bits
4. Contiguous bit rate selection between 45-1200 bps using internal clocking.
5. Up to 9600 bps data rates using external clocking methods.
6. Any synchronizing bit pattern selection.
7. Serializer/Deserializer shift direction of most significant or least significant bit first.
8. Parity check of Odd, Even or no Parity.
9. Line independent timers with dynamically selectable time bases.
10. Dynamically selectable timer modes of interval timer vs operation monitor mode.

In addition, the scanner functions to distinguish high priority requests (Interrupt Queue from low priority requests Receive Queue and provides buffering for these requests).

C. A Series/1 Channel Interface with the capabilities to transfer data to or from Series/1 storage without significant Series/1 Central Processing intervention.

D. A User Programming Capability providing high-level language interface with ease of use as an important requirement.

E. A Physical Packaging Structure allowing for transparent selection of electrical interfaces to the scanner, and providing maximum utilization of enclosed space and available power.

PCS OPERATIONS

The operations involved when attempting to communicate from Series/1 computer system to another communications device over one or more of 32 lines are briefly summarized.

A. PROGRAM PREPARATION

Since PCS is a user programmable device it requires a program to be written and to be storage resistant in the user access memory before any operations can commence. The program preparation facilities can be utilized to create a program (STORE load) for the PCS. This program preparation facility converts the high level mnemonic op-codes into a series of binary data constants recognized by the PCS interpreter as ORDERS (Instructions). It also cross-references any labeled data constants and assigns appropriate storage location addresses. Once the PCS program has been prepared it may be stored on one of the Series/1 disks external to the PCS for actual use at a later point in time.

B. TASK INITIATION

In order to initiate a communications task the PCS program is transferred from the Series/1 disk into the PCS. Once this transfer is complete a communications session can commence by opening the various lines (one or more of the 32 lines) on which data transfers are required. The "Open" command also causes the PCS controller to fetch from Series/1 storage a number of data parameters which include configuration information about the particular line (i.e., transmission speed, number of bits per character, synchronous or asynchronous mode, etc.).

C. TRANSMIT OPERATION

Once a communication line has been opened and the various line parameters have been stored in the controller's Line Control Blocks (LCB's) and in the Scanner's Local Store Stacks, data transfers from Series/1 storage can commence. A transmit operation is initiated from a Series/1 user program by the execution of a Start I/O operation. The SIO operation makes reference to a number of parameter addresses. Some of these are the number of bytes to be transferred, the starting address of the table in Series/1 storage where the data is located and an index into PCS's storage where the PCS's program resides which performs the data transfer management function.

The program referenced in PCS's storage will normally initialize the scanner hardware to transmit mode, transmit the initialization sequence (which may consist of the appropriate number of synchronization characters, the Start of Text characters, etc.), then transmit the text located in Series/1 storage one byte at a time until the byte count has been decremented to zero, transmit the ending sequence (which may consist of the End of text character followed by the appropriate Block Check characters and some Padding characters), and then terminate the transmit operation and initialize scanner hardware to the receive mode for receiving the acknowledgement sequence from the remote end.

D. RECEIVE OPERATIONS

Once a communication line has been opened and the various line parameters have been stored in the controller's line control blocks (LCB's) and the scanner's local store stacks data transfer to Series/1 storage can commence. A receive operation is initiated from the Series/1 user program by the execution of a Start I/O operation. The SIO operation makes reference to a number of parameters addresses. Some of these are the number of bytes to be transferred, the starting address of the Series/1storage where the data may be deposited and an index into PCS's storage where the PCS's program resides which performs the data transfer management function. The program referenced in PCS's storage will normally initialize the scanner hardware to the receive mode, initialize that synchronization sequence and extract control characters and deposit into Series/1 storage only the non control character information bytes. In addition, the referenced PCS program will calculate the appropriate Block Check Character and make the appropriate tests for message integrity.

PCS HARDWARE SEQUENCE OF OPERATION

Figure 17:
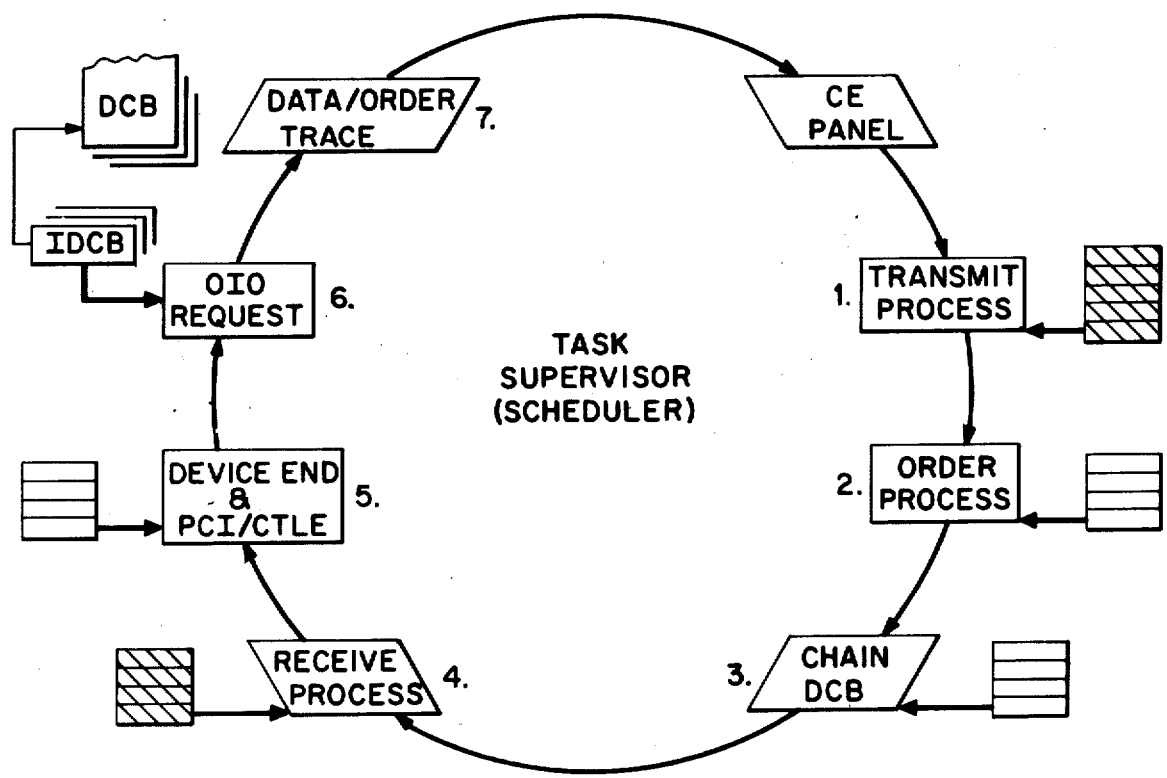

The normal hardware sequence of operation and broad system data flow concepts will now be given: Powering on the Steries/1 system will provide a master reset signal to the PCS controller. This reset function will cause the PCS controller to commence execution out of Read Only Storage location/0000 (See FIG. 16). At this time the m-code residing in low storage of ROS will execute a series of diagnostic routines. At the successful completion of these diagnostic routines the indicators on the PCS card will be updated to reflect this status. Once the m-diagnostics have been successfully completed program control is given to the task supervisor which also resides in RPS (Receive Process Scheduler). The task supervisor operates in a sequentional and circular priority manner (Note FIG. 17), first testing to see if transmit operations require processing, then testing if orders require processing, etc. If a task is found requiring processing, control is returned to Step 1, namely, testing for transmit operations.

The task supervisor continuously tests the various processing tasks. As the last task in the priority sequence it interrogates the function of the CE panels. This task consists of updating the Op-Monitor indicator on the PCS card file panel (indicating that the task supervisor is functioning), and testing for request of the hand-held console. This loop will continue until an I/O instruction is executed by the Series/1 CPU which addresses the PCS. When this process function is tested by the task supervisor it will initiate the required cycle steal functions and transfer from Series/1 storage to PCS storage the required DCB information.

The first I/O operation directed to PCS after a Power-on-reset initialization will normally be a request to load PCS's STORE with a set of Function Strings (program). This cycle stealing data transfer function is accomplished by loading the channel interface hardware with the Series/1 storage address and the appropriate control information to cause this data transfer to occur. Once PCS's STORE has been loaded, a Device End interrupt to the Series/1 CPU is initiated by the task supervisor.

With the knowledge that PCS's storage has been successfully loaded with a set of Function Strings the task supervisor again updates the PCS card file panel indicators to reflect this status.

The next logical operation is for the Series/1 user program to issued on Open I/O operation. This open I/O operation will again result in a number of channel cycle steal operations to occur and a table of line parameters to be transferred from Series/1 storage into PCS's storage. At this point in time the I/O operations are directed to a specified line address. The task supervisor will now initialze the CLAR/SLAR registers to the appropriate line number.

The function of the Controller Line Address Register (CLAR) and the Scanner Line Address Register (SLAR) is to provide the base register addressing for the hardware. In the controller, the CLAR will index STORE address space/4000-/5000 into 32 128 byte Line Control Blocks (LCB) without the need for the m-code to compute an effective address. These 128 byte tables contain the personalization information for each of the 32 attachable devices.

The CLAR also directs the data transfer to or from the CRC computer without the need for the m-code to specify the affected device number. Finally the CLAR also directs the data transfers to or from the Channel Local Store Stack and register files without the need for the m-code to specify the affected device address.

In the Scanner the SLAR automatically directs the data transfer to or from the Local Store Stacks without the need for the m-code to specify the Address of these Local Store Stacks. The SLAR also automatically directs all data transfers to or from the device feature cards without the need for specific addressing.

During the opening functions of a specified line the parameters associated are transferred from Series/1 storage to the LCB area, the CRC processor, the Channel Address stacks and the Scanner Local Store Stacks. With the hardware initialized to the appropriate control information, data transfers can then take place. The next sequential operation may be a Start I/O. The Start I/O would consist of the following sequences: The SIO command is recognized by the PCS task supervisor and execution of the appropriate Function String in PCS's Store is initiated. The task supervisor relinquishes control to the interpreter (also in ROS) which will fetch a byte of data from PCS's store. This byte of data is a displacement into a table in ROS which contains the address for the appropriate subroutine in ROS which is to perform the desired execution of the Order (Note FIG. 18). Executable orders consist of Reading text, writing text, Monitoring for control characters, maintaining timers, posting channel interrupts, and manipulating Data Set Interface signals. The user programmer, therefore, can write the appropriate function string programs and thereby off load the Series/1 CPU of control character interrogation, Block Check Character computation and polling tasks.

The hand-held console appears to the PCS controller as an I/O device from which the User Programmer can request storage to be displayed or the status of the Data sets interface leads to be displayed In addition, he may initiate Data Tracing or Ordering Execution tracing functions to be performed.

These utility functions ease the burden in diagnosing Communication Line problems as well as aid the Programmer in debugging his PCS Function String Programs.

RECEIVE DATA FLOW OPERATIONS

Figure 16:
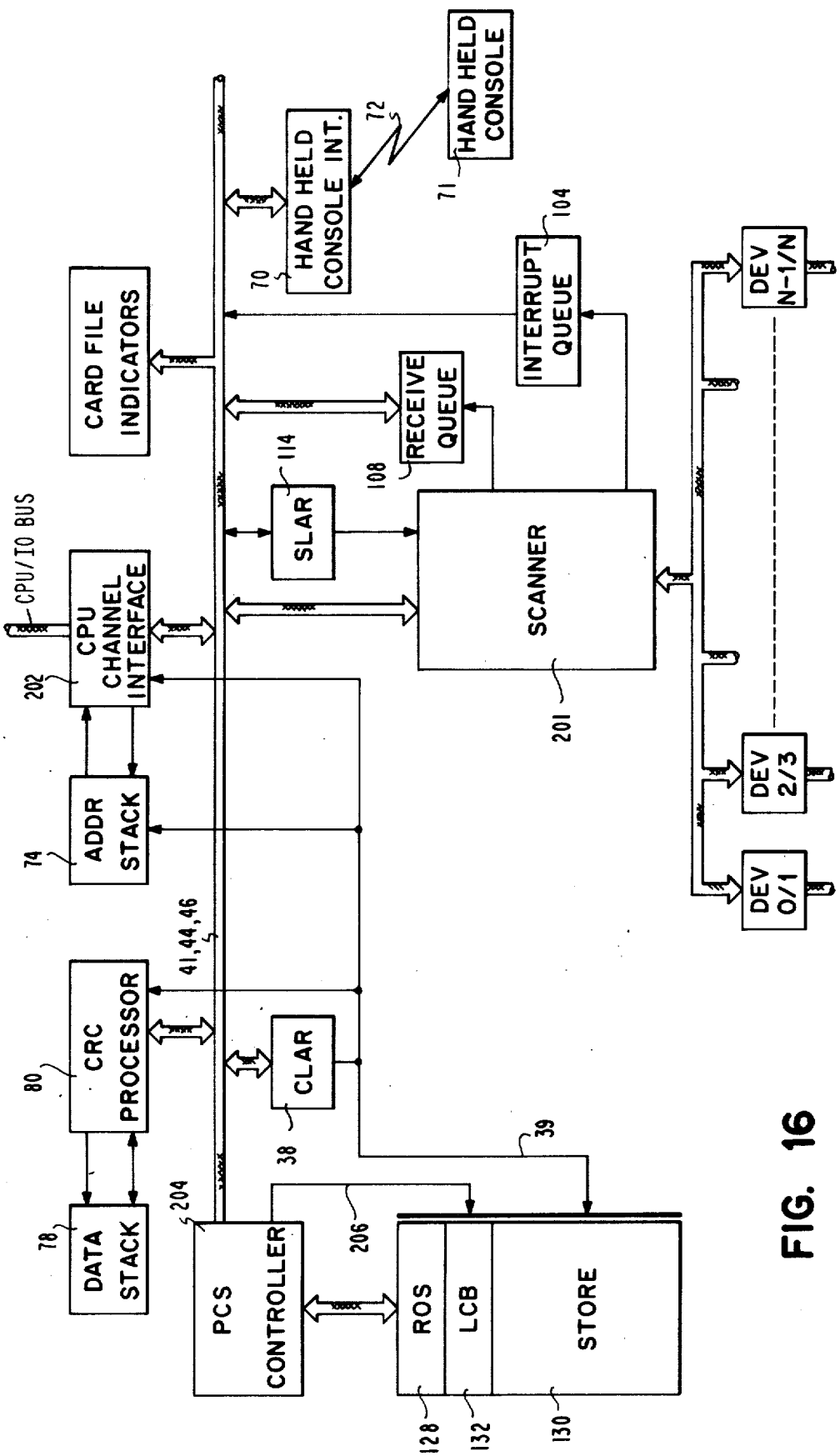

With the hardware initialized to receive mode the following data flow can be generated (See FIG. 16). The receive data signal from the customer's modem is converted from an EIA level to internal PCS logic levels on the device cards. The scanner samples the device cards in a customer specified sequence and deserializes the receive data into a parallel 5 through 8 bit character. Once the scanner has accumulated an entire character, the received character is placed into the receive queue along with the line address from which it came. The Task Supervisor, executing out of the controller m-code, will periodically interrogate the receive queue from the presence of received data. If the Task Supervisor finds a received character in the queue it will set the CLAR and SLAR to the line address associated with the received data character. Once these registers are loaded all data transfers from the Task Supervisor are automatically directed to the appropriate hardware registers pertaining to the line address specified in the CLAR/SLAR). The CLAR and SLAR are two physical entities. One is on the controller and the other on the scanner card, however, both registers respond to the same controller commands and are, therefore, set and reset simultaneously.

The Task Supervisor will test the received character for any user specified control characters. If the character received is not a control character, a CRC computation will be performed if the user specified this operation as required in his function string. The data character is then transferred to the channel hardware and is transferred into Series/1 storage by means of a cycle steal process. If the received character was one of the user specified control characters, a branch to new function string would probably be required. At such time the Task Supervisor relinquishes control to the Order Interpreter. This segment of m-code initializes the hardware to the new states required. It also updates indicators, points and data parameters in the LCB (Line Control Blocks) associated with the line address specified in the CLAR/SLAR.

TRANSMIT DATA FLOW OPERATIONS

With the hardware initialized to the transmit mode the following data flow can be generalized. (See FIG. 17) The scanner after shifting the last bit of the transmit data character out transfers a new data character from the scanner line data buffer into the shift register. The process of transferring a data character from the buffer to the SERDES (Serializer/Deserializer) initiates a transmit interrupt request to be placed into the scanner interrupt queue along with the line address requesting the need for a character transfer. With the interrupt queue not empty, a hardware interrupt is presented to the controller Task Supervisor. The Task Supervisor interrogates the interrupt and presents the CLAR/SLAR to the line address requesting the interrupt. A data transfer is then initiated from Series/1 storage through the channel hardware to the Task Supervisor. The Task Supervisor then places the new data character into the scanner line buffer which requested the new data character. The Task Supervisor will again cause a CRC computation to be performed if the user had specified this operation. If the character causes the specified byte count to be decremented to zero, the Task Supervisor will again relinquish control to the Order Interpreter for processing the next operation.

HAND HELD CONSOLE OPERATION

During the receiving and or transmitting of data the Task Supervisor will periodically examine the presence of the Hand Held console. If the console is plugged in and the user is requesting a function to be performed the Task Supervisor will respond with the requested data through the hexadecimal and/or LED indicators. Some of the functions which the user may specify is to display the status of the electrical interface of the Modem. If the Repeat mode is then selected, the Task Supervisor will continuously update the indicators. The user may also select a given storage location to be displayed. Again, if the Repeat mode is then selected the user can observe if the content of the specified storage location is being altered. The user may also select a trace function to be initiated. This trace function will store in a circular buffer all data received an/or transmitted by the line specified. In addition, the trace function can be terminated by execution of a specified order address. This provides for the trace data to be "frozen" for future inspection. The user also has a capability to display if a specified order address is ever executed. If the specified address is executed the "Data Entered" indicator will flash for approximately 200 ms. The internal m-diagnostics can also be invoked from the Hand Held console and the results will be placed in the indicators.

While the invention has been particularly shown and described with reference to a preferred embodiment thereof, it will be understood by those skilled in the art that various changes in form and details may be made therein.

What is claimed is:

1. In a programmable communications controller adapted to be coupled to a data processing system, apparatus for executing for each of a plurality of communications line ports a sequence of individualized functions for said ports from a sequence of generalized functions common to said plurality of ports, comprising control store means storing in each of a plurality of locations therein logic selection address information and other control information and data for each port, logic means for executing said sequence of general functions, a scan table means having a plurality of locations storing the addresses of the ports and the corresponding control store locations, means for including a source of timing pulses and an address register for periodically reading out all of the addresses in the scan table in a selected sequence to periodically access the ports and the control store locations in a desired sequence, and means responsive to the periodic accessing of the ports and the control store locations for selecting logic means for executing the sequences of functions required for each of the ports.

2. The apparatus of claim 1
wherein the scan table means and the control store means include means for changing the contents thereof, and
wherein said apparatus further comprises user programmable means for dynamically changing the contents of each of said means to permit coupling of different communication devices to said ports and to change the sequence in which addresses of the control store means are read from the scan table means.

3. The apparatus of claim 2 wherein the address of at least one of the ports and its corresponding control store location is stored in more than one scan table location to increase the frequency of accessing the last-mentioned port and control store location, thereby increasing the reliability of servicing data on higher speed devices associated with the port.

4. The apparatus of claim 1 wherein the address of at least one of the ports and its corresponding control store location is stored in more than one scan table location to increase the frequency of accessing the last-mentioned port and control store location; thereby increasing the reliability of servicing data on higher speed devices associated with the port.

5. The apparatus of claim 1 further comprising
portions of the control store locations storing multibit characters of data in transmission to and from the communication line ports,
a multi position first-in-first-out receive queue for storing in positions thereof data characters and their corresponding port addresses together in the order in which the data characters are received from the ports,
said logic means effective in response to certain of control store accesses for entering data received at each port into its respective control store location serially by bit, and
said logic means effective in response to certain other control store accesses for transferring each complete character from the control store to the receive queue and its port address from the scan table means to the receive queue.

6. The apparatus of claim 5 further comprising
each of said receive queue positions adapted to alternatively store one of said data characters or a status character or a control character together with the port address with which said data status or control character is associated, a portion of each receive queue position adapted to store information identifying the character stored in that position as a data, status, or control character, said logic means effective in response to further control store accesses for transferring status characters from the control store means to the receive queue and the associated port addresses from the scan table means to the receive queue, and program controlled means responsive to reading a character from the receive queue indicative of one of a selected plurality of communication events requiring termination of communication through a respective port for entering into the receive queue a control character, and program controlled means for invalidating any data entered into receive queue for the last-mentioned respective port between said indicative character and said control character.

7. The apparatus of claim 5 together with a programable controller comprising a buffer store, and program controlled means for transferring data characters from the queue to the buffer store.

8. The apparatus of claim 1 further comprising a serializer-deserializer portion of each control store location for storing a multibit character of data in transmission to and from the respective communication line port, a transmit buffer portion of each control store location for storing a multibit character of data preliminary to transmission to the respective communication port, a multiple position first-in-first-out transmit interrupt queue for storing in positions thereof port addresses of ports requesting transmit character buffer service together with information identifying the type of interrupt being requested, said logic means effective in response to each control store access, which causes the last bit of a multibit character in the serializer-deserializer portion of the control store location being accessed to be transferred to the respective port, for transferring the line address from the scan table means to the transmit interrupt queue and for entering an interrupt request identification into the transmit interrupt queue position with the last-mentioned line address, said logic means also effective during the last-mentioned control store access for transferring the next transmit character from the transmit buffer portion of the control store location to the serializer-deserializer portion of the control store location, and program controlled means including a hardware interrupt mechanism for reading the last-mentioned line address and its interrupt identification from the transmit queue and for transferring a next succeeding data character intended for transmission over the corresponding port to the transmit buffer portion of the control store location corresponding to that port.

9. The apparatus of claim 8 further comprising a scanner line address register storing line addresses of the ports for accessing control store locations corresponding to the ports, a data register, means indicating the empty or non-empty condition of the transmit interrupt queue, means in said hardware interrupt mechanism responsive to detection of non-empty condition of the indicating means for producing an interrupt signal, a buffer for storing data characters intended for transmission between the controller and the ports, a function register, program controlled means responsive to the interrupt signal for setting the line address, which caused the interrupt, into the scanner line address register, for setting the function register, and for transferring the next transmit character from the buffer to the data register, means including said source of timing pulses and said scanner line address register for periodically reading out the line address in the SLAR interleaved with read out of the address in the scan table means, decode means responsive to the setting of the function register when the line address is read out of the SLAR for accessing the control store location identified by the line address in the scanner line address register to transfer a data character from the data register to the transmit buffer of the accessed control store location.

10. The apparatus of claim 8 wherein said logic means is effective, during one complete cycle for accessing of all locations of the scan table, for inhibiting during said cycle more than one transfer of a line address and its interrupt identification into the transmit interrupt queue, thereby further prioritizing ports whose addresses are stored in the earlier accessed locations of the scan table.

* * * * *